United States Patent [19]

Tokishige et al.

[11] Patent Number: 5,586,228
[45] Date of Patent: Dec. 17, 1996

[54] DIGITAL IMAGE FORMING APPARATUS

[75] Inventors: Masato Tokishige, Nara; Toshihiro Okahashi, Kashihara; Akira Tamagaki, Soraku-gun, all of Japan

[73] Assignee: Sharp Kabushiki Kaisha, Osaka, Japan

[21] Appl. No.: 349,354

[22] Filed: Dec. 2, 1994

[30] Foreign Application Priority Data

Dec. 3, 1993 [JP] Japan .................................. 5-304451

[51] Int. Cl.⁶ .................................................. G06K 15/00
[52] U.S. Cl. ............................................................ 395/115
[58] Field of Search .................................... 395/115, 116, 395/112, 113, 164, 165, 166; 358/404, 444, 531; 355/205, 207

[56] References Cited

U.S. PATENT DOCUMENTS

| | | | |
|---|---|---|---|
| 4,517,663 | 5/1985 | Imazeki et al. | 365/222 |
| 5,218,671 | 6/1993 | Liao et al. | 395/131 |
| 5,253,011 | 10/1993 | Zahn et al. | 355/41 |
| 5,442,400 | 8/1995 | Sun et al. | 348/402 |

FOREIGN PATENT DOCUMENTS

| | | |
|---|---|---|
| 63-146566 | 6/1988 | Japan . |
| 2-218068 | 8/1990 | Japan . |
| 3-259642 | 11/1991 | Japan . |
| 5-210731 | 8/1993 | Japan . |

*Primary Examiner*—Arthur G. Evans
*Attorney, Agent, or Firm*—David G. Conlin; Milton Oliver

[57] ABSTRACT

A digital image forming apparatus wherein at least when an occurrence of trouble that required automatic switching of the power witch to the OFF position during operation of the image output operation when it is detected by a trouble detector, the image data inputted for an image output operation is stored in an internal memory which ensures the memory content even with the power switch switched to the OFF position. After the trouble is settled, the image output operation is continued with respect to the image data stored in the internal memory by the image output unit. As a result, an idle operation for reinputting the image data to be outputted through visualization by, for example, a reading operation of the document image can be eliminated.

23 Claims, 52 Drawing Sheets

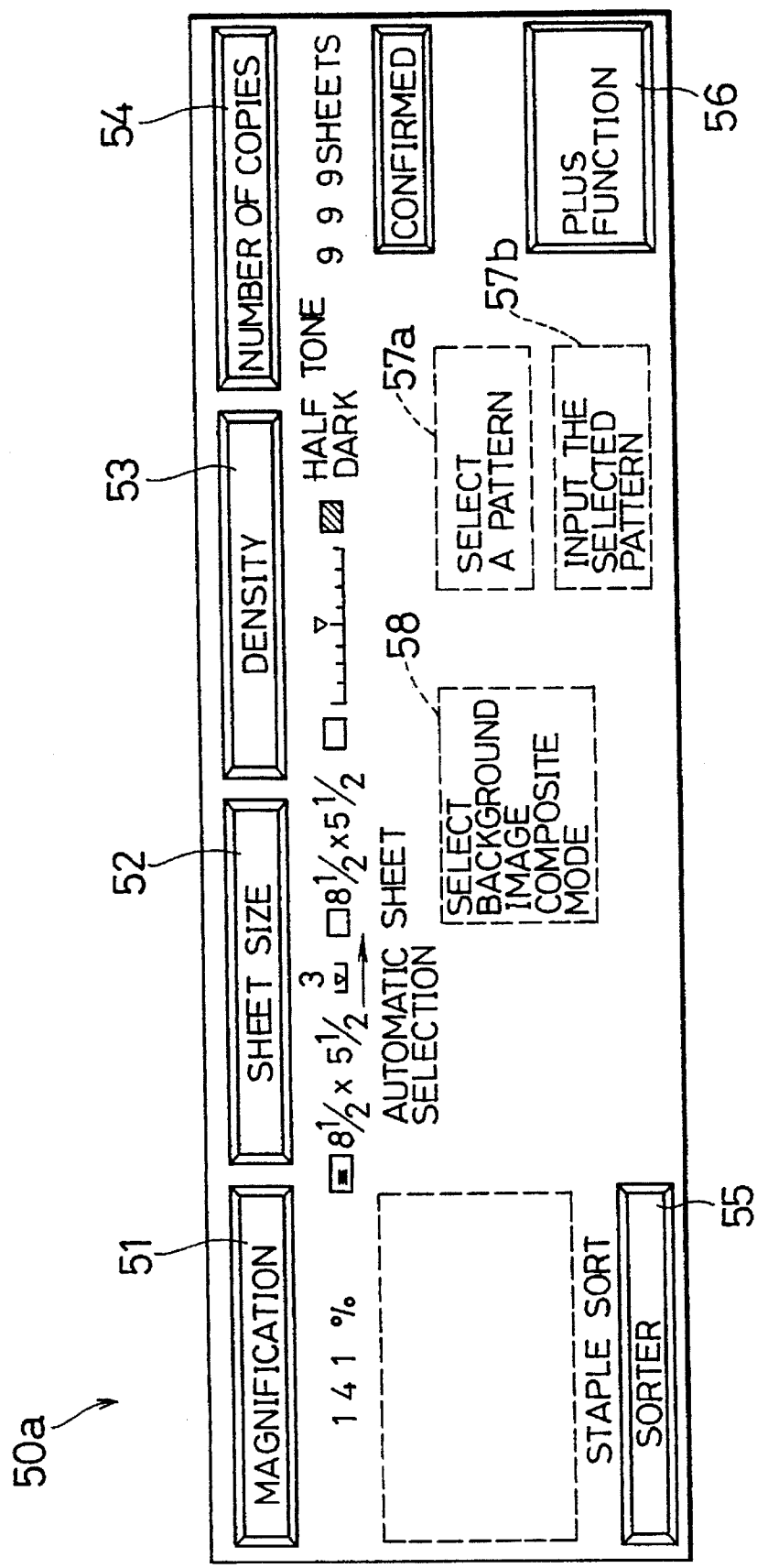

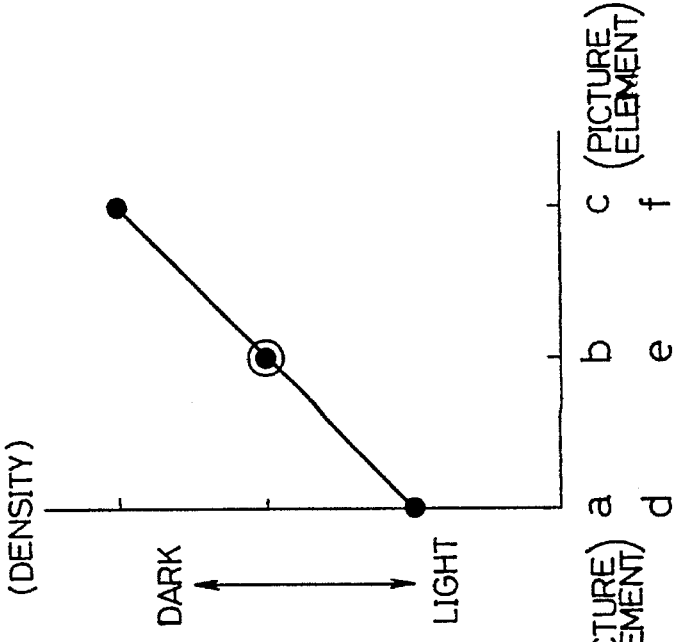
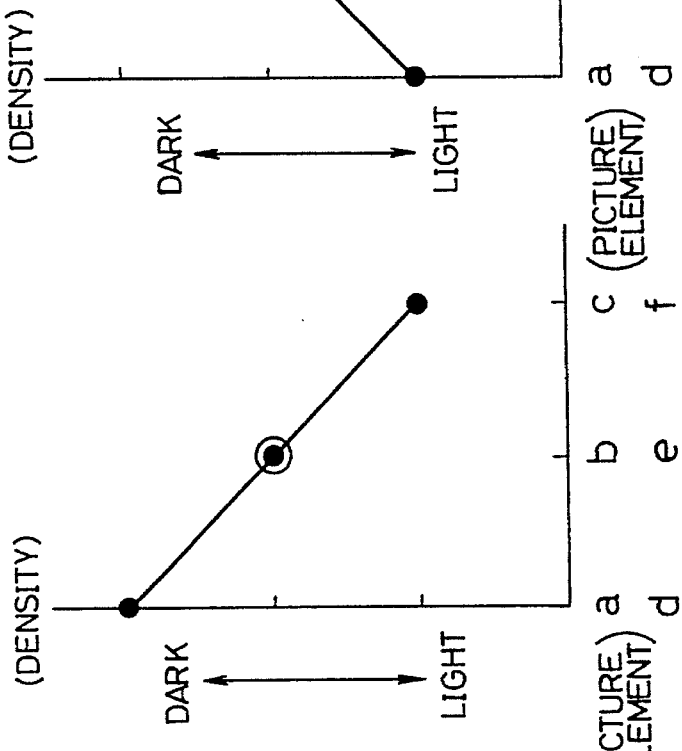
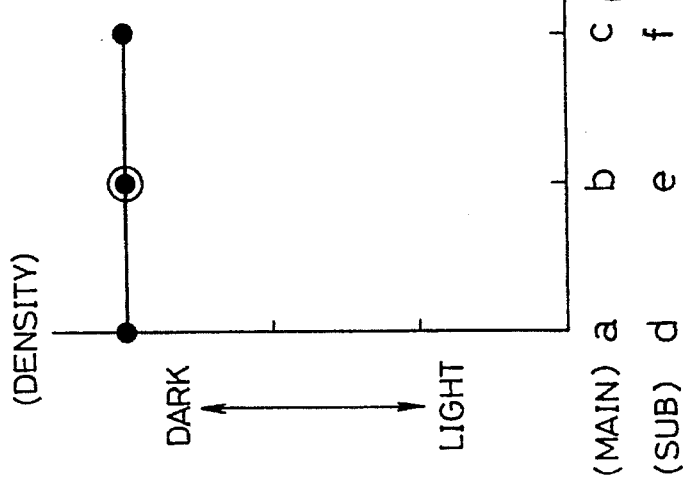

DIGITAL IMAGE FORMING APPARATUS

FIELD OF THE INVENTION

The present invention relates to a digital image forming apparatus such as a digital copying machine, digital printer, etc., which performs image forming processes for visualizing inputted image data by reading the image data having been temporarily stored in an image memory.

BACKGROUND OF THE INVENTION

A digital copying machine as an example of digital image forming apparatus forms an image through the following processes. First, an image on a document is read by a scanner, and the resulting image data is temporarily stored in an image memory. Then, the image data is read from the image memory, thereby visualizing the image data through the copying process.

However, the described conventional digital copying machine has not succeeded in giving a sufficient solution to suppress the adverse effects from the trouble occurred during operation, such as paper being stuck, errors in reading from and writing in the image memory, etc. Also, the solution to efficiently restart the operation has not been given.

For example, in the digital copying machine which employs a volatile memory composed of a semiconductor, if some trouble has occurred such as paper being stuck, etc., during the operation, and the main power of the copying machine is turned OFF, the contents stored in the picture memory would be erased. Therefore, after the trouble is settled, in order to restart the copying operation by switching the power ON, it is required to restore the image data by reading the image on the document by the scanner, thereby presenting the problem that a long time is required before the copying machine can be restarted. The described problem becomes obvious especially in the processes of inputting image data read by an external device to be temporarily stored in the image memory and of reading the image data so as to produce copies.

On the other hand, Japanese Laid-Open Patent Publication No. 146566/1988 (Tokukaisho 53-146566) discloses a digital copying machine provided with a non-volatile memory as an external memory. In this copying machine, the content in the memory, i.e., the image data, can be stored even when the power switch is turned OFF. However, the solution to efficiently restart the copying machine has not yet been given.

The described conventional digital copying machines also present the following problems. When producing copies by reading image data from the image memory, if an error has occurred during the reading operation from the picture memory, a normal memory access may not be ensured, or the reading operation may be repeated until the reading operation is permitted from the area the trouble has occurred. Therefore, the problem is presented in that the copying operation must be terminated, or an extremely long time is required for a copying operation. Namely, when a reading error has occurred in the conventional digital copying machine, an adverse effect from the trouble cannot be prevented, and thus the copying operation cannot be continued. The above-mentioned problems may occur also when a writing error has occurred during wiring operation of the image data in the image memory by reading from the document using a scanner.

SUMMARY OF THE INVENTION

An object of the present invention is to provide a digital image forming apparatus which prevents adverse effects from a trouble occurred during operation so as to smoothly restart or continue its operation.

In order to achieve the above objective, the digital image forming apparatus in one aspect of the present invention is characterized by including: (1) error detection means for detecting a writing error occurred during writing operation of the image data and/or reading error occurred during reading operation of the image data; and (2) control means for controlling such that the operation related to an occurrence of an error is performed with respect to the next memory area in the image memory in response to a detection of error.

According to the described arrangement, during the reading operation of the image data form the image memory, if a reading error has occurred, a reading operation of data is performed with respect to the next memory area in the image memory. Similarly, when writing the image data into the image memory, if a writing error has occurred, a writing operation of data is performed with respect to the next memory area in the image memory.

Therefore, in the image memory, even if a reading error or a writing error has occurred, it is not necessary to stop the image output operation. Therefore, adverse effects from the trouble can be suppressed, thereby enabling a continuous image forming operation.

According to the described operation, even when a missing data occurs in the memory area subject to the reading error, since the image is usually composed of the image data of a huge volume, the missing data caused by the reading error is very little. Therefore, the reading error hardly affects the resulting image.

It is preferable that the digital image forming apparatus is provided with memory control means which processes the memory area subject to the error in the image memory to be determined as an inhibited area.

In this case, the memory area subject to the reading error or writing error is inhibited to be used, so that the missing data due to the reading error or writing error will not occur again from the same address in the image memory, thereby preventing the image quality from being lowered. Moreover, since an unnecessary writing operation in the memory area subject to the writing error or an unnecessary reading operation from the memory area subject to the reading area can be prevented, a smoother reading or writing operation can be achieved, thereby achieving a smoother image outputting operation.

The memory control means is preferably arranged so as to be activated when the power switch of the digital image forming apparatus is not in the ON position, i.e., when the apparatus does not perform an image forming operation.

In this case, the operation by the memory control means, which processes the memory area subject to the error generating portion to be determined as an inhibited area is performed when the power switch of the image forming operation is not in the ON position, i.e., when the apparatus does not perform an image forming operation, i.e., for example, in the warm-up period or in the stand-by state. Therefore, time for the process by the memory control means can be omitted. Alternatively, by performing the operation by the memory control means simultaneously with a sequential operation for achieving an image output operation, a complicated process can be avoided.

The digital image forming apparatus is arranged such that the image memory can store the memory content even when the power switch of the apparatus is in the OFF position. The digital copying machine is also provided with the trouble detection means for detecting an occurrence of trouble that requires switching of the power switch to the OFF position. Therefore, at least when an occurrence of trouble is detected by the trouble detection means, it is controlled as follows: inputted image data to be outputted through an image output operation is stored in the internal memory, and after the trouble is settled, an image output operation regarding the image data stored in the internal memory is continued by the image output means.

In this case, at least when a trouble that requires a switching of the power switch to the OFF position has occurred, the inputted image data is stored in the internal memory that stores the memory content even when the power switch is switched to the OFF position. Therefore, even after the power switch is switched OFF, the image data can be stored in the internal memory. When the power switch of the apparatus is switched again to the ON position, the image output operation regarding the image data to be stored in the internal memory is restarted. Therefore, such an unnecessary operation that the image data to be outputted through visualization is reinputted by reading the image data from the document image can be eliminated.

The digital image forming apparatus in another aspect of the present invention is characterized by including: (a) error detection means for detecting a reading error in reading the image data from the image memory; (b) data interpolation means for interpolating the image data subject to a reading error based on image data; and (c) control means for controlling the data interpolation means so as to perform the data interpolation when a reading error has detected and to continue the reading operation of image data with respect to the next memory area in the image memory.

In the described arrangement, when a reading error has occurred in reading the image data from the image memory, the image data subject to the reading error is interpolated based on another image data, and the data reading operation continue with respect to the next memory area in the image memory.

Therefore, even when the reading error has occurred in the image memory, it is not required to terminate the image output operation by the image output means. As a result, adverse effects from the trouble due to the reading error can be suppressed, thereby enabling a continuous image output operation. Moreover, since the apparatus is arranged so as to interpolate the image data subject to the reading error, the image quality of the output image can be prevented from being lowered.

The described image forming apparatuses in the first and second aspect may be provided with means for stopping the image output operation when the amount of error detected by the error detection means exceeds the permissible amount.

In this case, when the amount of error detected by the error detection means exceeds the permissible amount, the image output operation is stopped, thereby preventing the image quality from being lowered. Although missing data duet to a reading error or writing error will not affect the resulting copied image very much, if a large amount of reading error or writing error has occurred, and the amount of missing data increases, the quality of the output image is lowered, and the same problem would occur even when the image data subject to the reading error is interpolated by the data in the area surrounding the area subject to the reading error. Therefore, if the amount of reading error or writing error is within a permissible amount, the image data in the area subject to the error is ignored or interpolated so as to continue a reading operation or writing operation of image data in or from the image memory. On the other hand, when the amount of error exceeds the permissible amount, the image output operation is stopped, thereby preventing the image of low quality from being outputted.

The described digital image forming apparatus in the first or second aspect may include: automatic document feeding means for transporting a plurality of documents set in the document set position according to the document image reading operation of the image input means in correct order; image input means for reading images on the document set in the document reading position in order; informing means for informing the user; operation start instruction means for inputting an instruction for starting an image output operation; and operation control means for controlling the informing means so as to urge the image forming operation to be stopped and restarted in response to an instruction to start the image forming operation when an amount of error detected by the error detection means exceeds a permissible amount, and also controls the informing means so as to urge a piece of document from which the image had been read before the stoppage of the image output operation to be set back to a document set position of the automatic start instruction means.

In this case, during output operation, i.e., copying operation of the document image by the automatic feeding means, or when the amount of writing error or reading error exceeds the permissible amount, the image output operation is stopped, thereby preventing images of low quality from being outputted. Even when the above problem has occurred, a piece of document subject to the image data that had been written in the image memory or subject to the image data that had been read from the image memory before the stoppage of the operation is set back to the document set position of the automatic document feeding means, and by actuating the operation start instruction input means, the image output operation can be restarted from the document image subject to the described trouble. Therefore, even when the amount of the writing error or reading error exceeds the permissible amount and the image output operation is stopped, adverse effects from the error can be suppressed, thereby restarting the image output operation.

The described digital image forming apparatus in the first or second state is further provided with error amount memory means for storing an accumulated amount of errors detected by the error detection means.

In this case, an amount of writing error generated during writing operation of the image data in the image memory or reading error generated in reading the image data from the image memory, such as the number of times the writing or reading error occurred or the accumulated length of the image data subject to the writing or reading error are stored. As a result, in the service checking or maintenance checking, the described accumulated value can be seen. When the amount of errors exceeds a predetermined amount, or a sudden increase in the amount of error is shown in the predetermined time period, the user can see that it is a time for exchanging the image memory. Therefore, the image memory can be exchanged in an appropriate timing, and adverse effects from the writing error or reading error can be suppressed, thereby smoothly carrying out the reading operation of the image data, i.e., the copying operation.

The digital image forming apparatus in the first or second aspect is arranged so as to further comprise: memory control means for processing the memory area subject to the writing error in the image memory to be determined as an inhibited area; warning means for giving a warning to the user; and operation control means for activating the warning means when the remaining capacity of the image memory becomes less than the predetermined amount.

In this case, since the memory area subject to the writing error is determined as an inhibited area, when the amount of use in the image memory is below the permissible amount, the warning is given to the user. Therefore, the user can exchange the image memory based on the user. Therefore, when writing the image data into the image memory by an increase in the writing error, an occurrence of damage can be prevented beforehand, thereby suppressing adverse effects from the writing error, thereby smoothly carrying out an image output operation.

The described digital image forming apparatus in the first or second aspect may further include: automatic document feeding means for transporting a plurality of documents set in the document set position according to the document image reading operation of the image input means in correct order; image input means for reading images on the document set in the document reading position in correct order; informing means for informing a user; operation start instruction means for inputting an instruction for starting an image output operation; and operation control means for controlling the informing means so as to stop the image output operation when an amount of error exceeds the permissible amount as a result of detection by the error detection means and to restart the image output operation when the amount error detected by the error detection means exceeds the permissible amount, and to set a piece of document subject to the image data that had been processed before the stoppage of the image output operation back to the document set position of the automatic document feeding means, and further performs the informing means so as to urge the operation start instruction input means, and which prohibits a restarting of the image output operation when the document image for processing the document image in a predetermined order is selected and for inhibiting the restarting of the image output operation.

In this case, when the amount of error exceeds the permissible amount, the image output operation can be stopped as in the case of the previously described arrangement. Moreover, even when the above problem has occurred, if the function required for processing the document image in a predetermined order is selected, such as a process for outputting a synthesized image of a plurality of documents on a sheet or for binding a plurality of outputted documents into a set of documents by stapling, the document subject to the image that had been read is set back to the document set position of the automatic feeding means, and by the operation start instruction input means, an image output operation for stopping the output from the document image can be restarted.

However, the described function for processing the document image in a predetermined order is selected, if the image out operation is restarted in the described manner, the copied image cannot be outputted in correct order for the processing function. More specifically, in the mode where images on both sides of the document are copied to one side of the document, when the stapling mode is selected, and an image output operation is restarted from the document set back to the document set position of the automatic feeding means, the sheets whereon the document image is copied are not outputted in proper order. Therefore, outputted sheets in the above-mentioned state cannot be stapled correctly. As described, when a function required for processing the document images in a predetermined order is selected, the restarting of the image output operation in the described processing mode is inhibited, thereby preventing an occurrence of operation inferior in the described function mode.

The digital image forming apparatus in still another aspect of the digital image forming apparatus of the present invention, includes: error detection means for detecting a writing error occurred during the image data into the image memory, and control means for controlling the data writing means so that image data is written in the error writing memory section set as a memory section wherein a writing error is less likely to occur compared with the memory area subject to the writing error.

According to the above arrangement, when a writing error has occurred in the image memory, the image data to be written at that time is written in the error writing memory section set as a memory section wherein a writing error is less likely to occur compared with the memory area subject to the writing error. Therefore, even when the writing error of image data has occurred, a smoother writing operation can be achieved. As a result, the problem that the writing operation due to the writing error, the image output operation can be stopped, and adverse effects from the image output operation can be suppressed, thereby enabling a continuous copy output operation.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a front view showing the display panel in the digital copying machine.

FIG. 23(a) is an explanatory view showing the case where picture elements adjoining to a picture element wherein the reading error shown in FIGS. 22(a) and (b) has occurred have the same density.

FIGS. 23(b) and 23(c) is an explanatory view showing the case where picture elements adjoining to a picture element wherein the reading error shown in FIGS. 22(a) and (b) has occurred have different densities.

DESCRIPTION OF THE EMBODIMENTS

The following description will discuss one embodiment of the present invention with reference to FIGS. 1 through 8.

Figure 3:
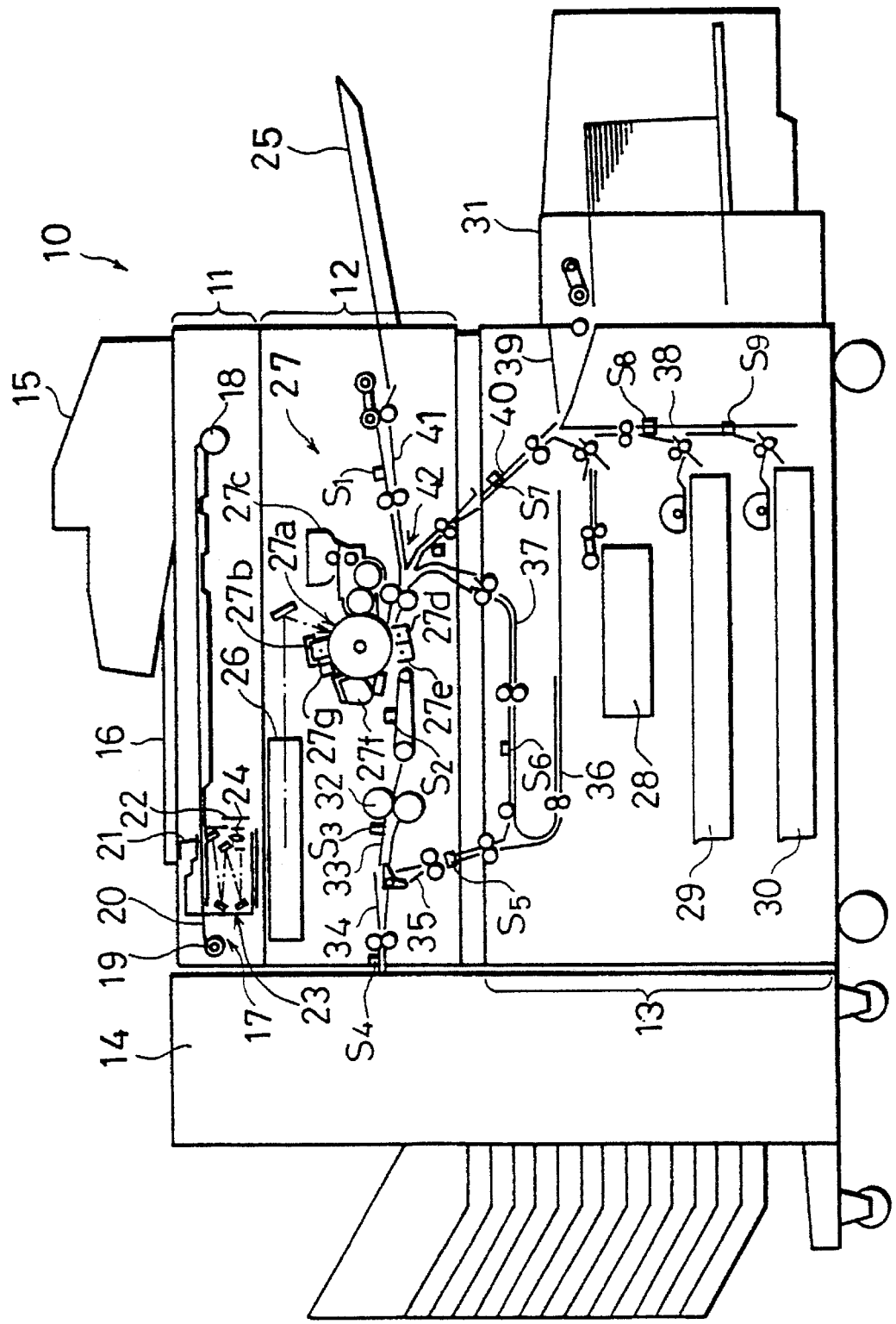
FIG. 3 is a view showing an entire configuration of the digital copying machine.

FIG. 3 is a view showing an entire arrangement of a digital copying machine 10 as an example of a digital image forming apparatus in accordance with the present embodiment. As shown in FIG. 3, the digital copying machine 10 has a scanner section 11, a laser printer section 12 (image output means), a multi-level paper feeding unit 13, and a sorter 14.

On the scanner section 11, a both-sided type automatic document feeder 15 is mounted, and the scanner section 11 is composed of a document platen 16 made of transparent glass, a movable scanner unit 17 and a position controlling device for controlling a position of the scanner unit 17.

The position controlling device includes a scanner motor 18 for driving the scanner unit 17, a pulley 19, a wire 20 connecting the scanner motor 18 and the pulley 19. The position controlling device moves the scanner unit 17 along the length of the document platen 16 and stops it at a predetermined position.

The scanner unit 17 includes a lamp reflector assembly 21 for projecting a document, a CCD (Charge Coupled Device) linear image sensor 22, a lens 24 for connecting the reflected image from the document to the CCD linear image sensor 22.

In the scanner section 11, when scanning the document placed on the document platen 16, an image formed on the document is read by moving the scanner unit 17 along the bottom surface of the document platen 16. On the other hand, in the case of using the ADF 15, the image on the document transported by the ADF 15 is read by the scanner unit 17 held in a predetermined position below the ADF 15.

The image data obtained by reading the document image by the scanner unit 17 is temporarily stored in a hard disk 66b (to be described later) provided in an image process controlling section after various processes are carried out by the image process controlling section (to be described later) in the digital copying machine 10. Thereafter, the image data in the hard disk 66b is applied to the laser printer section 12 and in response to an output instruction, it is outputted as a copying image on the sheet.

The multi-level paper feeding unit 13 includes a first cassette 28, a second cassette 29, a third cassette 30 and an optional fourth cassette 31. Each of the cassettes 28, 29, 30 and 31 contains sheets of paper, and sheets are fed from each cassette one by one from the top and is transported to the laser printer section 12.

The laser printer section 12 has a manual feed tray 25, a laser writing unit 26 and an electrophotographic processing section 27 for forming images.

The laser writing unit 26 includes a semiconductor laser, a polygon mirror and f-θ lens, etc. The semiconductor laser emits laser light in response to the image data read from the memory. The polygon mirror deflects the laser light at a constant angular velocity. The f-θ lens adjusts the resulting laser light so that it is deflected at a constant velocity on a photoreceptor drum 27a of the electrophotographic processing section 27.

As generally known, the electrophotographic processing section 27 has a charger 27b, a developing device 27c, a transfer device 27d, a separating device 27e, a cleaning device 27f and a charge removing device 27g around the photoreceptor drum 27a. A fuser 32 is also provided.

A transport path 33 is formed on a downstream side of the fuser 32 in the sheet feeding direction. The transport path 33 is separated into a transport path 34 that extends to the sorter 14 and a transport path 35 that extends to the multi-level paper feeding unit 13 below the laser printer section 32. The transport path 35 is further separated into a reverse transport path 36 and a double-sided/composite transport path 37 in the multi-level paper feeding unit 13.

In the double-sided copy mode in which both sides of a document are copied, the reverse transport path 36 turns over a sheet before it is transported to the image forming position of the photoreceptor drum 27a. The both-sided composite transport path 37 is provided for transporting a sheet from the reverse transport path 36 to the image forming position of the photoreceptor drum 27a in the both-sided copy mode. In the single-sided composite copy mode in which composite copies are formed of an image on the document or image in different colors are formed, the both-sided composite transport path 37 transports a sheet to the image forming position of the photoreceptor drum 27a without identifying the sheet.

The multi-level paper feeding unit 13 includes a common transport path 38. Sheets from the first cassette 28, the second cassette 29 and the third cassette 30 are transported to the electrophotographic processing section 27 through the common transport path 38. The common transport path 38 joins the transport path 39 that extends from the fourth cassette 31 on a way to the electrophotographic processing section 27, and extends to the transport path 40.

The transport path 40, the double-sided/composite transport path 37 and the transport path 41 from the manual feed tray 25 meet at a confluence 42. The joined transport paths 40, 37 and 41 extend to the image forming position formed between the photoreceptor drum 27a and the transfer unit 27d of the electrophotographic processing section 27. The confluence 42 is located in a vicinity of the image forming position.

In the laser printing section 12, the image data read from the memory is outputted as a laser beam from the laser writing unit 26, and the photoreceptor drum 27a having been charged to a predetermined potential by the charger 27b is scanned by the laser beam, thereby forming an electrostatic latent image on the surface of the photoreceptor drum 27a. Then, the electrostatic latent image is visualized using toner supplied from the developer 27c, and the resulting toner image is transferred onto a sheet fed from the multi-level paper feeding unit 13 by the transfer unit 27d. The sheet is then separated from the surface of the photoreceptor drum 27a by the separator 27e, and the residual toner remaining on the surface of the photoreceptor drum 27a is collected by the cleaning unit 27f, and the residual potential on the photoreceptor drum 27a is removed by the charger 27g. Thereafter, the toner image transferred onto the sheet is fixed on the sheet by the fuser 32, and is transported either to the sorter 14 by transport paths 33 and 34 or to the inverse transport path 36 by the transport paths 33 and 35.

The transport paths are provided with jam sensors $S_1$ through $S_9$ as trouble detection means for detecting sheets being stuck in the transport paths. Outputs from the jam sensors $S_1$ through $S_9$ are inputted to the CPU 65 (to be described later).

On the upper surface of the digital copying machine 10, an operation panel 50 shown in FIG. 4 is mounted. The operation panel 50 has a display section 50a at the substantial center. The display section 50a also serves as an input section. The operation panel 50 is also provided with a print switch 50b, a clear key 50c and a clear all key 50d near the right end. The display section 50a includes a transparent touch panel formed on the display surface of the liquid crystal display section of a dot matrix type. The clear key 50c clears a part of the set content, while the clear all key 50d is provided for clearing all the set content.

Figure 5:
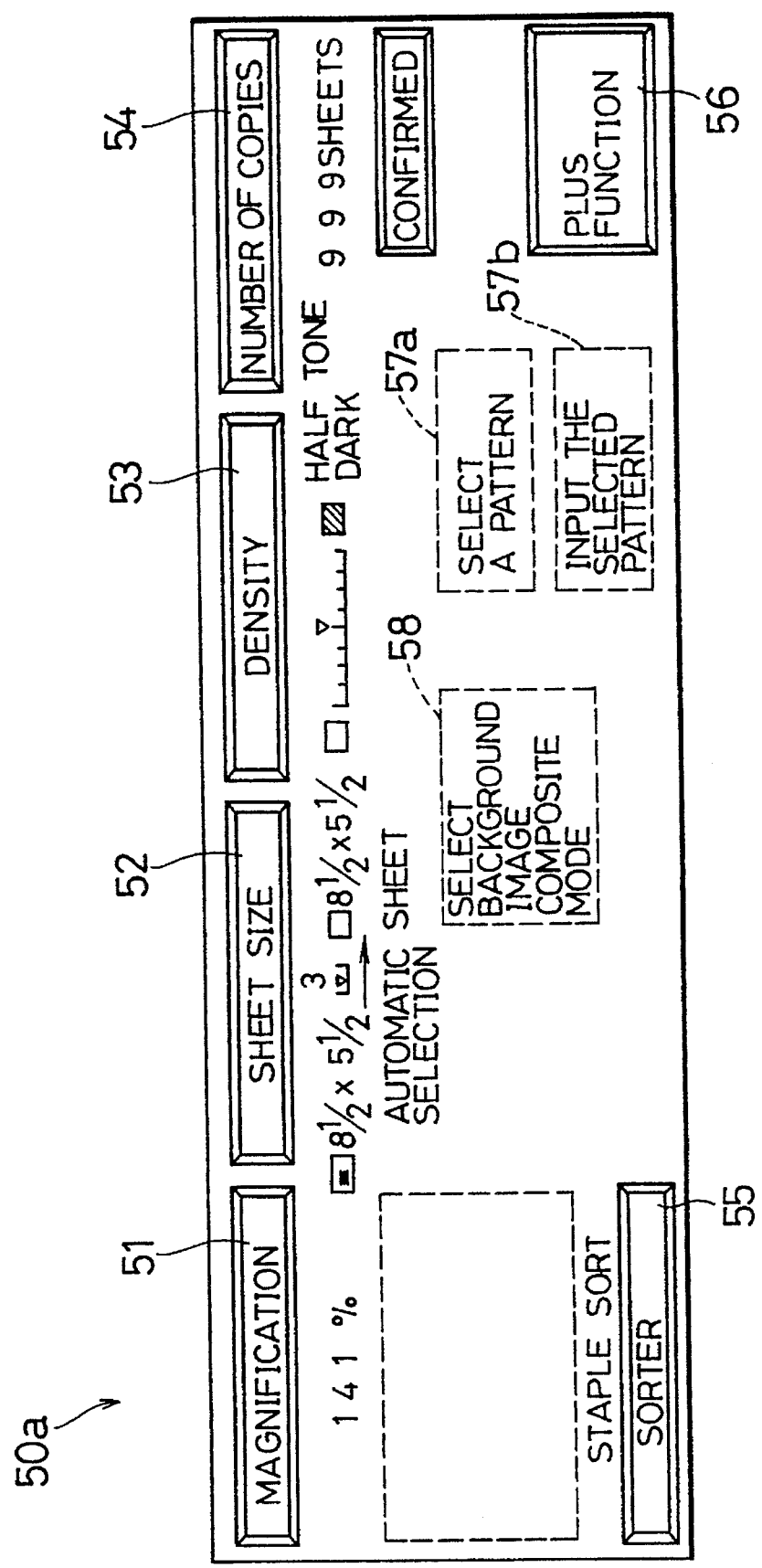
FIG. 5 is an enlarged view showing the display section in the display panel.

FIG. 5 shows a basic screen of the display section 50a as it appears when the power is switched ON. On the display section 50a, a scale factor selecting area 51 for selecting the scale factor, a sheet size selection area 52 for selecting the sheet size, a copy density selecting area 53 for selecting the copy density and a copy number selecting area 54 for selecting the number of copies are formed on the upper portion in the figure. On the bottom-left portion of the display section 50a, a sorter selecting area 55 for selecting the kind of sorter required is formed. On the bottom-right portion of the display section 50a, a plus function selecting area 56 is formed for making a selection between the selection mode of a specific pattern, for example, for a design to be used as a background of the copied images and an input mode. Then, when the plus function selection area 56 is operated, the specific pattern selecting area 57a for selecting the specific pattern, the specific pattern input area 57b for inputting the specific pattern and the background image composite mode selecting area 58 for executing the background image composite processing, appear on the display section 50a.

Figure 6:
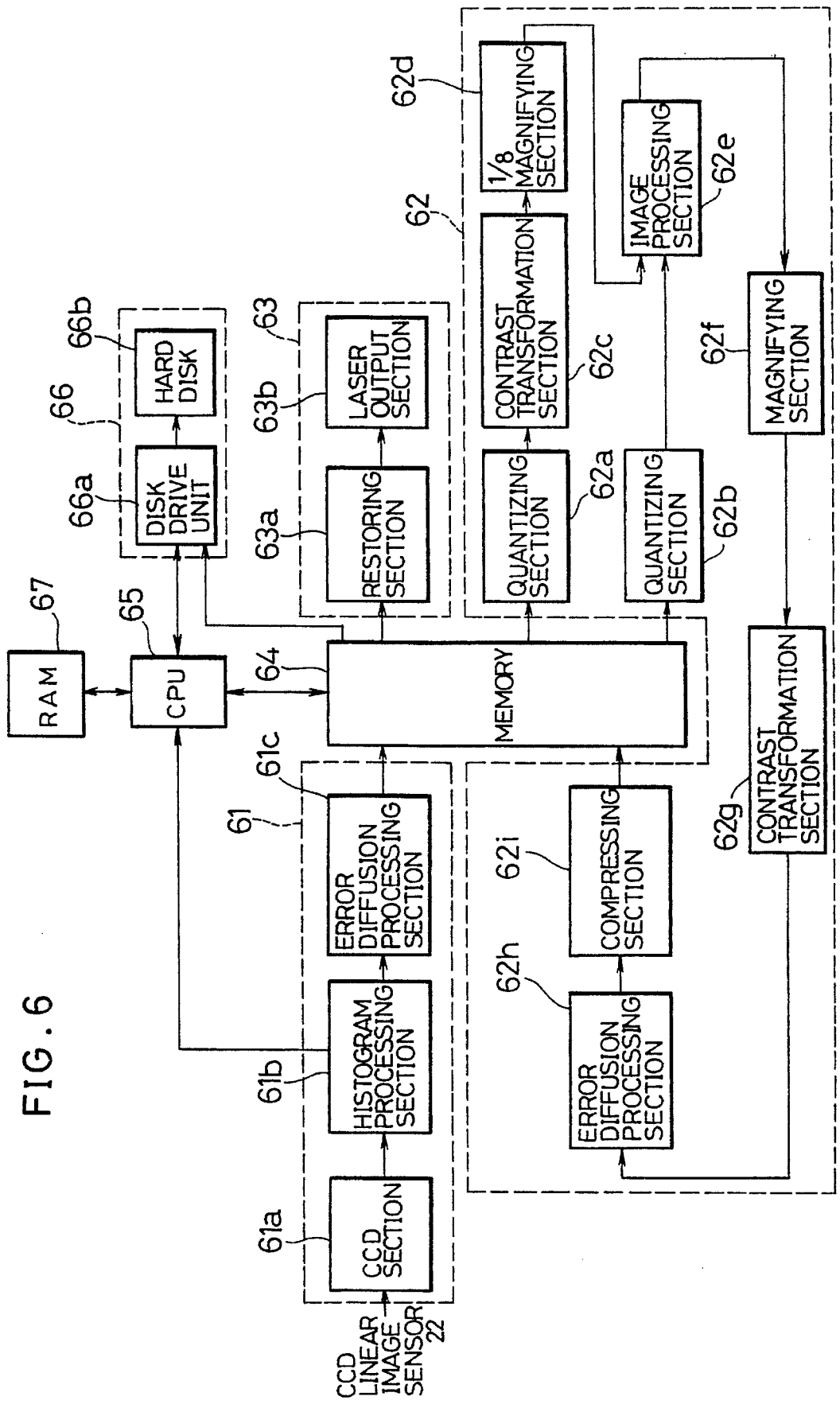
FIG. 6 is a block diagram showing the configuration of an image processing control section provided in the digital copying machine.
Figure 7:
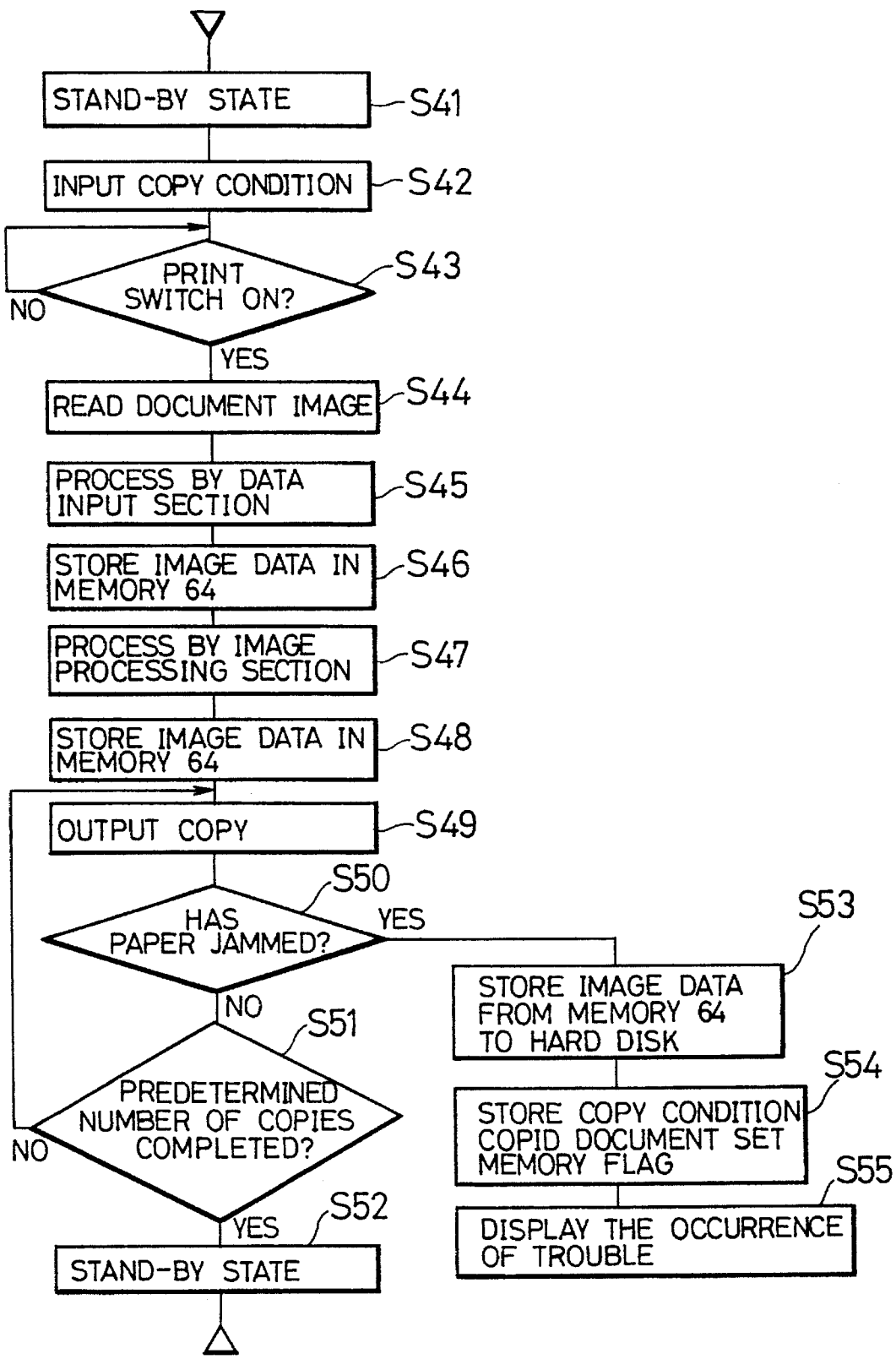
FIG. 7 is a flowchart showing another example of an operation where paper has jammed in producing copies in the digital copying machine.

The image data obtained from the scanner section 11 is outputted after being processed by the image process controlling section shown in FIG. 6. The image process controlling section is provided with an image data input section 61, an image data processing section 62, an image data output section 63, memory 64 composed of a semiconductor memory such as RAM (Random Access Memory), etc., CPU (Central Processing Unit) 65 (operation control means), a hard disk unit 66 (internal memory and image memory), and a RAM 67 (as semiconductor memory).

The image-data input section 61 includes a CCD section 61a, a histogram processing section 61b and an error diffusing section 61c. The image-data input section 61 converts the image data of the document read by the CCD linear image sensor 22 (see FIG. 3) into binary form, and further converts the image data into data of four tones by the error diffusion method while making a histogram. Then, the resulting image data is temporarily stored in the memory 64.

In the error diffusing section 61c, an error diffusing processing which is a type of pseudo-half-tone processing is performed. More specifically, the 8-bit/pixel digital signal input from the CCD section 61a is converted into a 2-bits (four tones) signal by the error diffusion processing method, and relocation is performed for faithfully processing the density of local portions of the document. An error caused by the conversion into the data of four tones is reflected when converting the adjacent pixel into the data of four tones.

The image data processing section 62 includes quantizing sections 62a and 62b, an ⅛ magnifying section 62d, an image processing section 62e, a magnifying section 62f, a contrast transformation section 62g, an error diffusing section 62h and a compressing section 62i. The image data processing section 62 converts the input image data into image data of a form desired by the user. The image data processing section 62 processes the image data until all the image data are converted into the desired form and are stored in the memory 64. The processing sections in the image data processing section 62 do not always perform respective functions but perform when required to.

In the quantizing sections 62a and 62b, the image data having being converted into the form of four binary numbers by the error diffusing section 61c is reconverted into the image data of 256 tones. In the contrast transformation sections 62c and 62g, the relationship between the output density and the input density can be set as desired according to a predetermined contrast transformation table with respect to the respective digital signals of 256 tones. In the ⅛ magnifying section 62d and the magnifying section 62f, the interpolation is performed based on the input data according to a magnification factor specified by a user to obtain pixel data (density level) of target pixels after having been magnified. And, the magnification of the main scanning is changed after changing the magnification of sub-scanning. In the image processing section 62e, various image processing operations are carried out on the inputted image data. The error diffusing section 62f performs a function similar to that of the error diffusing section 61c of the image data input section 61. In the compressing section 62i, the binary data is compressed by run length encoding. The compressing section 62i performs a compression in the final processing loop when the image data to be outputted last is obtained.

The image-data output section 63 includes a restoring section 63a and a laser output section 63b. The image-data output section 63 restores the image data stored in compressed form in the memory 64, reconverts it to the data of 256 tones, and transfers the image data to the laser output section 63b.

More specifically, the image data, having being compressed by the compressing section 62i, is restored in the restoring section 63a. Then, the laser output section 63b converts the digital image data into an ON/OFF signal for switching the semiconductor laser between ON and OFF according to a control signal from a sequence controller, not shown.

A hard disk device 66 includes a hard disk 66b and a disk drive unit 66a. The disk drive unit 66a records and reproduces information on and from the hard disk 66 using a recording and reproducing head that is relatively moved with respect to the hard disk 66b. The hard disk device 66 which employs the hard disk 66b of the magneto-optical disk 66b has a disadvantage of having a lower access speed compared with the semiconductor memory. However, the above hard disk device 66 has advantages of large memory capacity and of being volatile. Therefore, it is suitable as an image memory for use in storing the image data in the digital copying machine 10 of the present embodiment.

The memory 64 temporarily stores the image data that is read by the scanner section 11 and is inputted through the image data input section 61. After having been processed by the image data processing section 62, the image data is stored in the hard disk 66b through the memory 64. The memory 64, for example, has a memory capacity of around 16 M byte that is sufficient for storing the image data contained in several A-4 size sheets. On the other hand, the hard disk 66b has a memory capacity of about 500 M byte which is by far larger than that of the memory 64. Therefore, in the hard disk 66b, the image data thus processed can be stored in sequential order. The image data stored in the hard disk 66b is outputted to the image-data output section 63 through the memory 64 when executing the image forming process onto the sheet.

The RAM 67 is provided for storing therein variable numbers for use in controlling the CPU 65. The RAM 67 is backed-up by another power source such as a battery, etc., so as to maintain the memory content even when the power switch is turned OFF.

Operations by the digital copying machine having the described arrangement of the present embodiment will be explained with reference to the flowcharts of FIG. 1 and FIG. 2. Here, the copying operation is assumed to be carried out with respect to a plurality of documents which are to be automatically fed in correct order by the ADF 15.

Figure 1:
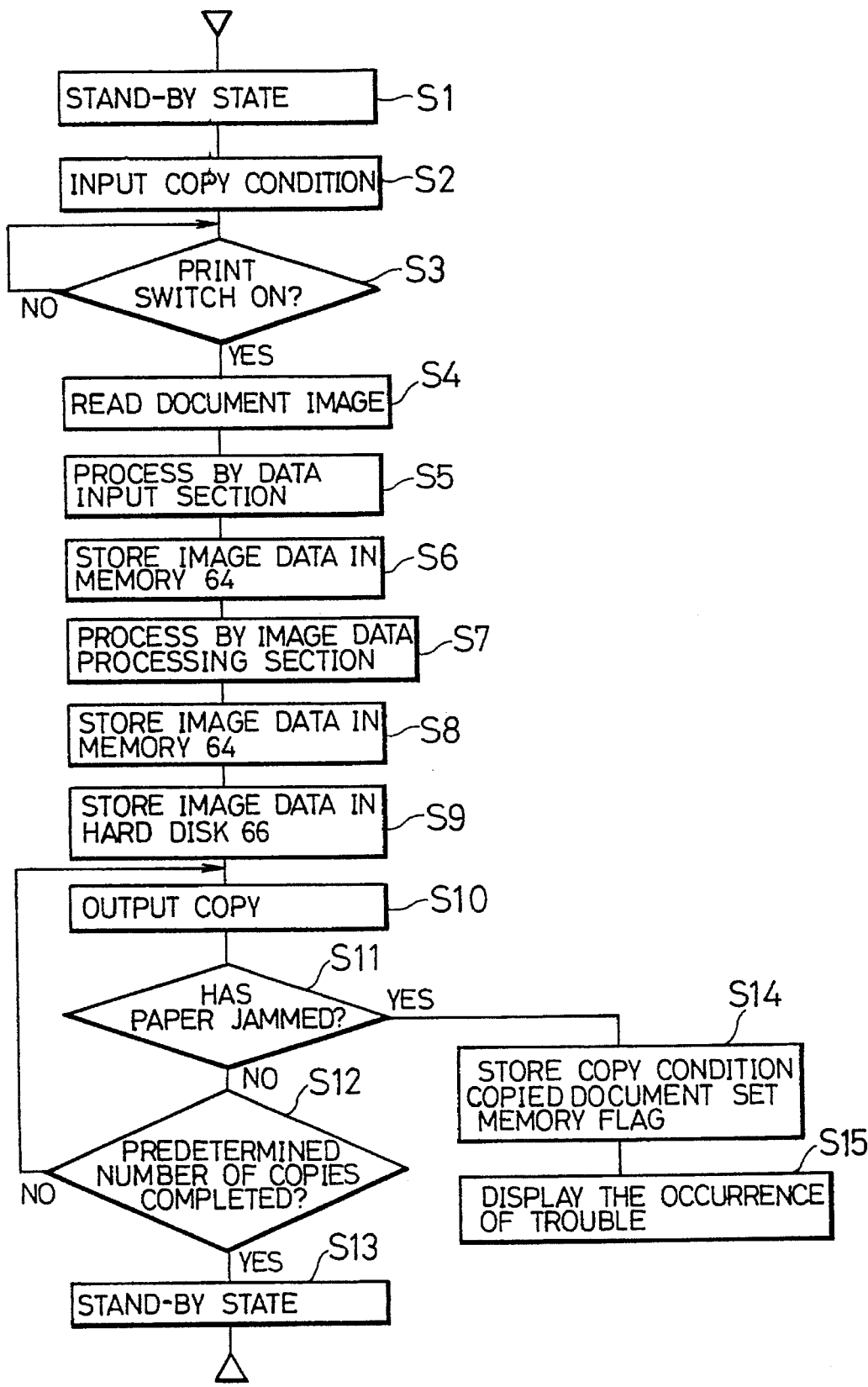
FIG. 1 is a flowchart showing an operation to cope with the situation where paper has jammed when copying in the digital copying machine in accordance with one embodiment of the present invention.

As shown in FIG. 1, in the stand-by position after the power is turned ON (S1), conditions for copying such as copy density, copy magnification, etc., are inputted (S2). When the power switch 50b is switched ON (S3), document images are read by the ADF 15 and the scanner section 11 (S4). The resulting image data is processed by the image data input section 61 (S5), and is stored in the memory (S6). After the image data is processed by the image data processing section 62 (S7), the processed image data is restored in the memory 64 (S8), and is stored in the hard disk 66b (S9).

Thereafter, the image data stored in the memory 64 is outputted through the image data output section 63, and is outputted by producing copies onto the sheet fed from the multi-level paper feeding unit 13 (S10).

If the copies have been produced for the number of documents set in the ADF 15 (S12) without trouble such as paper being stuck or paper jammed, etc., (S11), the copying machine 10 is set in the stand-by state (S13).

On the other hand, if it is detected that the paper has jammed by the jam sensors $S_1$–$S_9$ in S11, the conditions for copying in S2 and the copied documents are stored in the RAM 67, and the memory flag is set (S14). In the display section 50a of the operation panel 50, a display indicating the occurrence of paper being stuck is made (S15).

In S14, the operation for storing the number of copied documents into the RAM 67 can be easily carried out because the image data of the document read by the scanner section 11 is controlled by designating each pate by number, etc., so that each copied document can be easily identified.

When coping with the situation where the trouble of paper being stuck has occurred, the power is switched OFF for the reason of safety. In this case, the data of the RAM 67, that is backed-up by another source and the image data in the hard disk 66b can be maintained. However, the image data in the memory 64 is erased. After the trouble of paper being stuck is solved, the copying operation is restarted from this state in the manner shown in FIG. 2.

Figure 2:
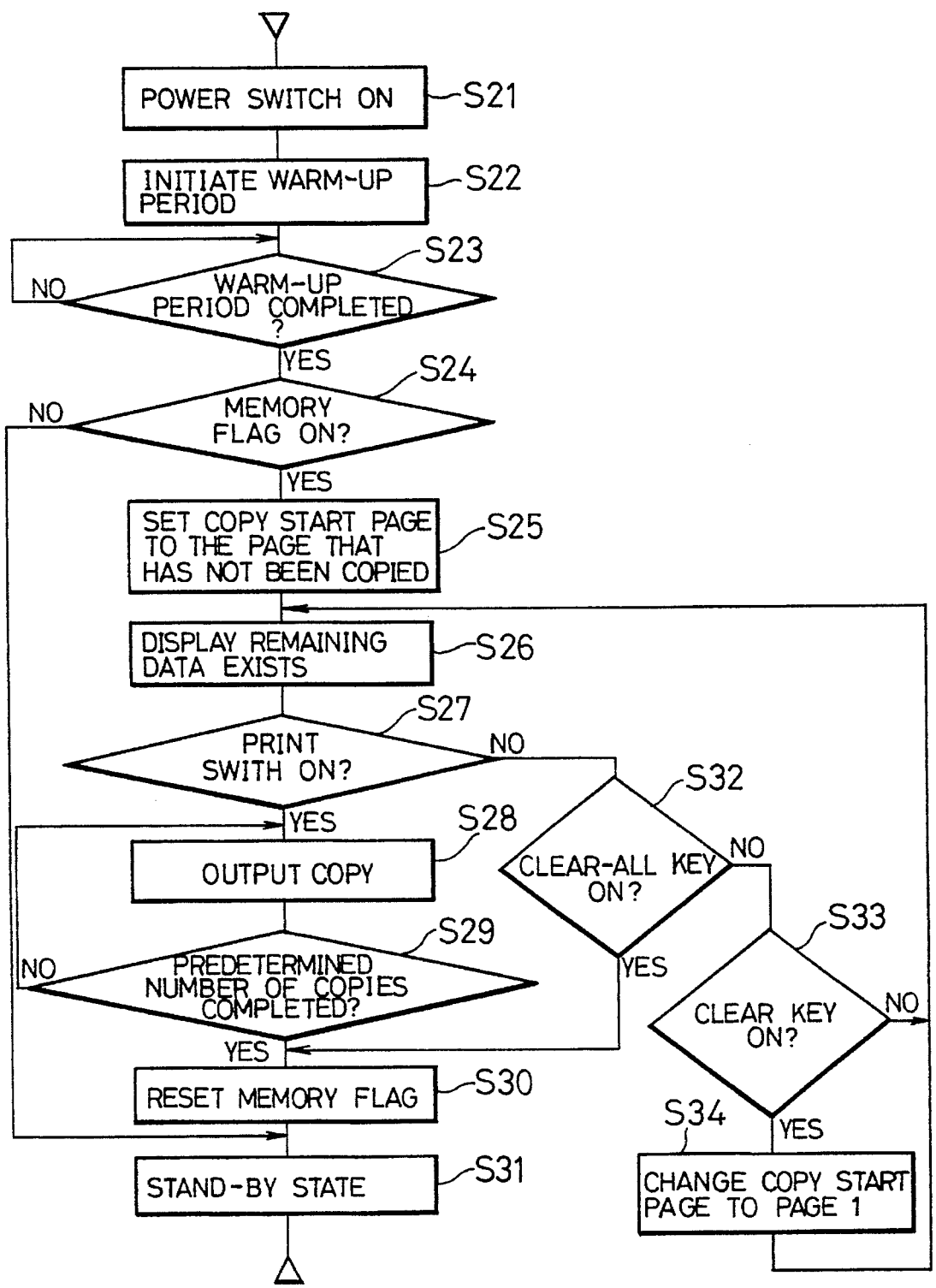
FIG. 2 is a flowchart showing an operation where the problem of paper being jammed is settled in the digital copying machine.

In FIG. 2, when the power is witched ON (S21), the warm-up period is initiated (S22). When the warm-up period is completed (S23), the copying machine is set in the stand-by state. Then, it is determined whether or not the memory flag is set ON (S24). If the result of the determination in S24 is NO, the copying machine is kept in the stand-by state (S31).

On the other hand if the determination in S24 is YES, the first page of the remaining pages, i.e., the pages that have not been produced is set (S25), and a message indicating that the remaining data exists is displayed by the display section 50a (S26).

Thereafter, when the print switch 50b is switched ON (S27), among the image data stored in the hard disk 66b, the image data contained in the remaining pages, i.e., N+1 th page are called in the memory 64 based on the memory in the RAM 67, and based on the image data, the copy output is restarted under the preset conditions for copying based on the above image data (S28). Then, after completing the outputs of the remaining data, i.e., a predetermined number of documents (S29), the memory flag is reset (S30), and is set in the stand-by position (S31).

On the other hand, if the clear all key 50d is set ON before the print switch 50b is set ON in S27 (S32), the memory flag is reset (S30), and it is set in the stand-by position (S31).

Additionally, if in S27, the clear key 50c is set ON before the print switch 50b is set ON (S33), the copy start page is changed to the first page (S34), and the sequence goes back to S26. In this case, in restarting the copy output in S28, the image data contained in the sheet is called from the first disk 66b to the memory 64 from the first page, and the copy output of the image data is carried out.

In the described operations, if the amount of image data contained in the document exceeds the memory capacity of the memory 64, the image data having been processed in the image data processing section 62 is stored in the hard disk 66b in this order. Therefore, when outputting copies, even when paper has jammed in S11, the image data stored in the hard disk 66b can be called in the memory 64 in correct order, thereby enabling the production of the remaining copied images.

In order to store the inputted image data even after the power switch is turned OFF, the following technique can be adopted. When the amount of image data of the inputted document is small, i.e., the number of copies is small, the arrangement shown in FIG. 7 can be adopted in replace of the arrangement shown in FIG. 1. In this arrangement, without carrying out an operation in S9 for storing the image data in the hard disk 66, i.e., the operation to be carried out in the normal copying operation, copy output is carried out based on the image data stored in the memory 64 (S49), and when the paper has jammed (S50), the image data stored in the memory 64 is stored in the hard disk 66b (S53).

In the described arrangement, the operation to be carried out without trouble is simple, and a reduction in the processing speed can be prevented. The operations in S41–S48, S49–S52 and S54 and S55 in S7 respectively correspond to the operations in S1–S8, S10–S13 and S14 and S15 of FIG. 1.

As described, according to the digital copying machine 10 in accordance with the present embodiment, at least when trouble has occurred that requires the power switch to be switched to the OFF position during the producing operation, the inputted image data is stored in the hard disk 66b. Therefore, even when the power switch is turned OFF for copying with the situation, the image data can be maintained. Moreover, after the trouble is settled, the copying operation can be restarted based on the image data stored in the hard disk 66b. This eliminates the troublesome process of re-inputting the image data to be outputted.

Figure 8:
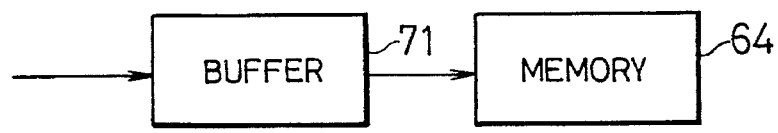
FIG. 8 is a block diagram showing a flow of image data in the memory shown in FIG. 6.

The digital copying machine 10 of the present embodiment is arranged such that the image data of the document, i.e., inputted from the scanner section 11 is directly written in the memory 64. As shown in FIG. 8, however, the inputted image data of the document is temporarily stored in the buffer 71, and then, read out from the buffer 71 so as to be written in the memory 64. Namely, the former arrangement is adopted in the case where the reading speed of the document image data is faster than the writing speed of the image data into the memory 64. Namely, the latter arrangement is adopted when the reading speed of the document image is lower than the writing speed of the image data in the memory 64.

Moreover, in the present embodiment, the RAM 67 is provided separately from the memory 64. However, if the memory region corresponding to the RAM 67 can be ensured in the memory 64, the RAM 67 can be eliminated.

Additionally, in the present embodiment, the hard disk 66b of the recording medium is used as an image memory. However, the suitable medium is not limited to the disk-shaped recording medium, and the card-shaped recording medium may be used as well. Moreover, for the recording medium, it is not limited to the magnetic recording medium, and the magneto-optical recording medium may be used as well.

EMBODIMENT 2

Figure 9:
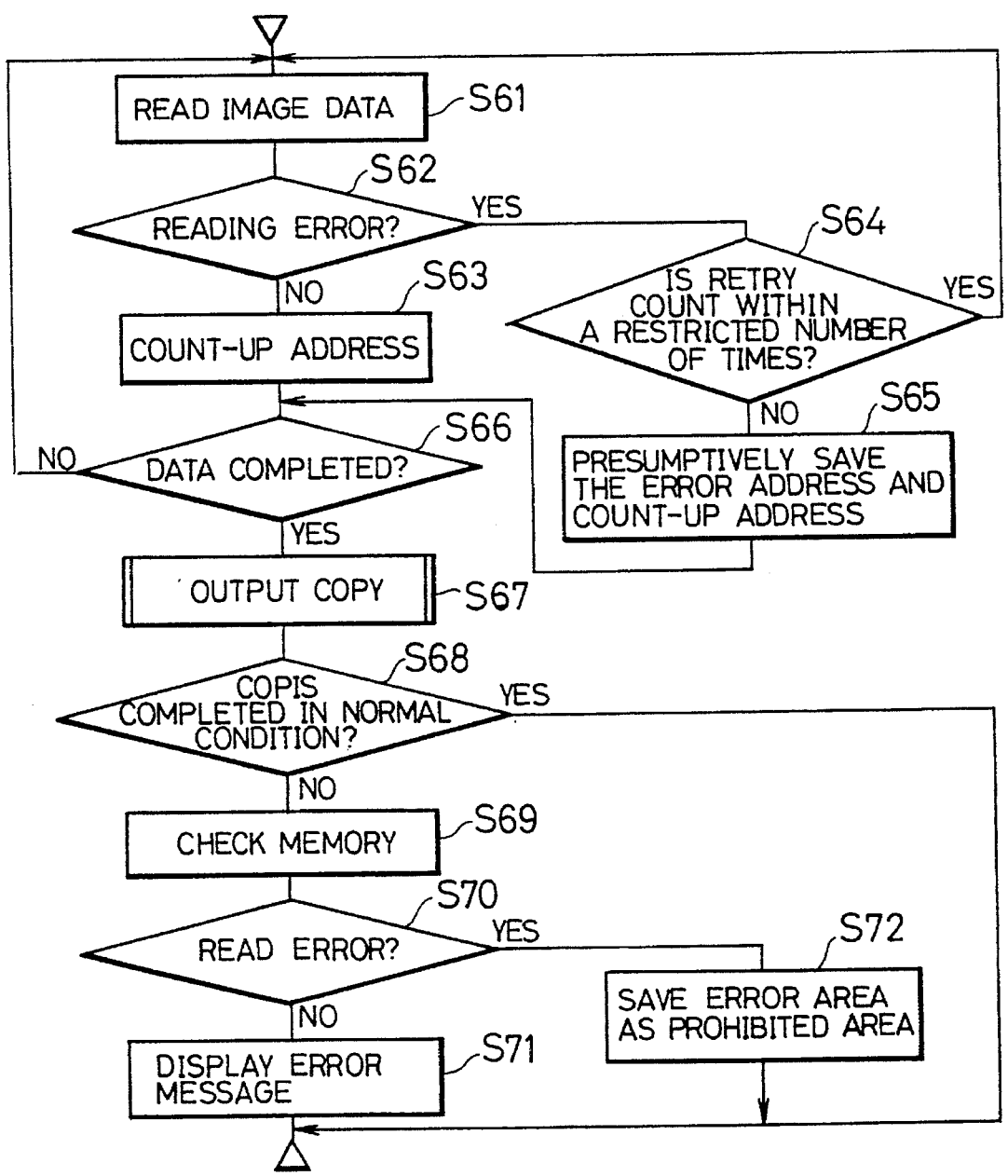
FIG. 9 is a flowchart showing an operation of producing copies of the digital copying machine in accordance with another embodiment of the present invention.

The following description will discuss another embodiment of the present invention with reference to FIGS. 6, 9 and 10. For the sake of convenience, members having the same functions as in the aforementioned embodiment will be designated by the same codes and their descriptions will be omitted.

A digital copying machine 10 in accordance with the present embodiment has a configuration shown in FIG. 6. As shown in FIG. 6, the digital copying machine 10 is arranged such that the image data processed in the image data processing section 62 is read from the memory 64 (semi-conductor memory) and is stored in the hard disk 66b. On the other hand, when producing copies, the image data is read out from the hard disk 66b and is stored in the memory 64, and based on the image data, copies are produced. The digital copying machine 10 of the present invention performs operations shown in FIG. 9 when an error has occurred in the hard disk 66b when reading image data, i.e., when a reading error has occurred.

The reading error includes a seek error, a sector error, etc. More specifically, when a reading operation is performed by setting an address under control, if an inappropriate address is detected when transferring data, it is determined as a reading error. On the other hand, when positioning a recording and reproducing head of a disk drive unit 66a into respective specified blocks, if an inappropriate address has occurred, it is determined as a seek error, while if an inappropriate sector exits due to a scar in the recording medium, it is determined as a sector error.

The determination of reading error including the so-called reading error, the seek error and the sector error is a known technique, and is generally performed by the CPU provided in the inter section of the disk drive unit 66a of the hard disk device 66. Therefore, in the present embodiment, the disk drive unit 66a has a function as an error detection means.

In the operations shown in FIG. 9, when producing copies of the image data stored in the hard disk 66b, the image data is read from the hard disk 66b and is stored in the memory 64 (S61). Here, if no reading error has been detected (S62), an address is counted up (S63), and if the image data has not be read (S66), the sequence returns to S61. On the other hand, if the image data has been read, copies are produced (S67).

If a reading error has been detected in S62, it is determined that a retry count for reading from the area is within a restricted number of times (S64). If the result of the determination is YES, the sequence goes back to S61. On the other hand, if the result of the determination is NO, an address corresponding to the area where the reading error has occurred or an address of the predetermined unit area including the address subject to the reading error is stored in the RAM 67, and is presumptively saved. Then, an address is counted up (S65), and the sequence goes onto S66.

Next, in S67, in the stand-by state after copies have been produced in S67, it is determined whether or not copies have been produced in normal condition without a reading error nor other types of error. If the result of the determination is YES, a copying operation is stopped. On the other hand, if the result of the determination is NO in S68, based on the error address presumptively saved in the RAM 67, the hard disk 66b is checked (S69). Then, if the error is not due to an error in the hard disk 66b, i.e., the reading error (S70), it is determined as another type of errors and an error message indicating so is displayed on the display section 50a (S71). In S69, if it is determined as a reading error, an address of an area in which the reading error has occurred which is stored in the RAM 67 is saved as an inhibited address, meaning that from the next time, the area cannot be used (S72).

Figure 10A:
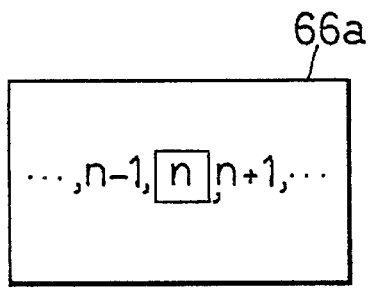
FIG. 10(a) is an explanatory view showing data in each address stored in the hard disk shown in FIG. 6.
Figure 10B:
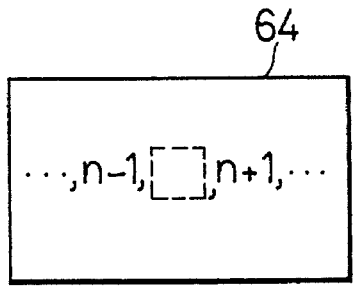
FIG. 10(b) is an explanatory view showing data in each address written in the memory with a reading error from the hard disk.

In the sequential operation of S61→S62→S64→S65→S66, image data is not read out from the address corresponding to the area where the reading error has occurred, i.e., an empty reading. Therefore, as shown in FIG. 10(a), in the case where the image data is stored in the sequential addresses of n-1, n, n+1, if a reading error has occurred in the address n, a reading operation from the address is not performed, and the image data read from the memory 64 becomes blank for the n address as shown in FIG. 10(b). Here, the n address is set to 1 byte unit or 1 sector unit.

Here, the retry of the reading operation when a reading error has been detected in S62 is an operation set in the disk drive unit 66a. In S64, the CPU 65 as an operation control means counts a retired number and controls a retry for the reading operation by the counted number of times.

As described above, in the digital copying machine 10 of the present embodiment, in the copying operation, in the case where a reading error has occurred in reading the image data from the hard disk 66b, a reading operation is tried again within a predetermined number of times from the same address, and if the reading error still remains, the corresponding address is skipped, and the reading operation continues from the next address, and the copying operation is not interrupted by the reading error. Therefore, an adverse effect from the trouble of the reading error is suppressed, and a continuous copying operation can be performed.

When carrying out the above-mentioned operation, missing data may occur from the address corresponding to the reading error. However, since the image data is constituted of a huge volume of document data, even if, for example, data of 1 byte is missing due to the reading error, the amount of missing data occupies only a small portion of the entire image data. As described, information of 1 byte weights very little.

More specifically, for example, information stored in the memory of the computer is composed of coded characters and numbers, and even if only the data of one byte is missing, displacement in digits occurs in numbers and a missing character occurs in characters. Therefore, even if data of 1 byte is missing, it is processed as an error, and thus the operation cannot be continued in this state. Namely, in computers for processing information composed of numbers and characters, the information of 1 byte stored in the memory plays an important role and is significant.

On the other hand, information stored in the memory of the copying machine is, for example, density information for each dot, and information of 1 byte with the resolution of 400 DPI is 63.5 μm. Namely, 16 bytes corresponds to 1 mm. Therefore, even if data of several bytes is missing, it will not affect the copied image very much. Namely, the reading error is not important enough to stop the copying machine, and the digital copying machine 10 of the present embodiment is arranged so as to perform control operations in consideration of the above-mentioned point.

The digital copying machine 10 of the present invention is also arranged such that for the address corresponding to the reading error in the hard disk 66b, a check is performed after the copies have been produced. Then, if it is determined that a reading error has occurred, the area including the area having the error address cannot be used. Therefore, the missing data from the hard disk 66b will not occur again, thereby preventing the image quality from being lowered. Furthermore, since the above mentioned technique is achieved by saving the address corresponding to the reading error as a prohibit address, complicated operations are not needed.

Additionally, although the digital copying machine of the present embodiment is arranged such that an occurrence of a reading error due to the operation error is prevented by retrying a reading operation when a reading error has occurred. However, it is possible to eliminate the retrying process.

EMBODIMENT 3

The following description will discuss another embodiment of the present invention with reference to FIGS. 6 and 9 and FIGS. 11 through 16. For the sake of convenience, members having the same functions as in the aforementioned embodiment will be designated by the same codes and their descriptions will be omitted.

A digital copying machine 10 of the present embodiment has a configuration shown in FIG. 6. In the copying machine 10, the image data processed in an image processing section 62 is read from the memory 64 (semiconductor memory) and is written in a hard disk 66b. When producing copies, image data is read from the hard disk 66b and is written in the memory 64, and copying operations are performed based on the image data. Then, the digital copying machine 10 of the present invention performs operations shown in FIG. 11 and FIG. 12 for an error occurred in the hard disk 66b during the writing operation of the image data in the hard disk 66b, i.e., a writing error.

Here, the writing error includes a seek error and a sector error, etc. When writing in a set address under control, if an inappropriate address is detected when transferring the data, it is determined as a writing error. The seek error and the sector error are as described in the aforementioned embodiment 2.

The writing error is detected by a disk drive unit 66a (error detection means) which is a generally used known technique.

Regarding the writing operation in the hard disk 66b in the case of applying the arrangement shown in FIG. 8 to the hard disk 66b, it is different between the case where the image data is written in the hard disk 66b as image memory via buffer 71 and the case where information is written without via the buffer 71. Regarding the case where a writing error has occurred, it is also different between the case where the writing operation is retried with respect the same memory area and the case where the writing operation is retried with respect to the next memory area.

Figure 11:
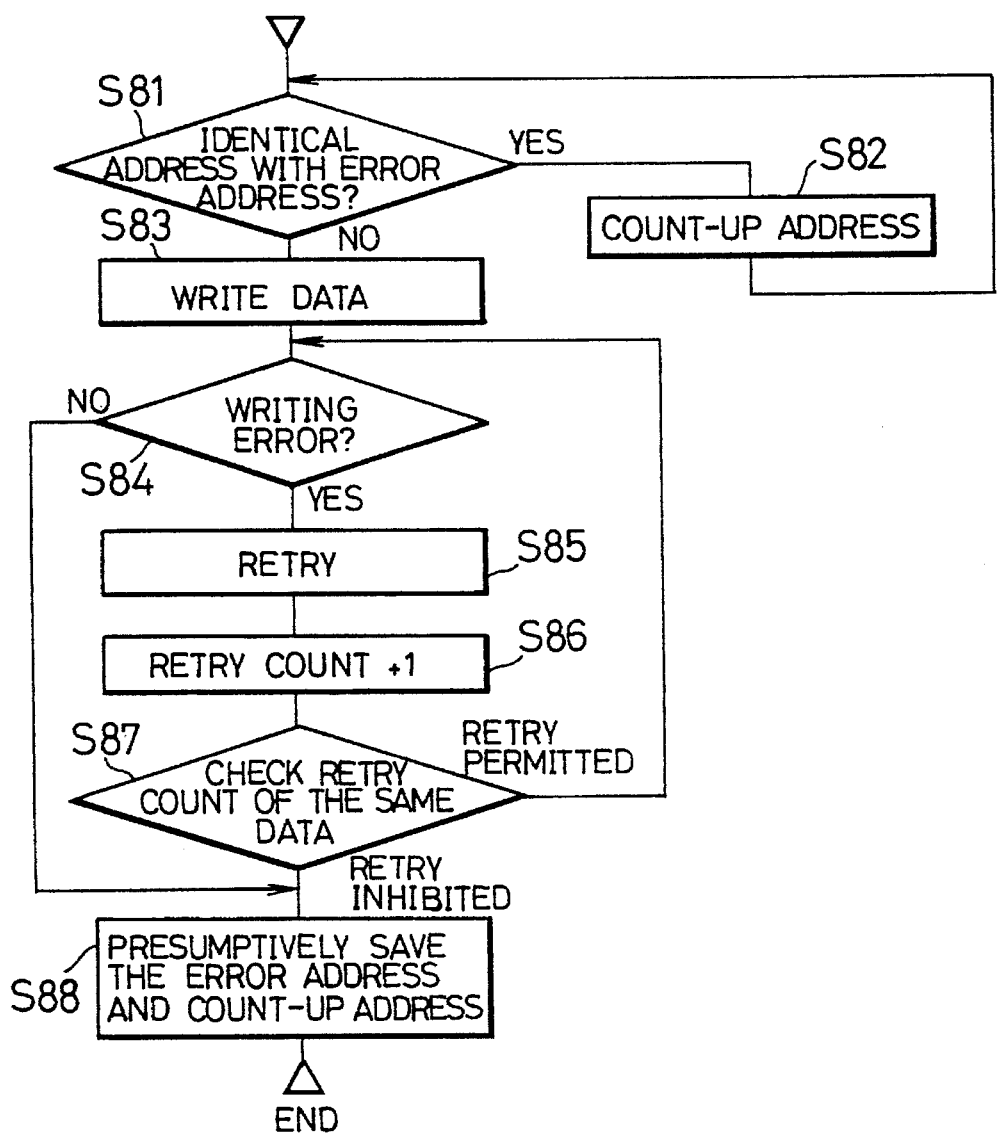
FIG. 11 is a flowchart showing an input operation of the image data in the digital copying machine in another embodiment of the present invention.

An operation shown in FIG. 11 is carried out from the same memory area in which the buffer 71 is not provided.

Namely, in the operation shown in FIG. 11, when writing the image data that is temporarily stored in the memory 64 in the hard disk 66b, first, a writing address is set. Then, it is determined whether or not the address is an identical address with the error address saved in the RAM 67 (S81). If the result of the determination is YES, the address is counted up so that the area cannot be used (S82). The error address is stored in the RAM 67 as the error address, and by this stored error address, an inconvenience in writing the data in the hard disk 66b is prohibited.

On the other hand, if the result of the determination is NO in S81, image data is written in the hard disk 66b (S83), and if the writing error has not occurred (S84), the sequence goes onto S88.

If a writing error has occurred in S84, the writing operation is tried again with regard to the same address (S85), and the retried number of times is counted up (S86).

Thereafter, it is determined whether or not the retry count in the same area is within a restricted number of times (S87), and if so in S87 and the writing operation is permitted to retry again, the sequence goes back to S84. On the other hand, if the retry count exceeds a predetermined number, and another retry is not permitted, an address of the area where an error has occurred is presumptively stored in the RAM 67 (S88). The above mentioned operations are repeated until the input of the image data has been completed.

A retry for a writing operation when a writing error has occurred is an operation set in the disk drive unit 66a, and with the operations in S86 and S87, the CPU (operation control means) permits a retry for a writing operation.

In the above-mentioned operations, the retry for a writing operation when a writing error has occurred is required to be completed at least before the next image data is inputted because a buffer 71 is not provided. Therefore, the retry count is within the restricted number of times in the operation of S87.

Figure 14A:
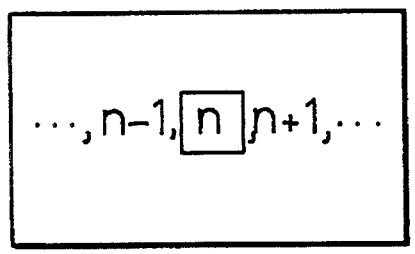
FIG. 14(a) is an explanatory view showing data in each address to be stored in the hard disk shown in FIG. 6.
Figure 14B:
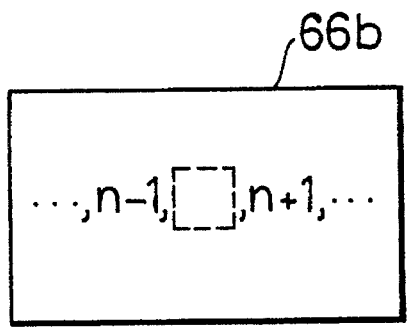
FIG. 14(b) is an explanatory view showing data in each address recorded with writing error in the hard disk.

In the case where the writing error has occurred and the writing error still remains even after the writing operation is tried again, the input image data identified by . . ., n-1, n, n+1, . . . shown in FIG. 14(a) are stored in the hard disk 66b in the state where the data of the address n of the area where an error has occurred is a blank as shown in FIG. 14(b). The address n is set by a unit of 1 byte or 1 sector.

Figure 12:
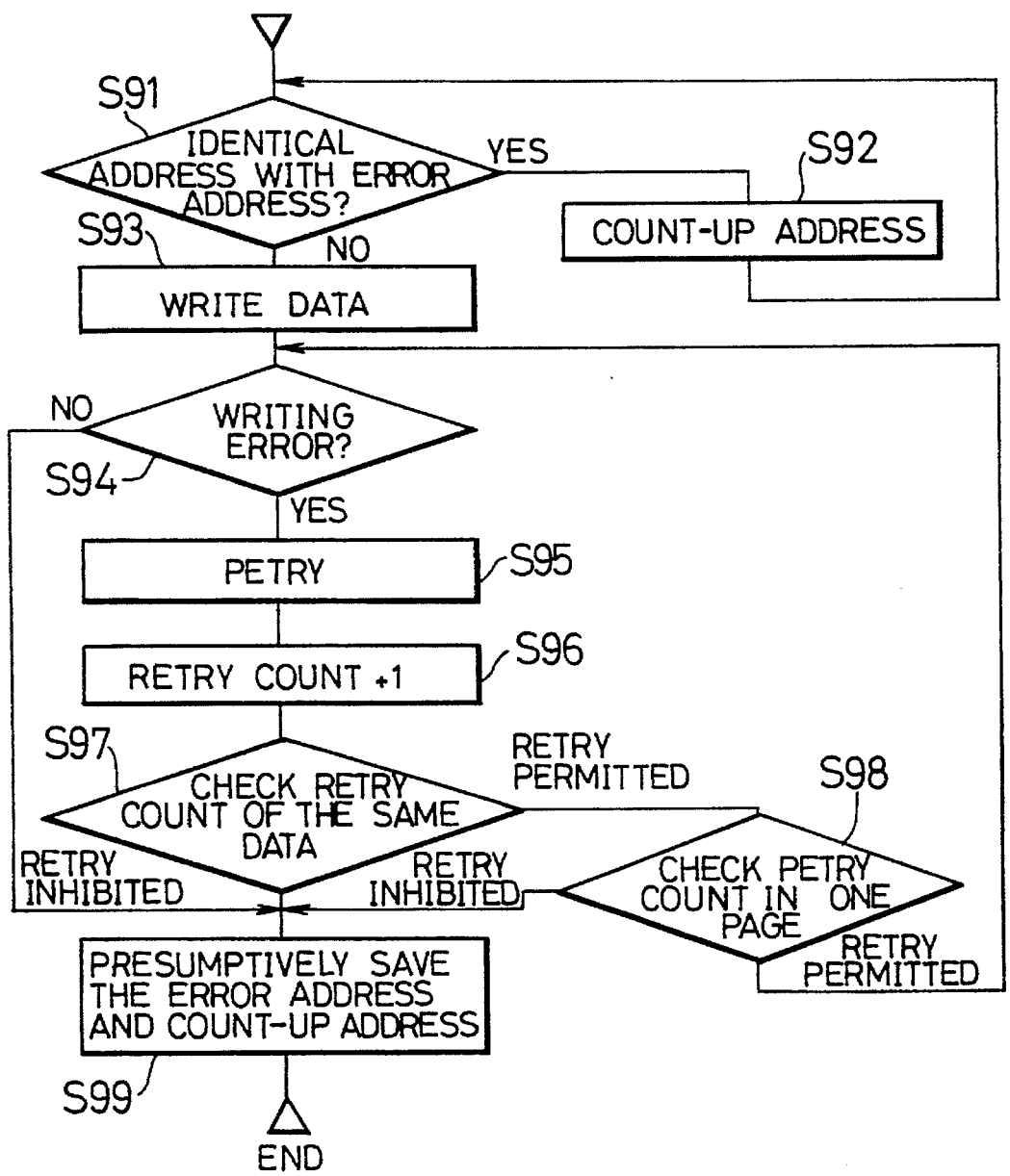
FIG. 12 is a flowchart showing another example of an operation shown in FIG. 11.

On the other hand, an operation shown in FIG. 12 is performed with respect to the recording area in which the buffer 71 is placed and a retry for the writing operation is repeated.

In the flowchart of FIG. 12, if a writing error has occurred in S94, and the retired number for writing in the same area of the hard disk 66b is within a restricted number of times, it is further determined whether or not the retry count in one page of the document is within a restricted number of times. Then, as the result of the determination, if a retry count is within the restricted number of times, and another retry is permitted, and the sequence goes back to S94. On the other hand, if the retry count exceeds the restricted number of times, and another try is not permitted, without carrying out a retry for a writing operation, an address where the error has occurred is presumptively stored in the RAM 67 (S99). The operations in S96–S98 are operations of the control means in the CPU 65. The operations of S91–S99 in the flowchart of FIG. 12 corresponding to the operations of S81–S88 in the flowchart of FIG. 11 except the operation in S98.

In the described operations, the retry count in the same area when a writing error has occurred may be set as desired according to the capacity of the buffer 71. However, if a retry for a writing operation is repeated many times, and the writing operation of the image data in the hard disk 66b is delayed, inputted image data may not be written in the buffer 71. Therefore, a retry for the writing operation can be performed within a restricted number of times contained in one page of the document based on the content of the buffer 71.

Figure 13:
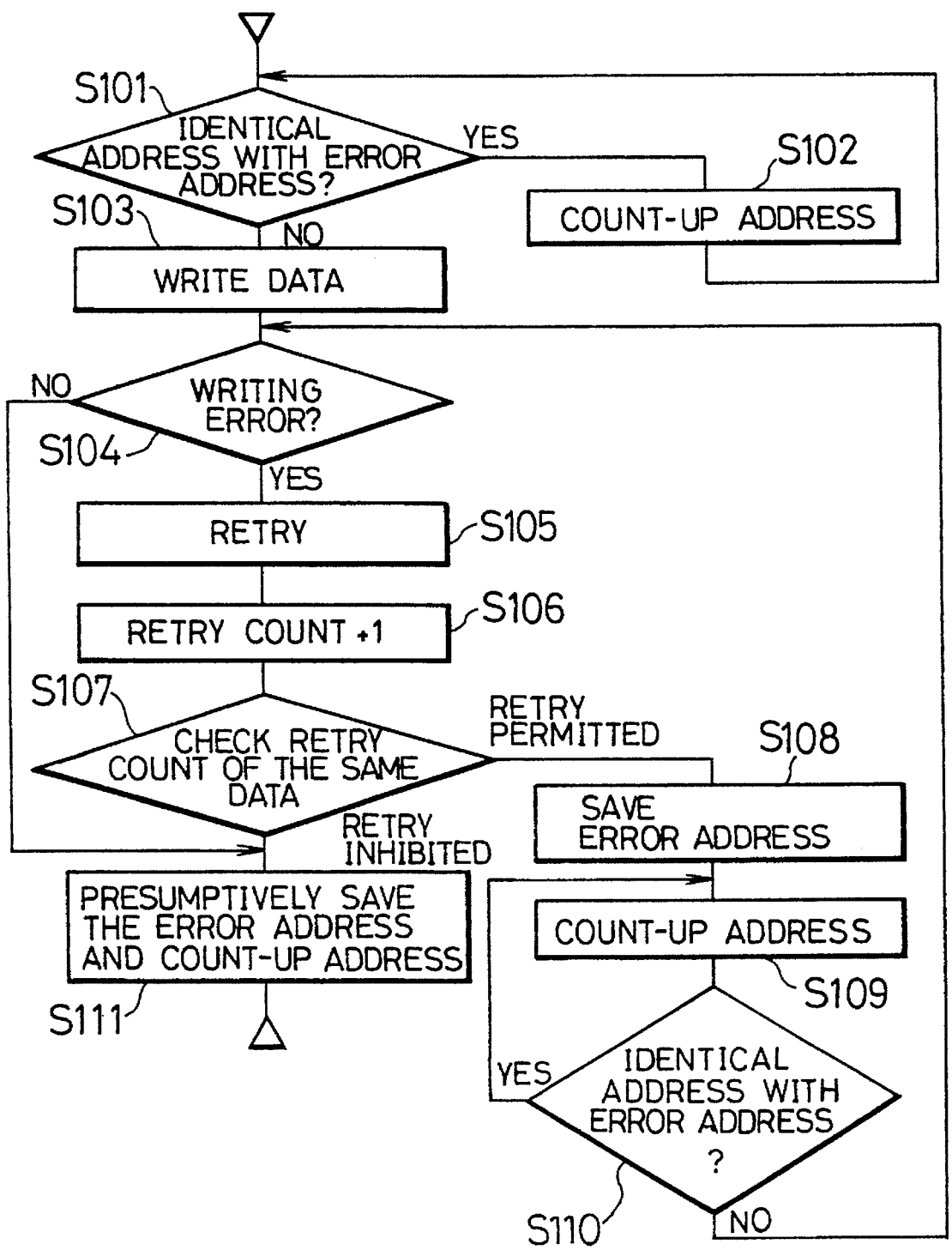
FIG. 13 is a flowchart showing still another example of the operation shown in FIG. 11.

The operations shown in FIG. 13 are performed in order in such a manner that a retry for the writing in the same data is performed with respect to the next memory area in which the buffer 71 is not provided.

In the operation shown in FIG. 13, when writing the image data in the hard disk 66b (S103), if a writing error has occurred (S104), a retry for a writing operation is carried out (S105), and a retried number of times is counted up (S106). Then, it is checked whether or not the retry count for writing in the same data is within a restricted number of times (S107).

As the result of the determination in S107, if the retry count for writing the same data exceeds the restricted number of times, the sequence goes onto S111. On the other hand, if the restricted number of times for writing the same data is within a restricted number of times, an address of the area where the error has occurred is stored in the RAM 67 as an inhibited address (S108), and an address is counted up (S109). Then, if the next address is not an identical address with the address stored in the RAM 67 as an error address, the sequence goes on to S104, and it is determined whether or not a previous retry for the writing operation is a writing error. Then, the following operation is performed based on the result of the determination. The operations in S106, S107, S109 and S110 are performed by the CPU 65 which serves as operation control means.

In the flowchart of FIG. 13, S101 through S106 and S111 are the same as S81 through S86 and S88.

In the described operations, in the case where a writing error has occurred, a retry for a writing operation of the same data is required to be ended before the next image data is inputted since the buffer 71 is not provided. Therefore, the required number is limited to a predetermined number, i.e., a couple of times in S107.

Figure 15:
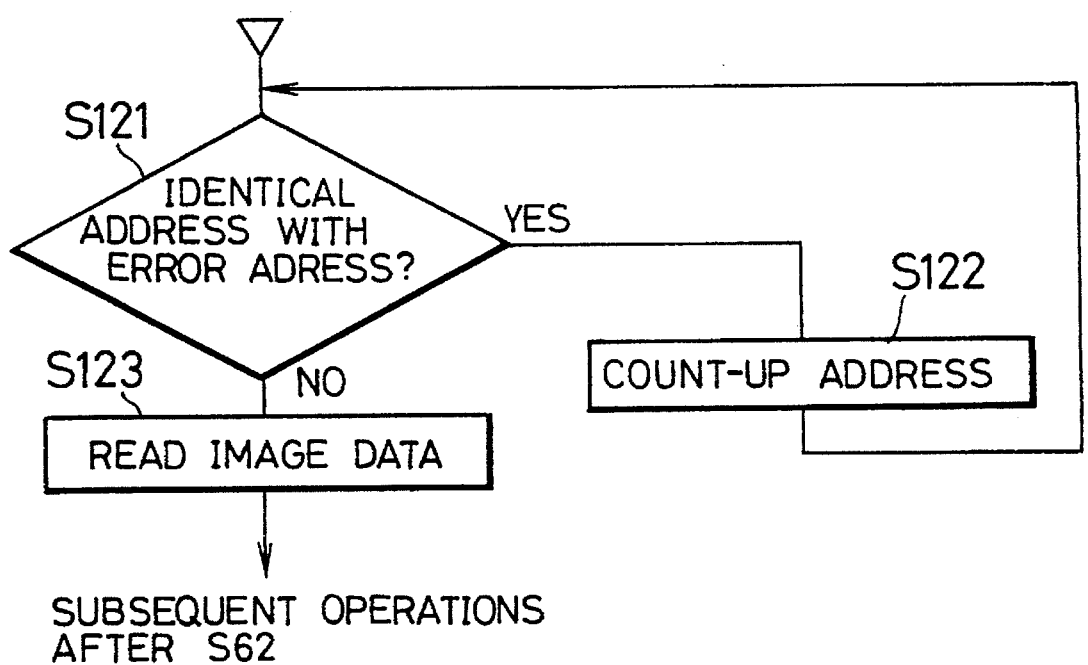
FIG. 15 is a flowchart showing a reading operation of the image data stored in producing copies in the digital copying machine.

In order to produce copies, when reading the image data written in the hard disk 66b, as shown in FIG. 15, first, the address to be read out is set. Then, it is determined whether or not the address is an identical address with the address which is stored in the RAM 67 as an error address (S121). In the operation of S108 of the sequential writing operation of FIG. 13, the above mentioned error address is an error address stored in the RAM 67 in case of a writing error and is stored in the RAM 67 as an error address before the above error address is stored.

If the result of the determination in S121 is YES, an address is counted up (S122). On the other hand, if the result of the determination is NO in S121, a reading operation of the image data is performed (S123). The operation in S124 corresponds to the operation of S61 of FIG. 9. Therefore, subsequent operations after S62 in the figure are performed.

Figure 16:
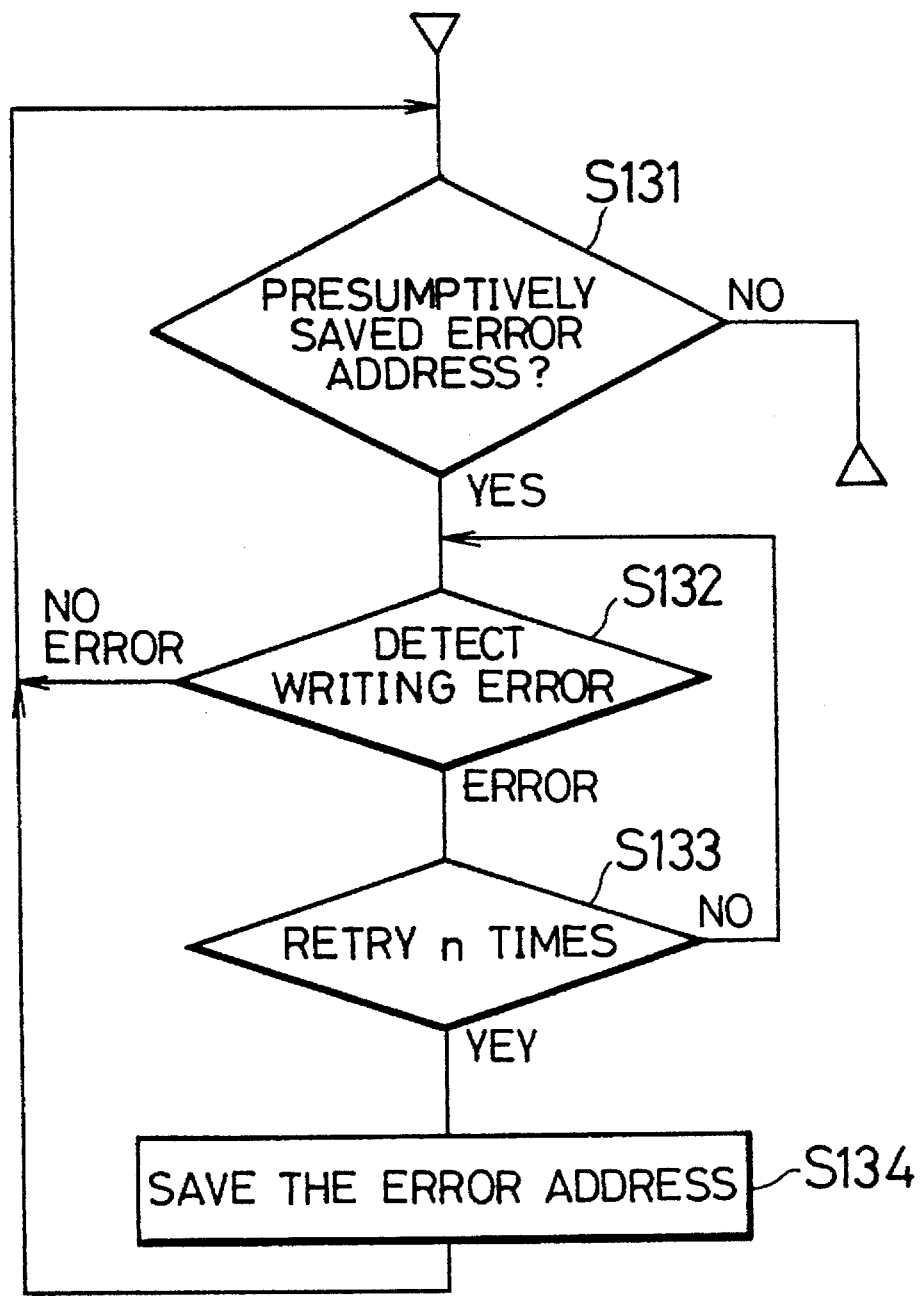
FIG. 16 is a flowchart showing a checking operation of the writing error area after producing copies in the digital copying machine.

After the copy has been produced in S67 of FIG. 9 separately from the operations of S68–S72, as shown in FIG. 16, in the previous writing operation, with regard to the address detected a writing error address after the retry, it is determined whether or not the writing error has occurred accurately. Here, the address corresponding to the writing error is presumptively saved without immediately being saved as an inhibited address because when reading the image data, it is used for comparing the writing address and the reading address.

In the figure, if there exists an error address which is presumptively saved (S131), a writing operation may be performed in the area of the address, and it is determined if the reading error has occurred (S132). Here, if the reading error has not occurred, the address which is presumptively stored is cancelled.

On the other hand, in the writing operations of the image data shown in FIG. 11 through FIG. 13, even if a writing error remains even after the writing operation is tried again within the restricted number of times, the writing operation of the image data is ended, and a writing operation is performed with respect to the next data. Therefore, even if a writing error has occurred, a writing operation of the image data and a reading operation can be performed without being interrupted. Therefore, adverse effects from the trouble of the writing error can be suppressed, and a sequential operation can be performed. Additionally, as in the previous case, the missing image data due to the writing error will not affect the produced images very much.

The digital copying machine 10 of the present embodiment is arranged such that an area having the address corresponding to the address of a writing error in the hard disk 66b is checked after copies have been produced. As the result of the check, if with regard to the address corresponding to the writing error in the hard disk 66b, it is checked after producing copies. Then, if it is determined that the writing error has actually occurred, at least the area including the corresponding error address is determined as an inhibited area. Therefore, the missing data due to the partial lack of the hard disk 66b will not occur in the same address again, thereby preventing the image quality from being lowered. Moreover, an unnecessary writing operation with regard to the address wherein a writing error has occurred can be eliminated.

Additionally, in the operations shown in FIG. 11 through FIG. 13, when a writing error has occurred, a writing operation is tried again so as to prevent an occurrence of a writing error due to an operation error. However, the basic operation may be achieved without a retrying process.

EMBODIMENT 4

The following description will discuss still another embodiment of the present invention with reference to FIG. 6 and FIGS. 17 through 20. For the sake of convenience, members having the same functions as in the aforementioned embodiment will be designated by the same codes and their descriptions shall be omitted.

A digital copying machine 10 in accordance with the present embodiment has a configuration shown in FIG. 6. The inputted image data is written in the hard disk 66b through a memory 64 (semiconductor memory), and when producing copies, the image data is read from the hard disk 66b by a disk drive unit 66a (data reading means and the error detection means), and copies are produced based on the image data. The digital copying machine 10 is further arranged such that in producing copies, operations shown in FIG. 17 are preformed with regard to the error occurred in the hard disk 66b when reading image data from the hard disk 66b, i.e., a reading error.

Figure 17:
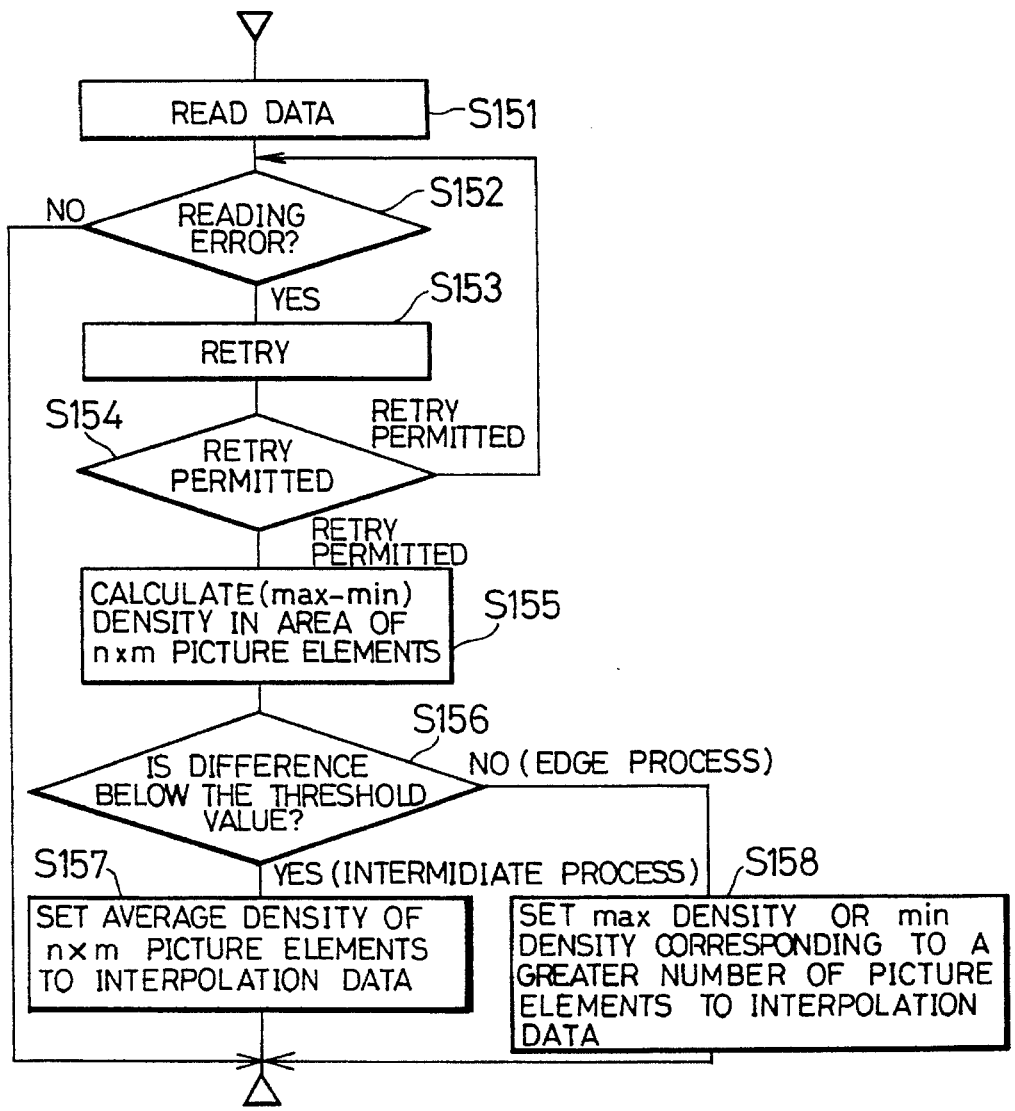
FIG. 17 is a flowchart showing an operation of producing copies of the digital copying machine in still another embodiment of the present invention.

In the processes shown in FIG. 17, first, the image data is read from the hard disk 66b (S151), and if a reading error has occurred (S152), an attempt is made to read the data again from the same address (S153). Next, if a retry count is within the restricted number of times, the sequence goes back to S152, and it is determined whether of not the reading error has occurred again in S153.

Figure 18:
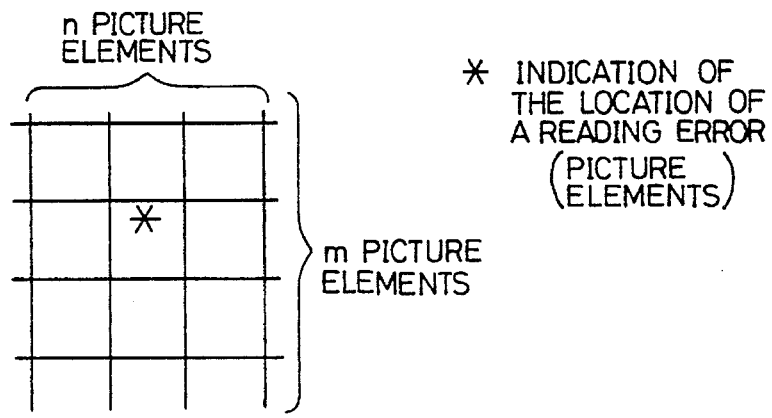
FIG. 18 is an explanatory view showing an interpolating operation of data in the operation shown in FIG. 17.

If the determination in S154 shows that the retry count exceeds the restricted number of times, for example, as shown in FIG. 18, based on the density of the data in the memory area of m×n pixels including the memory area where a reading error has occurred at a substantial center, a difference between a maximum density and a minimum density is calculated (S155), and it is determined if the difference is below a predetermined threshold value (S156).

Next, if the result of the determination in S156 is YES, for the intermediate process, data that suggests an average value for the density of an entire picture element of m×n is set as interpolation data, and based on the interpolation data, the image data in which a reading error has occurred is interpolated (S157). On the other hand, if the result of the determination in S156 is NO, an edge treatment is applied, i.e, between the maximum value and the minimum value respectively indicating the density of the picture element m×n, and the one that shows the density of greater number of picture elements is determined as the interpolation data, and based on the interpolation data, the image data in which a reading error has occurred is interpolated (S158). The above-mentioned processes are repeated until the reading of the image data from the hard disk 66b is completed, and is performed under the control of the CPU 65 as the read control means. On the other hand, the processes in S155–S158 are performed by the CPU 65 that serves as the data interpolation means.

For example, the operations is S156 and S158 will be explained in more details.

Figure 19:
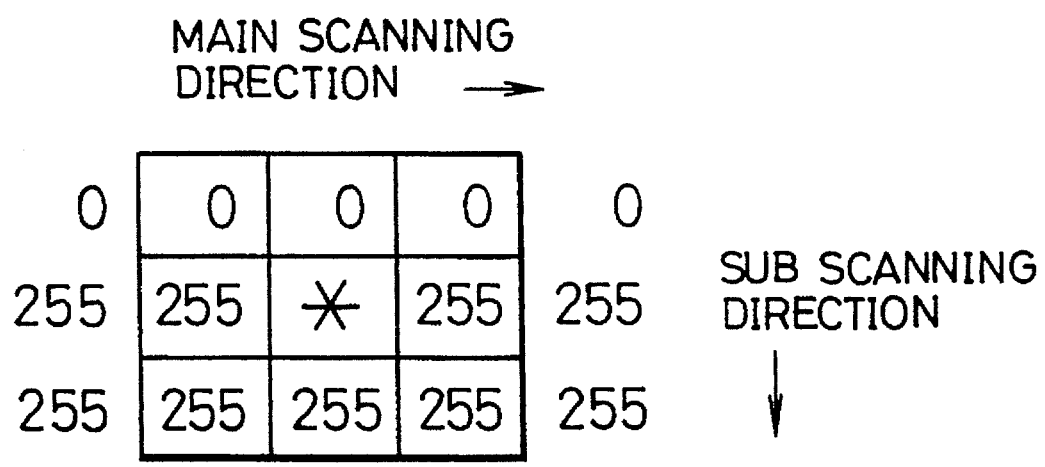
FIG. 19 is an explanatory view showing a concrete example of the operation shown in FIG. 18.

As shown in FIG. 19, image data exists both in a main and sub scanning directions, and when picture elements in an area of 3×3 including the picture element subject to a reading error is set, the maximum density becomes 255, and the minimum density becomes 0, which gives a difference of 255. In the process in S156, if the threshold value is set to 128, the resulted difference of 255 is above the threshold value. Therefore, it is determined that the area of 3×3 picture elements is an edge area, and thus the edge treatment is carried out. In such a case, between the maximum value and the minimum value in the density data, the one corresponding to a greater number of picture elements is set as interpolation data. In this example, the maximum value 255 corresponds to five picture elements, and the minimum value 0 corresponds to three picture elements. Therefore, the interpolation data is set to 255.

Figure 20A:
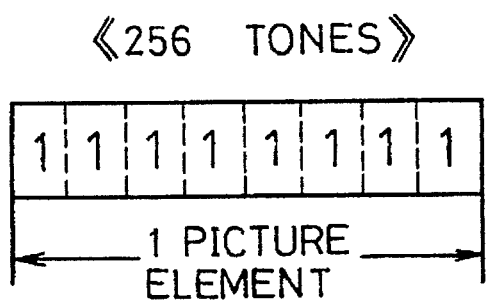
FIG. 20(a) is an explanatory view showing the data interpolation shown in FIG. 17 in the case of 256 tones per picture element.
Figure 20B:
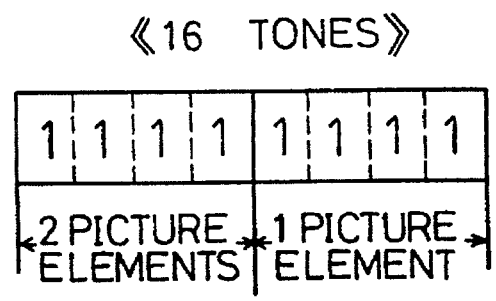
FIG. 20(b) is an explanatory view showing the data interpolation shown in FIG. 17 in the case of 16 tones per picture element.
Figure 20C:
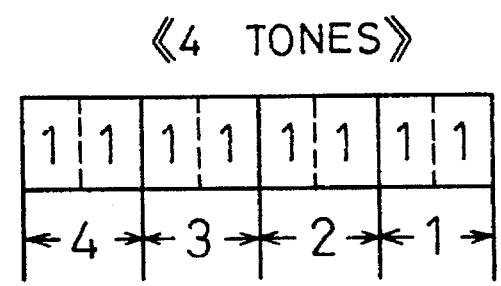
FIG. 20(c) is an explanatory view showing the data interpolation shown in FIG. 17 in the case of 4 tones per picture element.
Figure 20D:
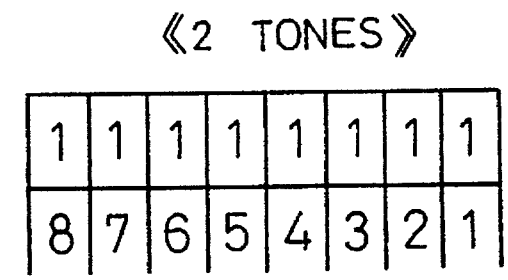
FIG. 20(d) is an explanatory view showing the data interpolation shown in FIG. 17 in the case to 2 tones per picture element.

As described, when each picture element is described by a number selected from 256 digital numbers, one byte corresponds to 8 bits. Therefore, as shown in FIG. 20(a), for the error data, data interpolation of one picture element is performed for each picture element. In other cases, for example, an interpolation process is carried out in the following manner: when each picture element is described by a number selected from $2^{16}$, one byte corresponds to 2 picture elements as shown in FIG. 20(b), when each picture element is described by a number selected from $2^4$, one byte corresponds to four picture elements as shown in FIG. 20(c), and when each picture element is described by a number selected from $2^2$, one byte corresponds to eight picture elements as shown in FIG. 20(d).

As described, according to the digital copying machine 10 of the present embodiment, when producing copies, if a reading error has occurred during the reading operation of the image data from the hard disk 66b, an attempt is made again to read the data from the corresponding recording region within a restricted number to times. As a result, even if the reading error still remains, the reading operation can be continued by applying an interpolation from the image data surrounding the image data subject to a reading error in the memory region. As a result, adverse effects from the trouble of reading error can be suppressed, and copies can be continuously produced. As to the image data in the area subject to the reading error, as the interpolation of data is applied, the image quality of the produced images is prevented from being lowered.

The explanations of the present embodiment have been given through the case where an interpolation is given to the image data of high density, i.e., the mono-color image data. However, the present invention is also applicable to the color image data in a full-color copying operation.

EMBODIMENT 5

The following description will discuss still another embodiment of the present invention with reference to FIG. 6 and FIGS. 21 through 23. For the sake of convenience, members having the same functions as in the aforementioned embodiment will be designated by the same codes and their descriptions will be omitted.

A digital copying machine in accordance with the present embodiment has a configuration shown in FIG. 6. In the digital copying machine 10, the inputted image data is written in the hard disk 66b through the memory 64 as explained in the embodiment 2, and when producing copies, the data is read from the memory 64 and is written in the hard disk 64, and copies are produced based on the image data. In the digital copying machine 10, when producing copies, the process related to a reading error is performed as shown in FIG. 21.

Figure 21:
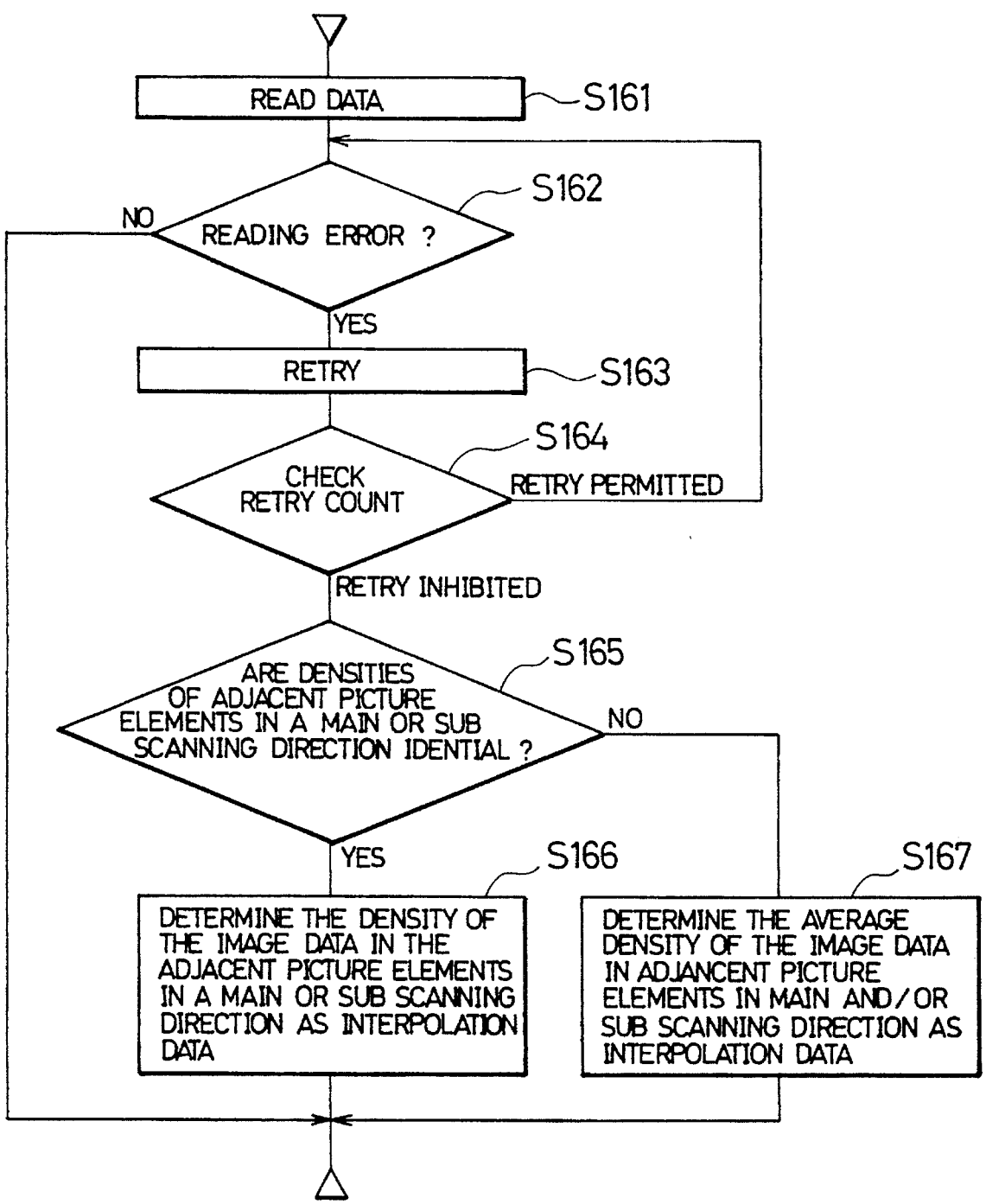
FIG. 21 is a flowchart showing an operation of producing copies in the digital copying machine in accordance with another embodiment of the present invention.
Figure 22A:
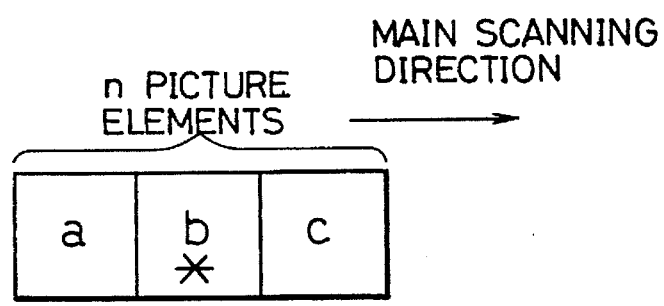
FIG. 22(a) is an explanatory view showing picture elements aligned in the main scanning direction, to be used in the explanation of the data interpolating operation shown in FIG. 21.
Figure 22B:
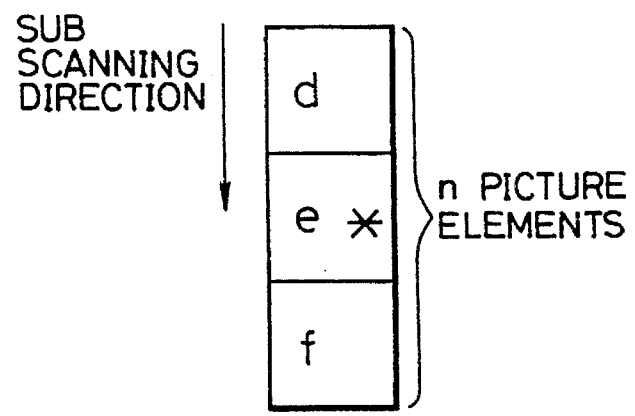
FIG. 22(b) is an explanatory view showing picture elements aligned in the sub scanning direction, to be used in the explanation of the data interpolating operation shown in FIG. 21.

In the processes shown in FIG. 21, when a reading error has occurred in S162, and if the retry count exceeds the restricted number of times as the result of the determination in S164, it is further determined whether or not the picture elements in a main or sub scanning direction of n picture elements on both sides of the address (picture element) subject to the reading error have the same density (S165). More specifically, when the picture element N is set to 1, in picture elements a–c aligned in the main scanning direction shown in FIG. 22(a), it it determined whether or not the picture elements a and c adjacent to the picture element b subject to the reading error have the same density.

Next, in this determination, as shown in FIG. 23(a), if the picture elements a and c on both sides in the main scanning direction and the picture elements d and f on both sides in the sub scanning direction are identical, or the density is determined as the interpolation data, and by this data, the image data subject to the reading error is interpolated (S166).

In the determination, as shown in FIGS. 23(b) and (c), if the picture elements a and c in the main scanning direction and the densities of the picture elements d and f in the sub scanning directions are different, the average density of the picture elements a and c or the average density of the picture elements d and f or the average density of the picture elements a, c, d, and f is determined as interpolation data, by the data, the image data subject to the reading error is interpolated (S167). The above explanations are repeated until the image data to be read from the hard disk 66b is ended. This is done under the control of the CPU 65 as the readout control means. The operations in S165 and S167 are the operations by the data interpolation means in the CPU 65.

The processes in S161–164 shown in FIG. 21 are the same as the processes S151–S154 in FIG. 17. For the reasons described above, if the number of tone in each picture element is different, the number of picture elements to be interpolated in one byte is different as in the aforementioned manner.

As described, according to the digital copying machine 10 in accordance with the present embodiment, in the copying operation, if an error has occurred in reading image data from the hard disk 66b, a retry for reading the data from the same memory region is made within a restricted number of times. If the reading error still remains even after carrying out a retry for reading the data within the restricted number of times, the reading operation can be continued by interpolating the image data at least in the main scanning direction or in the sub-scanning direction. According to the above arrangement, since adverse effects from the reading error on the copying operation can be prevented, a copying operation can continue, thereby preventing quality of the image of the produced copies from being lowered.

The described interpolating operation is also applicable to color image data in a full-color copying operation as in the case of the described embodiment 4.

EMBODIMENT 6

The following description will discuss another embodiment of the present invention with reference to FIG. 3, FIG. 6, FIG. 24 and FIG. 25. For the sake of convenience, members having the same functions as in the aforementioned embodiment will be designated by the same codes and their descriptions will be omitted.

A digital copying machine 10 in accordance with the present embodiment is applicable to a full color copying operation. Therefore, a CCD linear image sensor 22 shown in FIG. 3 is applicable to color copying, and a developer unit 27c supplies toner in yellow, magenta and cyan separately.

The image read by the CCD linear image sensor 22 is determined as digital image data in each color of read, green and blue according to the light intensity, and is processed by the image process controlling section shown in FIG. 6. In the image processing section, the image data is processed in the same manner as those described in Embodiment 2. A full-color copying process is performed by a known process. In the digital copying machine 10, processes shown in FIG. 24 are performed when a reading error has occurred.

Figure 24:
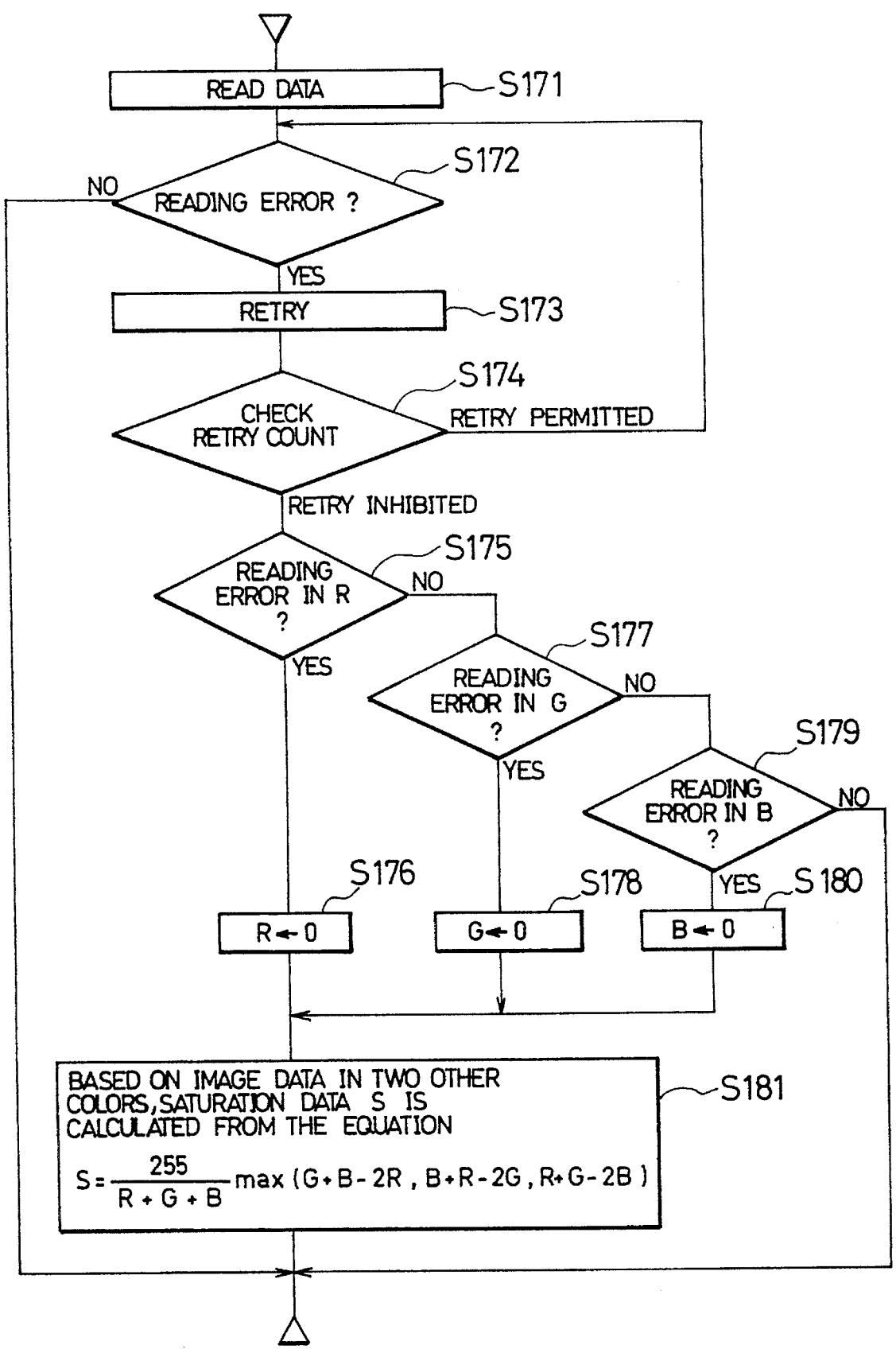
FIG. 24 is a flowchart showing an operation of producing copies in the digital copying machine in accordance with another embodiment of the present invention.

Regarding the operations in FIG. 24, if a reading error has occurred in S172 and if a retry count exceeds a restricted number of times as the result of the determination in S174, the image data containing a missing color is interpolated using other two colors which determine the color of the portion of the image data corresponding to the missing color.

Namely, when the missing color of the image data subject to the reading error is R (S175), the data is set to zero (S176). When the missing color in the image data subject to the reading error is G (S177), the data is set to zero (S178). Similarly, when missing color in the image data subject to the reading error is B (S179), the data is set to zero (S180). Next, by the image data in two other colors, the saturation data which determines the color of the image data subject to the reading error is calculated. The saturation data shows a brightness in color at the portion where the reading error has occurred. Based on the described obtained saturation data, the image data subject to the reading error is interpolated (S181).

$$S=[255/(R+G+B)]\times max(G+B-2R, B+R-2G, R+G-2B)$$

The above-explained operations are repeated until the reading operation of the image data from the hard disk 66b is completed. Additionally, the operations are performed under the control of the CPU 65 as reading control means. Additionally, operations in S175–S181 are performed by the data interpolation means in the CPU 65. Here, the operations in S171–S174 of FIG. 24 are the same as the operations S151–S154 of FIG. 17.

As explained, according to the digital copying machine 10 in accordance with the present invention, if a reading error has occurred during the reading operation of the image data from the hard disk 66b, a retry is performed from the memory region within a restricted number of times, and if a reading error still remains, the image data including a missing color subject to the reading error is interpolated using other two colors which determined the missing color so that the copying operation can be prevented from being interrupted due to the reading error. Therefore, adverse effects from the reading error can be is prevented, and a copying operation can continue. Regarding the image data subject to the reading error, although it is difficult to interpolate the color data, the saturation data can be interpolated, there preventing quality of the color image from being interpolated.

According to the described interpolation, regarding the area subject to the reading error, although the saturation data is interpolated, the interpolation of the appropriate color data is not performed. However, a still improved interpolation is enabled by combining the following interpolation data; interpolation data for use in the interpolating operation, the interpolation data explained in embodiment 4 in interpolating the image data subject to the reading error by the image data adjacent to the image data (hereinafter referred to as the first interpolation data); and the interpolation data for interpolating the image data at least in the main scanning direction or the sub scanning direction (hereinafter referred to as the second interpolation data).

Figure 25:
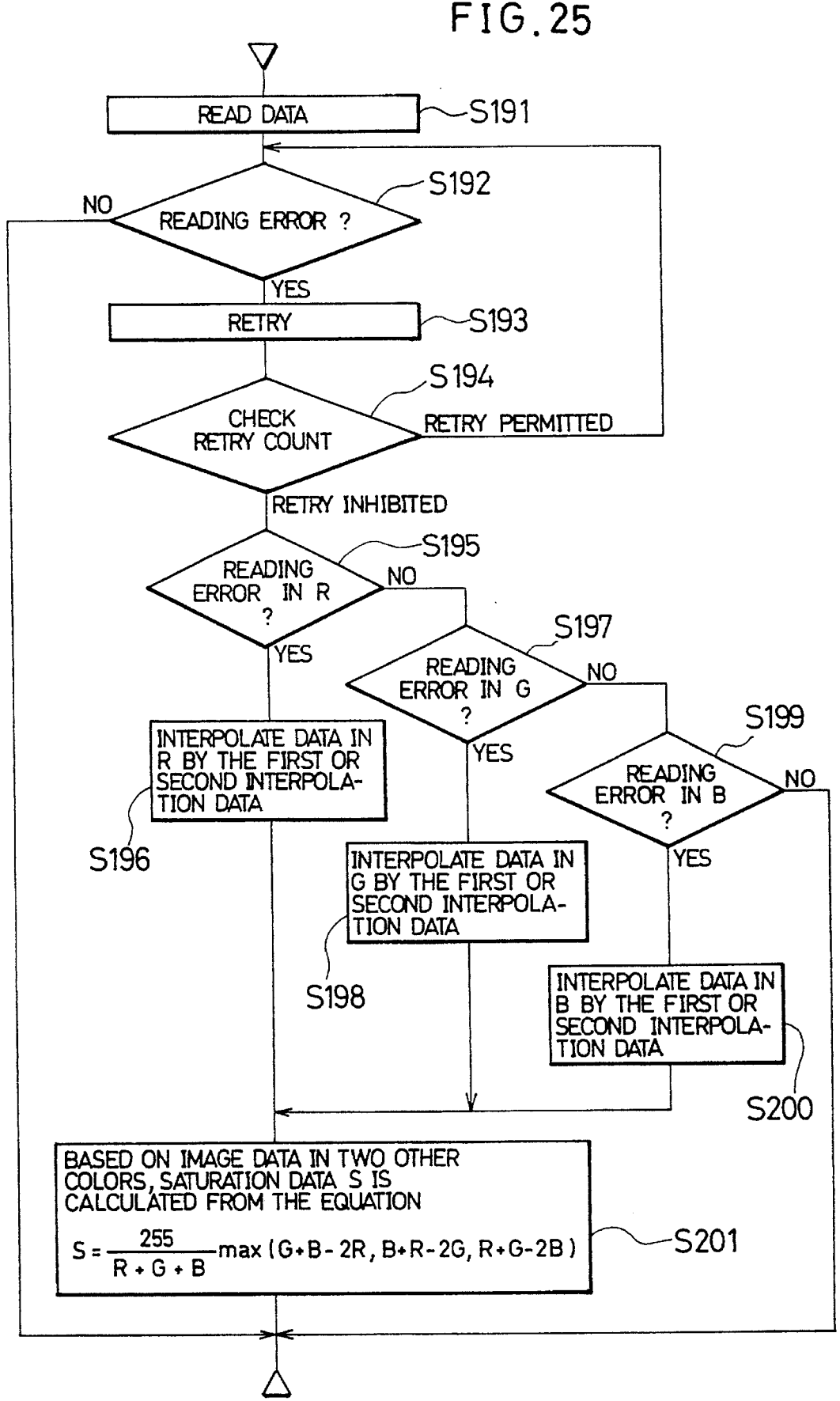
FIG. 25 is a flowchart showing another example of an data interpolating operation shown in FIG. 24.

Namely, as shown in FIG. 25, the image data subject to the reading error is the image data in R, G or B which determines the color of the image data subject to the reading error together with other two colors (S195, S197 and S199), the first or the second interpolation data can be prepared (S195, S198 and S200), and the saturation data S is prepared (S201). By the saturation data S and the first or second interpolation data S, the image data subject to the reading error is interpolated.

According to the described interpolation, even when the reading error have occurred in all the image data in R, G and B in the same portion of the image data, the image data in color close to the original color can be achieved by the interpolation.

EMBODIMENT 7

A still another embodiment of the present invention will be explained with reference to FIG. 6 and FIG. 26. For the sake of convenience, members having the same functions as in the aforementioned embodiment will be designated by the same codes and their descriptions will be omitted.

A digital copying machine 10 in accordance with the present embodiment has a configuration shown in FIG. 6. In the digital copying machine 10, the inputted image data is written in the hard disk 66b through the memory 64 via a path explained in embodiment 2, and copies are produced in the following manner. Image data is read from the hard disk 66b and is written in the memory 64, and copies are produced based on the image data. According to the digital copying machine 10, an operation shown in FIG. 26 is performed with regard to the reading error.

Figure 26:
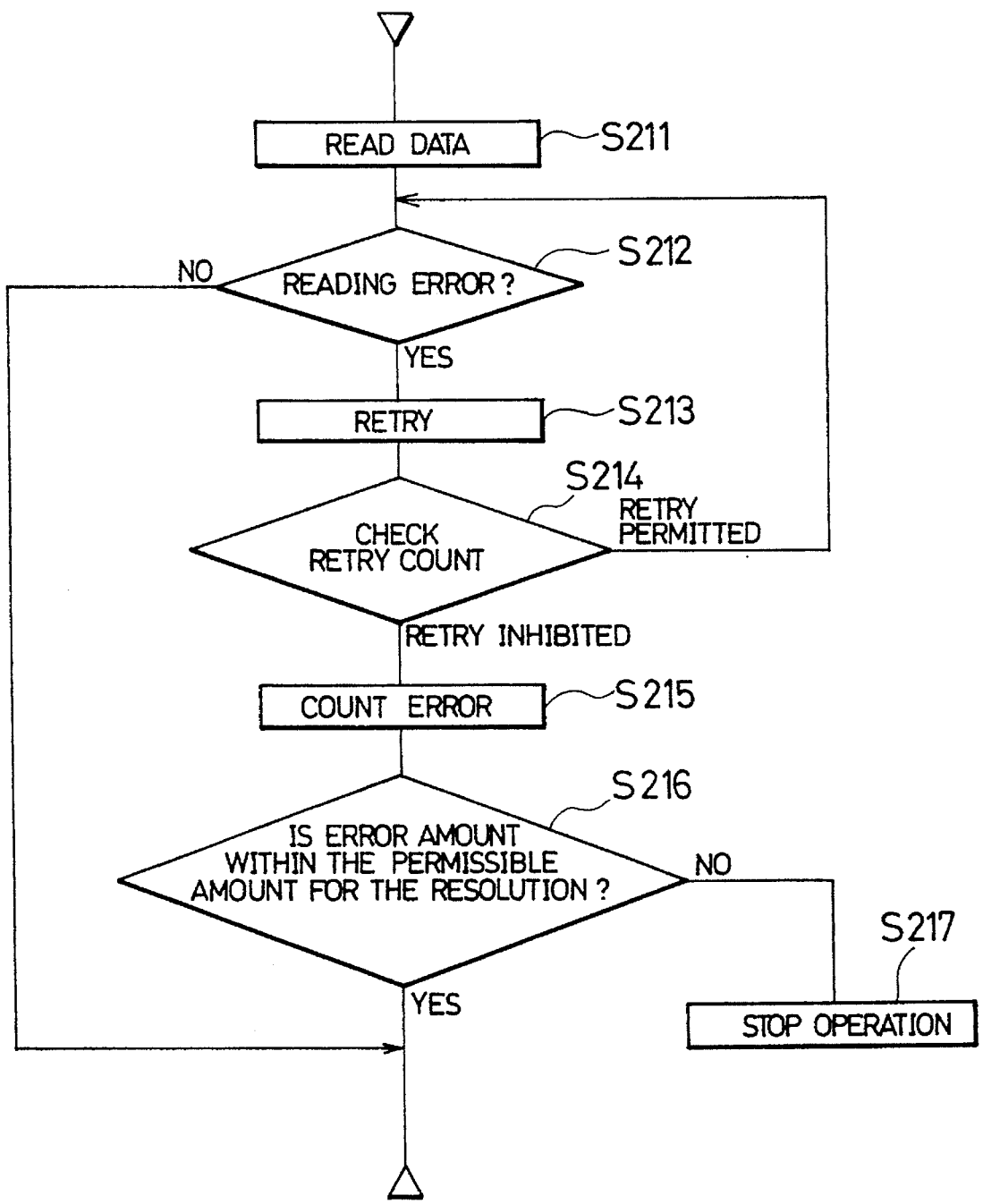
FIG. 26 is a flowchart showing an operation of producing copies in the digital copying machine in accordance with still another embodiment of the present invention.

In the operations shown in FIG. 26, if a reading error has occurred in S212, and a retry count exceeds a restricted number of times as the result of determination in S214, the number of reading error is counted (S215), and it is determined whether or not the amount of error remaining after the retry is within a permissible amount set according to the resolution of the digital copying machine (S216).

The permissible amount is set in proportion to the resolution of the digital copying machine 10, and when the resolution is high, the permissible amount becomes large. On the other hand, when the permissible level is low, the permissible amount becomes small. This is because the digital copying machine 10 of high resolution has smaller effects from the missing data caused by the reading error. When comparing a copying machine of high resolution which enables 10 small characters to be printed in 1 cm, and a copying machine of low resolution which enables only one big character to be printed in 1 cm, it becomes clear that the effect of the missing data of one character on the image data is smaller in the case of the copying machine of high super resolution. The super resolution may differ for each state of inputting image data, processing the image data in an internal section, and outputting the image data. In this case, the permissible amount is determined based on the lowest resolution.

The counting of the number of reading errors in S215 is performed based on the number of reading errors sequentially occurred, a number of reading errors occurred in the predetermined area or a number of reading errors occurred in one page.

As the result of the determination in S216, if the error amount is within the permissible amount, the address subject to the reading error is ignored, and the address to be readout is counted up and is returned to S211 as in the described processes in S65 of FIG. 9. Alternatively, the sequence may go back to S211 after carrying out the interpolation processes in S155–S158 shown in FIG. 17, S165–S167 shown in FIG. 21, and S175–S181 shown in FIG. 24 and S195–S201 shown in FIG. 25.

As the result of the determination S216, if the amount of error exceeds the permissible amount, the reading operation of the image data from the hard disk 66b, i.e., the copying operation is stopped (S217). The operations in S216 and S217 are performed under the control of CPU 65 (operation control means). The operations (S211–S214) in FIG. 26 are the same as the operations (S151–S154) in FIG. 17.

According to the digital copying machine 10 in accordance with the present embodiment, during the copying operation, if a reading error has occurred when reading image data from the hard disk 66b, a retry for reading the data from the memory region is carried out within a restricted number of times. Thereafter, an amount of remaining reading error is counted. When the amount of reading error exceeds a permissible amount set according to the resolution of the copying machine 10, the image data is read from the hard disk 66b, i.e., the copying operation is stopped. Therefore, when the amount of reading error is within the permissible amount, the effect from the reading error can be prevented, and the copying operation can be continued. On the other hand, when the amount of reading error exceeds the permissible amount, copies of the image with low quality can be prevented. Moreover, since the permissible amount is set according to the resolution of the copying machine 10, the effect from the reading error can be controlled.

In the present embodiment, when the reading error has occurred, a retry for reading the image data is performed. However, it is possible to eliminate this process.

EMBODIMENT 8

A still another embodiment of the present invention will be explained with reference to FIG. 6 and FIG. 27. For the sake of convenience, members having the same functions as in the aforementioned embodiment will be designated by the same codes and their descriptions will be omitted.

A digital copying machine 10 in accordance with the present embodiment has a configuration shown in FIG. 6. In the digital copying machine 10, an operation shown in FIG. 27 is performed. In the operation shown in FIG. 27, the operation in S226 is performed in addition to the operation in S216. Other than the above, the operations in FIG. 27 are same as the operations shown in FIG. 26.

Figure 27:
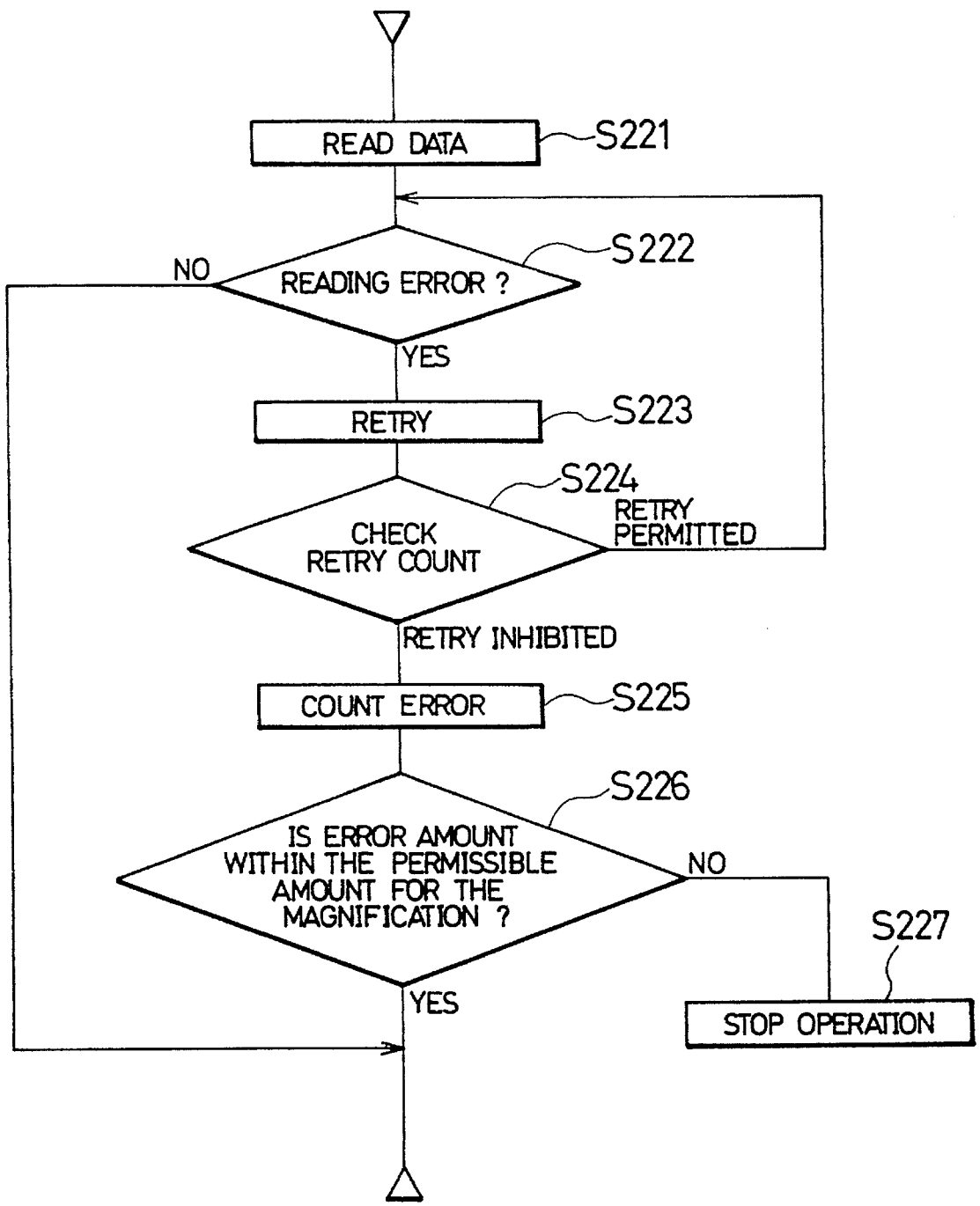
FIG. 27 is a flowchart showing an operation of producing copies in the digital copying machine in accordance with still another embodiment of the present invention.

Regarding the operations shown in FIG. 27, if a reading error has occurred in S222, and if the retry count exceeds the restricted number of times as the result of the determination in S224, a reading error is counted (S225). Then, it is determined whether or not the amount of reading error after the retry is within the permissible amount set according to the magnification of the copy output image (S226). As the result of the determination, if the permissible amount exceeds the amount of the reading error, the image data from the hard disk 66b is read, i.e., a copying operation is stopped (S227).

A permissible amount is set in inverse proportion to the magnification, and in the case of an enlarged copy, the permissible amount becomes smaller, and in the case of a reduced copy, the permissible amount becomes greater. This is because in the case of the enlarged copy, the effects from the missing data due to the reading error becomes larger compared with the case of the reduced copy. In this case, in writing the image data into the hard disk 66b, the magnifying process set for the output image is not performed. After reading the image data from the hard disk 66b for producing copies, the magnifying process is performed. The operations in S226 and S227 are performed under the control of the CPU 65 set for the control means.

In the described operation, when the amount of reading error is within the permissible amount, the effects from the reading error is suppressed as in the case of embodiment 7, and thus the copying operation can continue. On the other hand, when the amount of reading error exceeds the permissible amount, the copies with low quality can be prevented from being produced. Moreover, since the permissible amount is set according to the magnetization of the copied image, the effect from the reading error can be controlled.

In addition, the permissible amount may be set both for the resolution and the magnification of the copying machine 10 in accordance with embodiment 7.

EMBODIMENT 9

A still another embodiment of the present invention will be explained with reference to FIGS. 3, 4, and 6 and FIGS. 26–28. For the sake of convenience, members having the same functions as in the aforementioned embodiment will be designated by the same codes and their descriptions will be omitted.

A digital copying machine 10 in accordance with the present embodiment has a configuration shown in FIG. 6. In producing copies, the inputted image data is written in the hard disk 66b through the memory 64, and the image data is read from the hard disk 66b into the memory 64, and copies are produced based on the image data. The digital copying machine 10 is arranged such that the operation shown in FIG. 28 is performed with respect to the reading error when producing copies.

Figure 28:
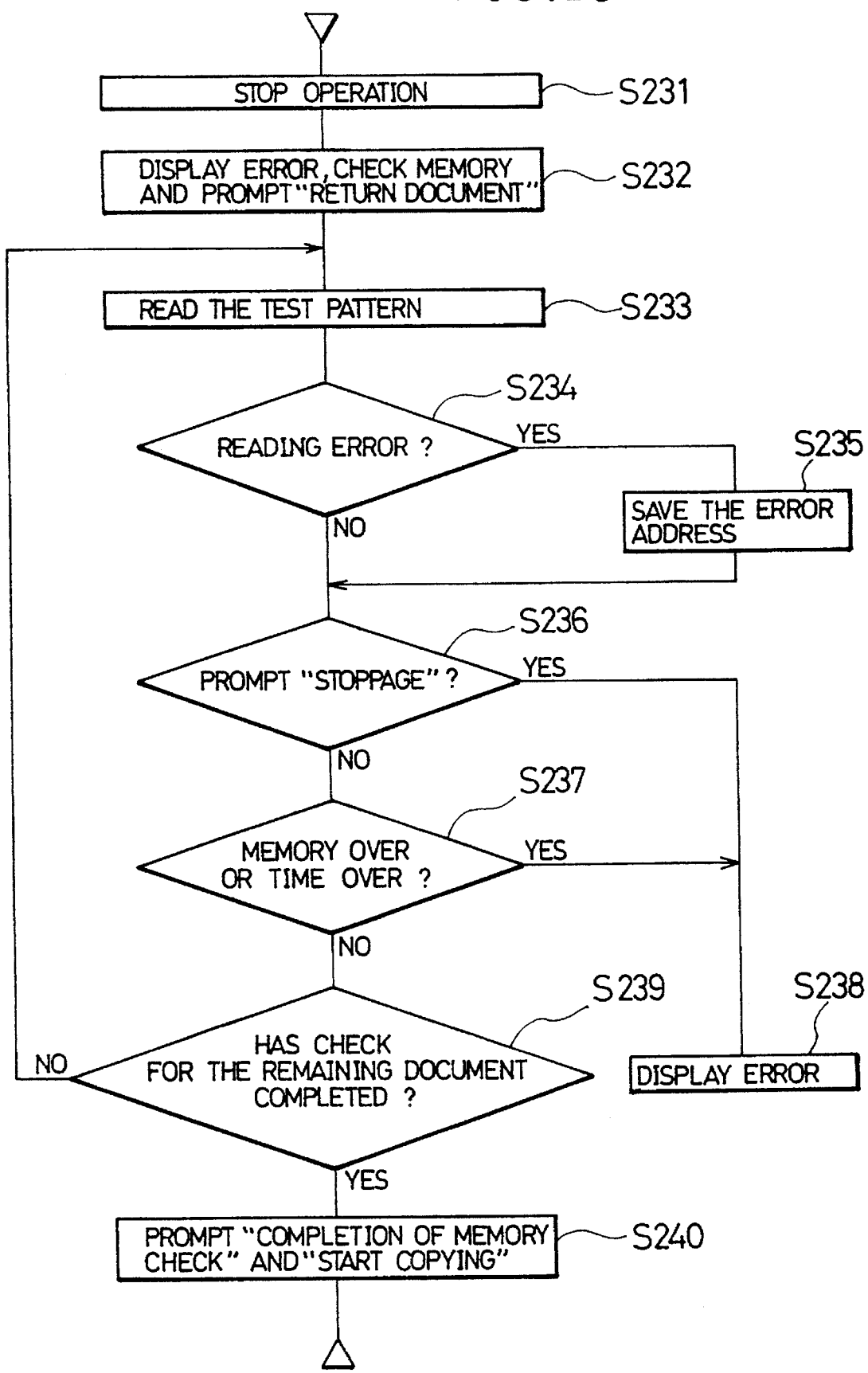
FIG. 28 is a flowchart showing an operation of producing copies in the digital copying machine in accordance with still another embodiment of the present invention.

The operations shown in FIG. 28 are subsequent to the operation in S217 in FIG. 26 or the operation shown in S227 shown in FIG. 27. The operations in S217 and S227 are the same as the operations shown in FIG. 28 (S231). The following will discuss the case where an amount of reading error exceeds the permissible amount during copying operation by reading a plurality of documents set in the ADF 15 shown in FIG. 3 in correct order by the ADF 15 and the scanner section 11, and the copying operation is stopped.

Regarding the operation in FIG. 28, in S216 shown in FIG. 26 and S226 shown in FIG. 27, when reading the image data in the document of one page, when the amount of reading error exceeds the permissible amount, the operation for reading the image data from the hard disk 66b, i.e., the copying operation is stopped (S231). Next, the occurrence of the error is displayed by the display section 50a (informing means) of the operation panel 50. In the mean time, the memory check is started with respect to the hard disk 66b. Further, a message is displayed for retarding the image data in one document page that have read before the operation has stopped to the reading document set position of the ADF 15. In the meantime, the memory check with respect to the hard disk 66b is started (S232).

As explained in embodiment 1, the document to be read again is controlled by designating each document by a number, and thus can be identified as explained in embodiment 1.

In the memory check, the memory region of the hard disk 66b for the amount of remaining document is checked. After the copying operation is restarted, it is determined whether or not the reading operation is performed properly, and further if the copying operation can be ended. The remaining amount of document suggests the amount of document remaining in the reading document set position of the ADF 15, i.e., the number of documents obtained by subtracting the number of copied document from the number of documents to be copied in the current copying operation. Therefore, in the memory check, a prior condition that the number of remaining document is inputted in the digital copying machine 10 is required. Therefore, after displaying a message in S232, for example, a message is displayed for inputting the remaining amount of document by operating a numeral input key (not shown) in the operation panel 50. In this case, the remaining amount of document is confirmed by the operator.

In the memory check, first, the test pattern that is written beforehand in the hard disk 66b is read (S233), and when the reading error has occurred (S234), the address is stored in the RAM 67 as the prohibit address (S235) so that when the copying operation is restarted, the address cannot be read.

Additionally, a long time is required for the memory check depending on the amount of remaining documents, and in such a case, the stoppage of the operation becomes effective, and it is observed whether or not the key operation for stopping the operation is made.

Moreover, in the case where a sufficient capacity for the remaining amount of documents is not left in the hard disk 66b, i.e., a memory over has occurred and also in the case where the memory error has occurred, a great amount of error has occurred in the hard disk 66b when carrying out the memory check for the remaining amount of document, and the memory check is not completed within a predetermined time period, i.e., a time over (S237), it is determined as a definite error, and this is displayed on the display section 50a (S238). The stoppage of the operation is maintained.

Next, in the determination in S237, if neither the memory over nor the time over has occurred, it is determined whether or not the memory check for the recording area corresponding to the remaining amount of document is completed (S239). If not, the sequence goes back to S233, and the described process is repeated. On the other hand, if the memory check is completed, the message for indicating the completion of the memory check and the message of starting the copying operation are displayed (S240). In this state, a piece of document from which the image data had been read before the operation is stopped is set back to the reading document set position, and print switch 50b (operation start instruction input means) is operated, thereby restarting the copying operation. Therefore, the sequence goes back to either S211 of FIG. 26 or S221 of FIG. 27. Here, operations in S231, S232 and S240 are performed by the CPU 65 as the operation control means.

As explained, according to the digital copying machine 10 in accordance with the present embodiment, when producing copies of a plurality of documents using the ADF 15, even if the amount of reading error exceeds the permissible amount and the copying operation is stopped, a piece of document from which the image data had been read until the operation is stopped is set back to the reading document set position by the ADF 15. Then, by operating the print switch 50b, the document subject to the stoppage of the copying operation can be copied again. Therefore, even if the amount of reading error exceeds the permissible amount, and the copying operation is stopped, the effect from the reading error can be prevented, and the copying operation can be promptly restarted.

In the present embodiment, each display to inform the user is made using the display section 50a. However, it may be carried out using a voice as well.

EMBODIMENT 10

A still another embodiment of the present invention will be explained with reference to FIG. 6, FIG. 26 through FIG. 29. For the sake of convenience, members having the same functions as in the aforementioned embodiment will be designated by the same codes and their descriptions will be omitted.

Figure 29:
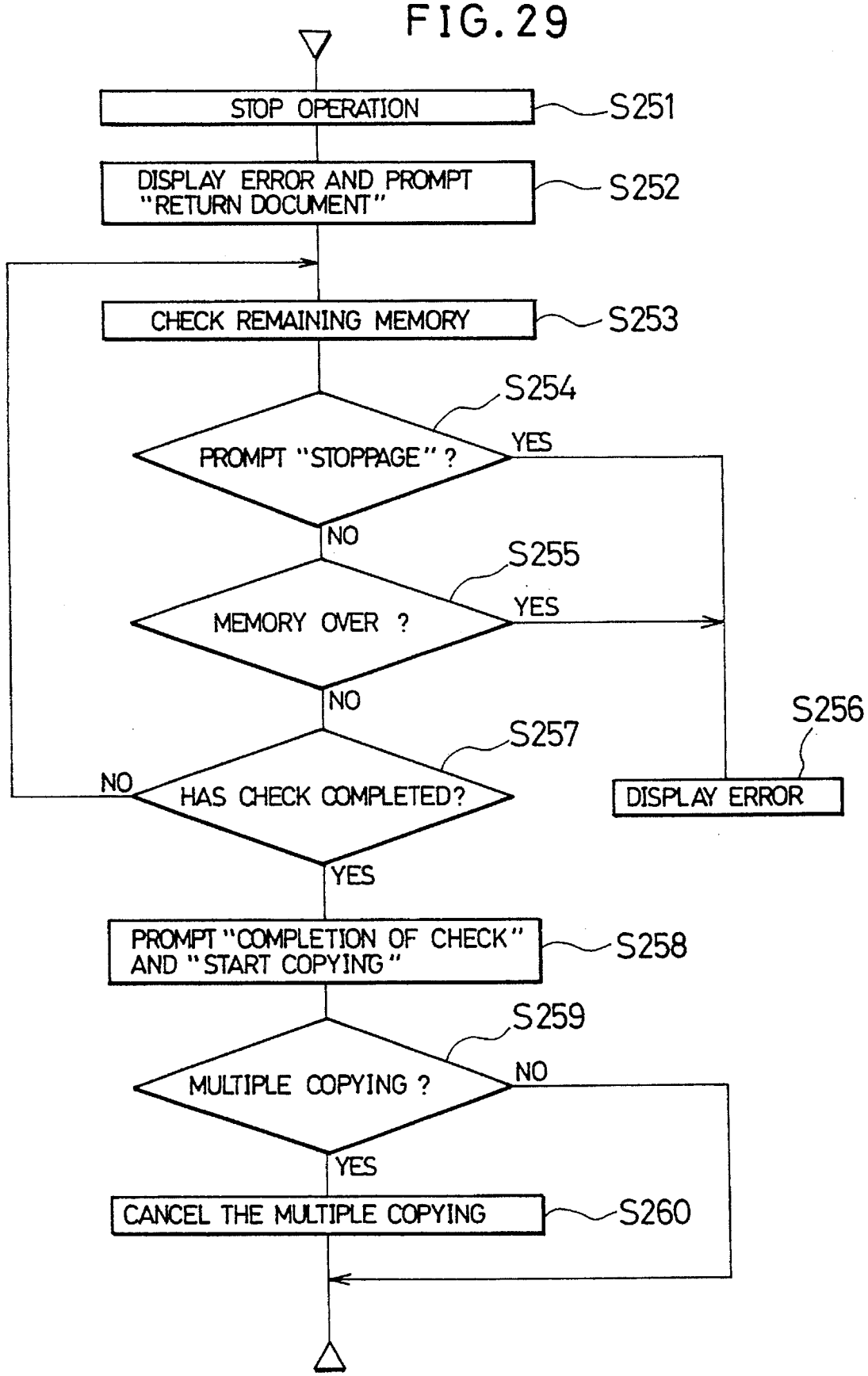
FIG. 29 is a flowchart showing an operation of producing copies in the digital copying machine in accordance with still another embodiment of the present invention.

A digital copying machine 10 in accordance with the present invention has a configuration shown in FIG. 6, and image data is processed in the same manner as the digital copying machine 10 shown in the embodiment 9. The operations shown in FIG. 29 are carried out. The operations shown in FIG. 29 are the same as the operations shown in FIG. 28, which are subsequent to the operation in S217 shown in FIG. 26 and in S227 shown in FIG. 27.

The operations shown in FIG. 29 are applicable to the case where a plurality of copies of a set of documents are produced. Namely, regarding the operations shown in FIG. 29, in S216 shown in FIG. 26 and S226 shown in FIG. 27, when an amount of reading error which exceeds the permissible amount occurred when reading the image data in a piece of document, the reading operation of the image data from the hard disk 66b and the copying operation are stopped (S251). Next, a message indicative of an occurrence of an error is displayed by the display section 50a, and a message for urging the document from which image data has been read from the reading document set position of the ADF 15 for reading therefrom the image data again (S252).

Thereafter, in the memory region of the hard disk 66b, it is determined whether or not a sufficient sufficient memory capacity is felt for the remaining document (S253). In this checking of the remaining memory capacity, as in the case of the previous embodiment 9, based on the prompt "input remaining document", the data on the remaining document are inputted by an operator.

In this case also an instruction of stoppage by the operator is determined valid, and it is observed whether or not a key operation is made for stopping the operation (S254). If so, the sequence goes onto S256.

As the result of checking the remaining memory capacity, if the memory capacity sufficient for the remaining document is left in the hard disk 66b, i.e., a memory over has occurred (S255), it is determined as a definite error, and this information is displayed on the display section 50a (S256). In this case, the apparatus is maintained in its stoppage position.

On the other hand, as the result of the checking in S255, if memory over has not occurred, it is determined whether or not the remaining memory with regard to the recording area corresponding to the remaining document has been completed (S257). If so, the sequence goes back to S253, and the subsequent processes are repeated. On the other hand, if the checking of the remaining memory capacity has been completed, the message indicating that the check has been completed, and a prompt "initiate copying operation" are displayed (S258). Thereafter, when the print switch 50b is operated, if the multiple copy mode is selected (S259), the multiple copy mode is cancelled (S260). Therefore, in the described situation, before the output of copied document is stooped in S251, only a set of copies this case, in S251, copies of a set of documents including the copied documents outputted before the coping operation is stopped in S251.

The cancellation of the multiple copy mode in S260 is equally carried out from the memory area subject to the reading error occurred in reading out image data from the image memory when producing subsequent copies in a similar manner, thereby preventing copies of an inferior image from being produced.

The operations in S251, S252, S259 and S260 in FIG. 29 are performed by the operation controlling means.

As described, in the digital copying machine 10 in accordance with the present invention, even if a reading error that exceeds a permissible amount has occurred during copying operation of a plurality of documents using the ADF 15, which requires the copying operation to be stopped, a piece of document subject to the image data that has been read from the hard disk 66b before the stoppage of the operation is set back to the reading document set position of the ADF 15. Then, by operating the print switch 50b, a copying operation can be restarted from the document which causes a copying operation to be stopped. Moreover, in the case where the multiple copy mode is set in in the apparatus in the stoppage position, by cancelling the multiple copy mode, the problem that the copying operation producing copies with inferior image can be prevented.

EMBODIMENT 11

A still another embodiment of the present invention will be explained with reference to FIG. 6, FIG. 26, FIG. 27, FIG. 28 and FIG. 29. For the sake of convenience, members having the same functions as in the aforementioned embodiment will be designated by the same codes and their descriptions will be omitted.

A digital copying machine 10 in accordance with the present embodiment has a configuration shown in FIG. 6. In the digital copying machine 10, image data is processed in the same manners as the digital copying machines 10 in accordance with the previous embodiments. The operation shown in FIG. 30 is subsequent to the operation in S217 shown in FIG. 26 or S227 shown in FIG. 27 as in the case of the operations in FIG. 28.

Figure 30:
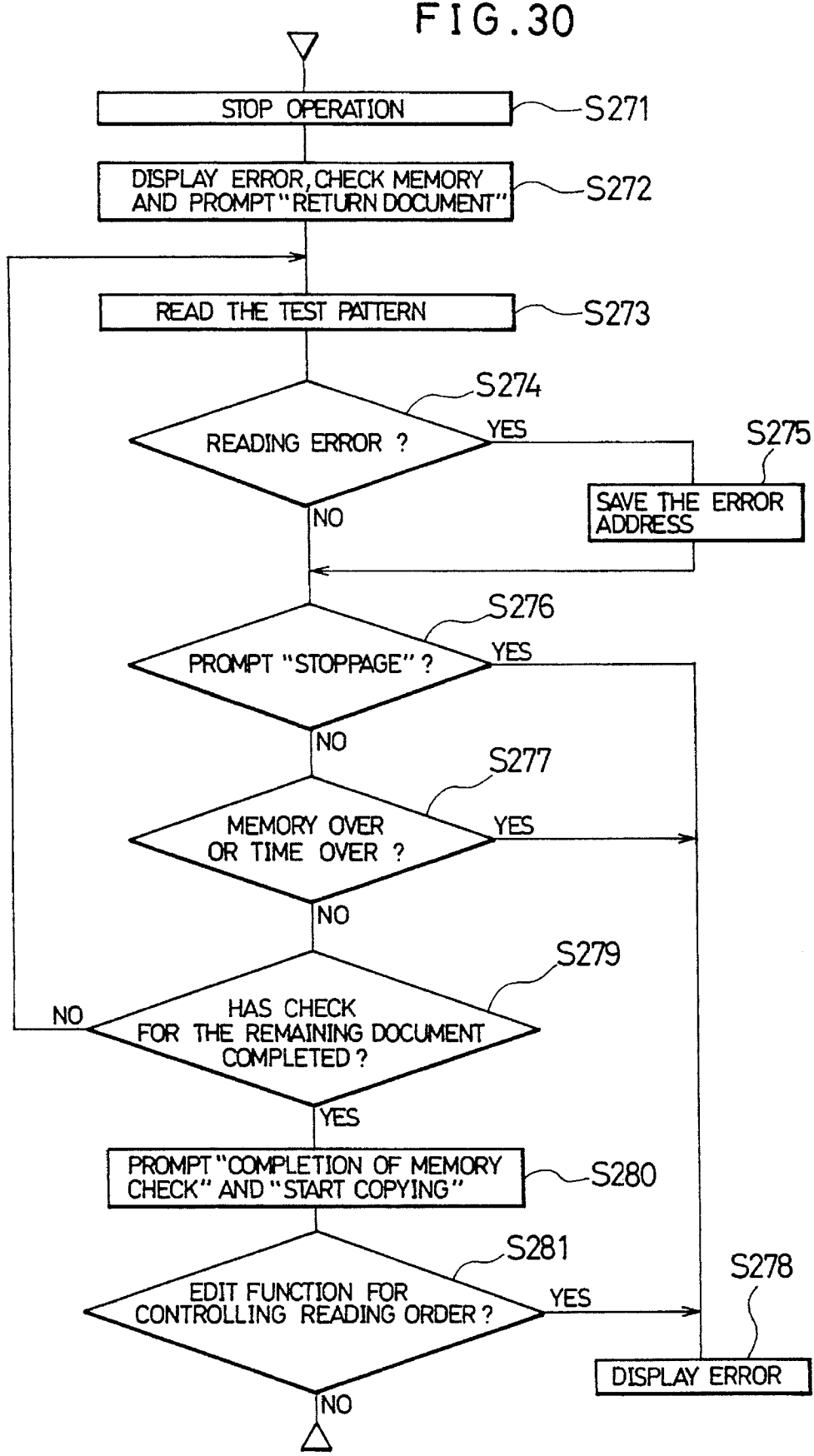
FIG. 30 is a flowchart showing an operation of producing copies in the digital copying machine in accordance with still another embodiment of the present invention.

The operation shown in FIG. 30 is applicable to the case where an editing function is selected wherein a plurality of documents are composited on a piece of sheet and outputted in the multiple copy mode using the ADF 15. Such an editing function may be a copy mode for outputting each document image so as to bind copied sheets at a center of the documents, and for compositing a plurality of document images on a piece of sheet.

In the operation shown in FIG. 30, when completing a memory check in S279, a message indicating a completion of the memory check in S280 and a message for initiating a copying operation are displayed. Thereafter, when the print switch 50b is operated, a edit function for completing a plurality of document image and outputting the composite image onto a piece of sheet (S281).

Next, in the determination in S281, if the editing function is selected, and the operation in response a prompt for setting back the document subject to the image data which has been read before the stoppage of the operation, the copied sheets that had been correctly processed in accordance with the editing function cannot be outputted, and results in a copy output inferior, the sequence goes onto S278, and an error is displayed. Therefore, the apparatus is maintained in its stoppage position.

As the result of the determination in S281, if the described editing function is not selected, the sequence goes back to S211 shown in FIG. 26 or S221 shown in FIG. 27, and in response to an instruction in S272, a copying operation is restarted from the document set back to the reading document set position of the ADF 15.

The operations in S271 through S280 in FIG. 30 are the same as the operations in S231–S240 in FIG. 28. Similarly, the operations in S271, S272, S281 and S282 in FIG. 30 are the same as the operations as the operation controlling means in the CPU 65.

As described, in the case where the editing function such as center binding mode, etc., is selected, the image data on a sheet of document is read and is written in the hard disk 66b. Here, if a reading error has occurred during the reading operation of the image data, in the conventional digital copying machine, as it is determined that an error has occurred, the apparatus is kept in the wait state for a writing or reading operation for a long time. The error state cannot be cancelled without turning OFF the power source. However, as described, in the digital copying machine 10 of the present embodiment, when the editing function for binding the copied image is selected, if an amount of reading error exceeds a permissible amount, the error is displayed. Therefore, an inferior operation where the copying machine is set in the waiting state for the writing and reading operations for n pieces of document will not occur.

Moreover, in the stoppage state where the amount of reading error exceeds a permissible amount, if the editing function such as center biding mode is not selected, a copying operation can be restarted only by setting back a piece of sheet. Therefore adverse effects from the reading error can be suppressed. On the other hand, when the editing function is not selected, an output of copied image are prevented, and an inferior output where copied image are not achieved in correct order for the editing function can be prevented.

EMBODIMENT 12

A still another embodiment of the present invention will be explained with reference to FIG. 3, FIG. 6, FIG. 26, FIG. 27, FIG. 28 and FIG. 31. For the sake of convenience, members having the same functions as in the aforementioned embodiment will be designated by the same codes and their descriptions will be omitted.

Figure 31:
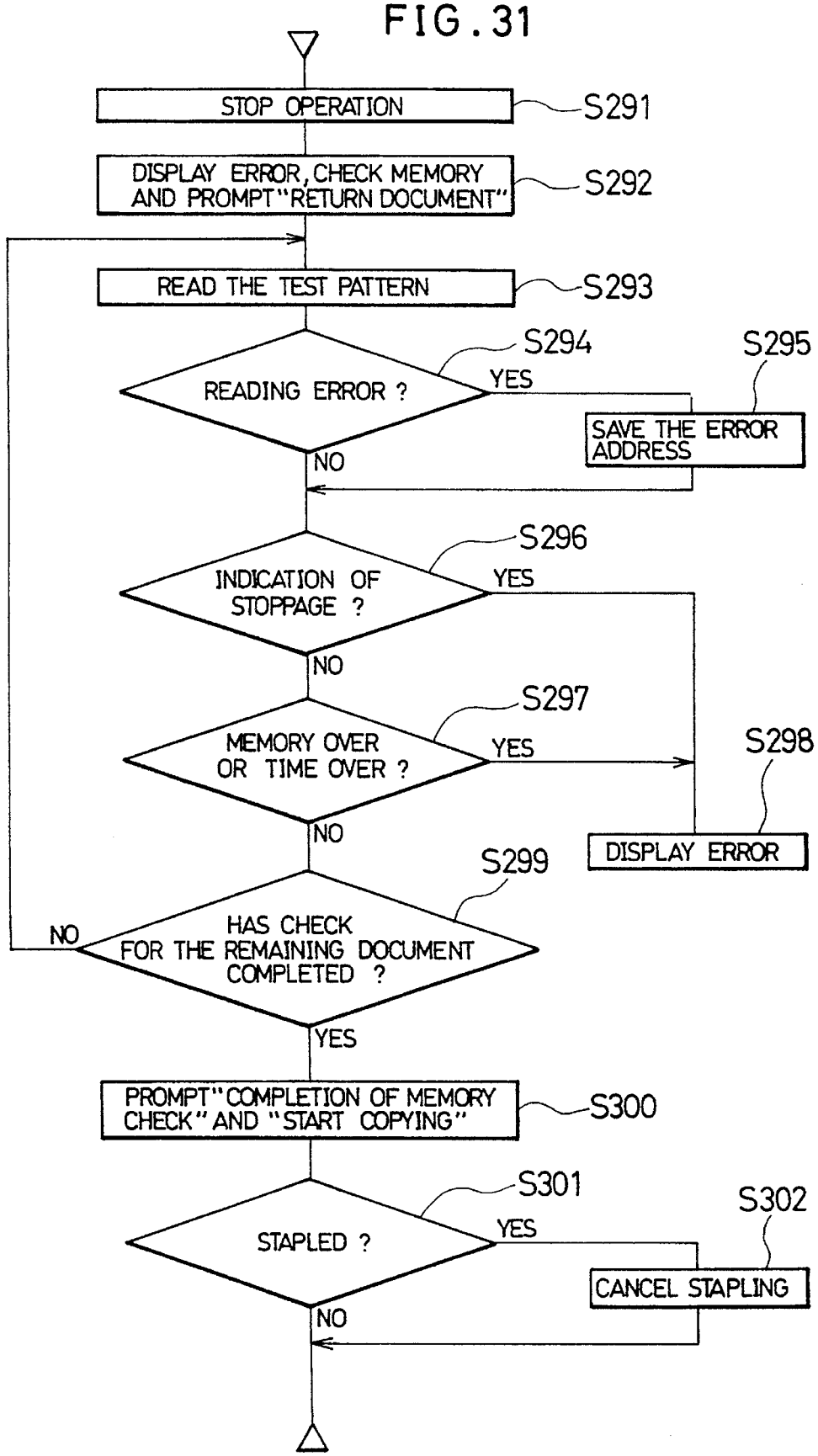
FIG. 31 is a flowchart showing an operation of producing copies in the digital copying machine in accordance with still another embodiment of the present invention.

A digital copying machine 10 in accordance with the present embodiment has a configuration shown in FIG. 6. In the copying machine 10, image data is processes in the same manner as the digital copying machine 10 in accordance with the previous embodiment 9, operations shown in FIG. 31 are performed. The operations shown in FIG. 31 are operations subsequent to the operation S217 shown in FIG. 26 and S227 shown in FIG. 27 as in the case of the operations shown in FIG. 28. The digital copying machine 10 is provided with a stapler (not shown) in a sorter section 14 shown in FIG. 3. The stapler is provided for binding a plurality of copied sheets that have been discharged from the copying machine main body set by set. The operations shown in FIG. 31 are applicable to the case where in the multiple copy mode using the ADF 15, the copied sheets are processed by the stable.

In the operations shown in FIG. 31, when completing the memory check in S299, a message indicating the completion of the memory check in S300 and a message for initiating the copy operation are displayed. Thereafter, by operating the print switch 50b, it is determined whether or not the stapling mode where the copied sheets are stapled by a stapler is selected (S301).

Next, in the determination in S301, if the stapling mode is not selected, the sequence goes back to S211 shown in FIG. 26 and S221 shown in FIG. 27. Then, a copying operation from the document set back to the reading document set position of the ADF 15 according to the prompt for setting back the document to the reading document set position of the ADF 15 as a reading document so as to read the image from the document again.

In the determination in S301, if the stapling mode is selected, and the operation indicating in S292 is selected, the copies may be outputted in wrong order.

Figure 32:
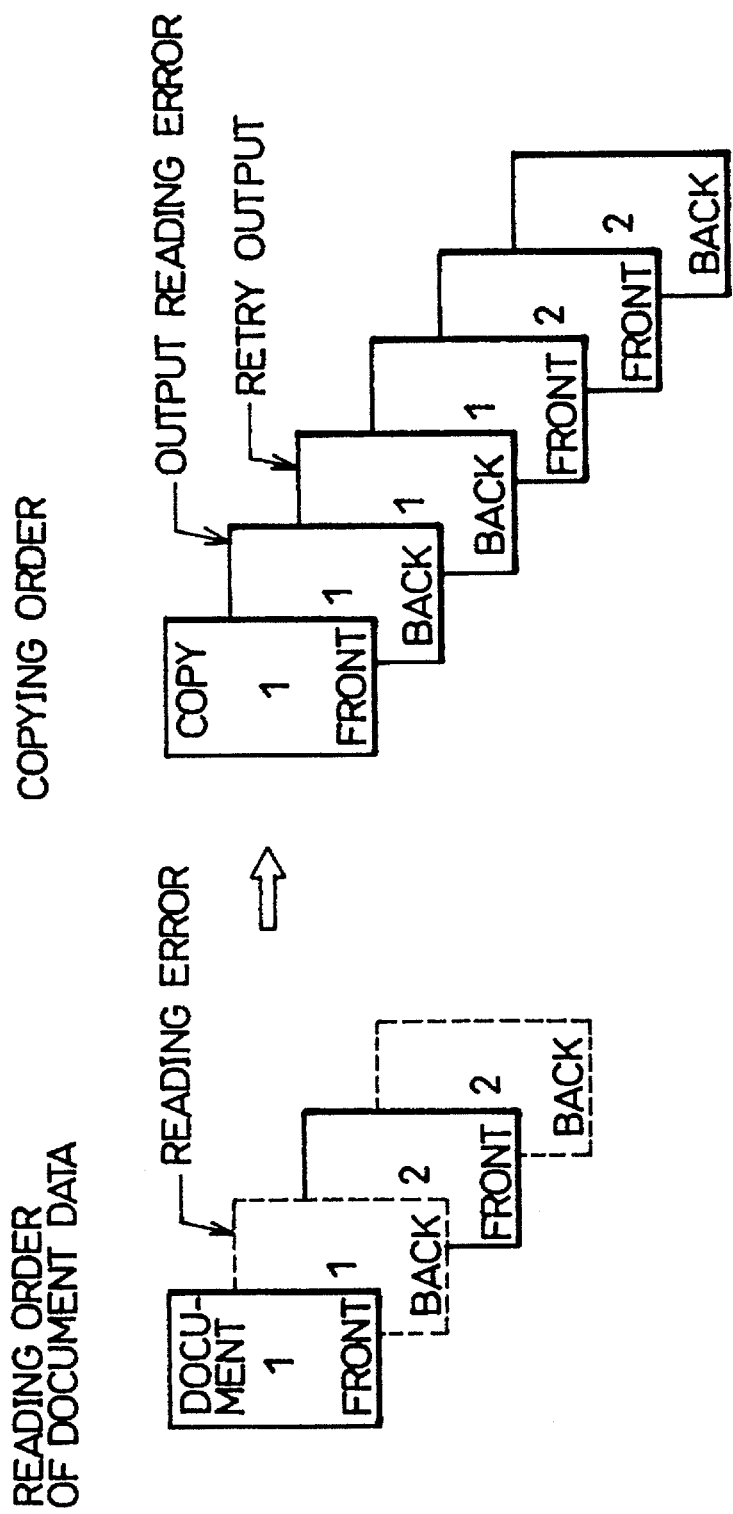
FIG. 32 is an explanatory view showing a state where an operation inferior occurs in the case where a copying operation is restarted in the staple mode.

For example, as shown in FIG. 32, in the multiple single-sided copy mode, when reading the image data on the back surface of the document written in the hard disk 66b, and the copying operation is stopped due to the reading error that exceeds a permissible amount has occurred, if a copying operation is restarted from the back of the first sheet set in the reading document set position of the ADF 15. The copies are outputted in a wrong order: the back surface of the first sheet→the back surface of the first sheet, subject to the reading error, the back surface of the first sheet that is set back for outputting again, the surface of the first sheet for outputting the back surface of the returned document, the front of the second piece, the back of the second piece, etc.

Figure 33:
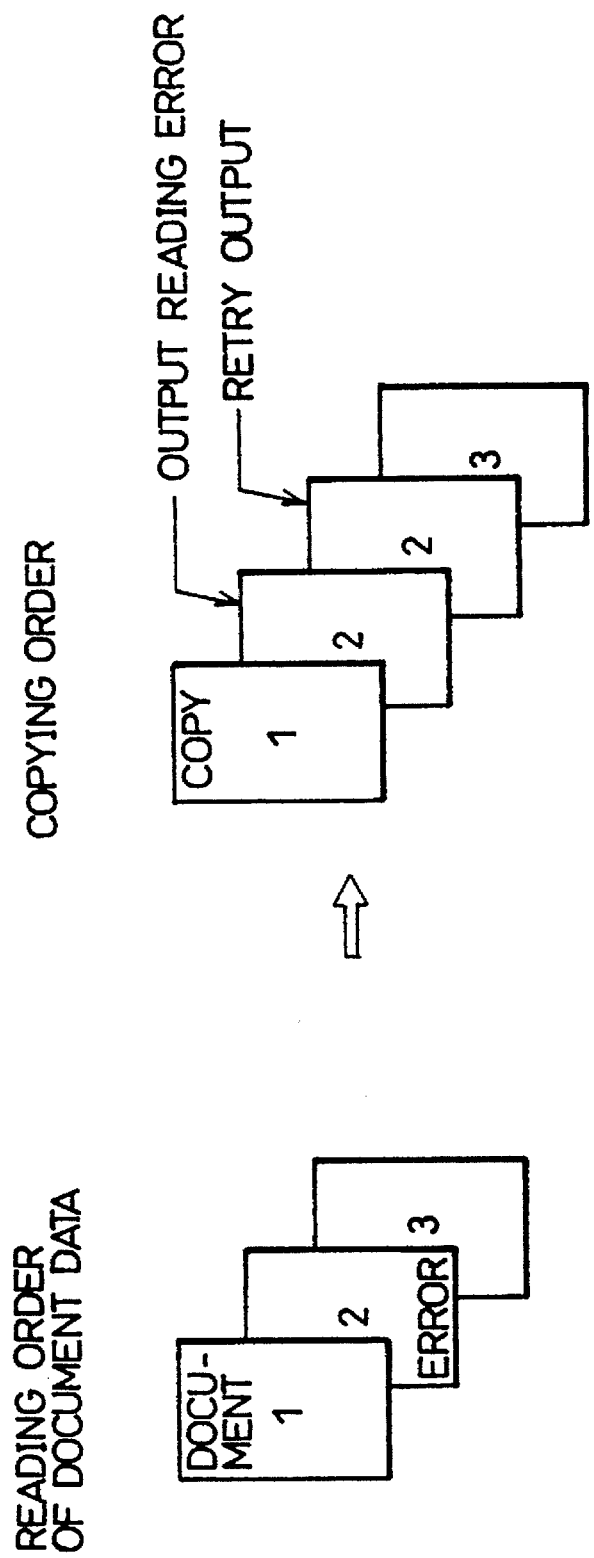
FIG. 33 is an explanatory view showing another example of operation inferior shown in FIG. 32.

As another example, as shown in FIG. 33, in the single-sided copy mode, when reading the image data of the second document, if the reading error has occurred, and thereafter, the copying operation is restarted, copies would be outputted in wrong order: the first sheet, the second sheet, the second sheet and the third sheet.

For this reason, in stapling the copies produced in the described state, an inferior would occur. Therefore, a restarting of the copying operation in the state where the stapling process is selected is inhibited, and the selection of the stapling process is cancelled (S302). Thereafter, the sequence goes back to S211 shown in S211 or S221 shown in S27, and the coping operation is restarted in the same manner.

The operations in S291–S300 in FIG. 31 are the same as the operation in S231–S240 in FIG. 28. The operations in S291, S292, S301 and S302 in FIG. 31 are the operation as the operation control means in the CPU 65.

For the described operation, in the digital copying machine 10, an inferior process in selecting the stapling process is prevented. Other functions are the same as the digital copying machine 10 of the present embodiment 9.

EMBODIMENT 13

A still another embodiment of the present invention will be explained with reference to FIG. 6, FIG. 9, FIGS. 34–36. For the sake of convenience, members having the same functions as in the aforementioned embodiment will be designated by the same codes and their descriptions will be omitted.

The digital copying machine 10 of the present embodiment has a configuration shown in FIG. 6. The inputted image data is written in the hard disk 66b as an image memory through the memory 64, the image data is read from the hard disk 66b in the memory 64. Then, the copying machine 10 performs operation shown in FIG. 34 through FIG. 36.

Figure 34:
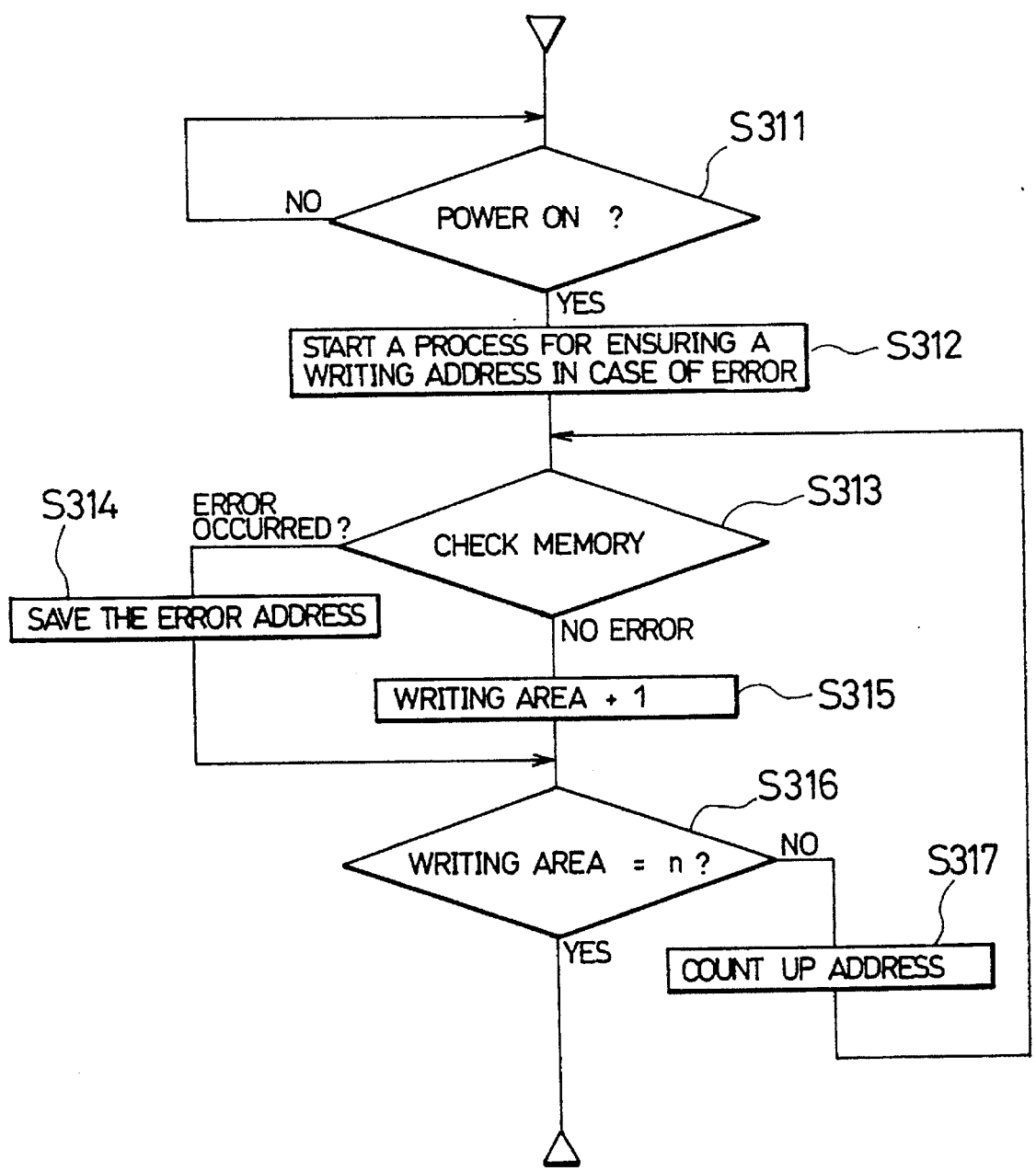
FIG. 34 is a flowchart showing an operation of a digital copying machine in accordance with still another embodiment of the present invention with a power switch switched to the ON position.

In the operations shown in FIG. 34, when the power switch is switched ON (S311), the operation for storing the error writing address, that corresponds to the error writing memory section to be used in case of writing error is initiated. The writing address area in case of error is an area specified as a separately provided writing area.

In the subsequent operation, a memory check is performed in the area to be stored as an error writing address (S313). A memory check is performed by writing a predetermined test pattern, and is determined whether or not the writing error exists.

As the result of the memory check, the address subject to the writing error is stored in the RAM 67 as an inhibited address and is saved (S314). If there is no writing error in the address, the address is counted up as an error writing address (S315). Next, if the number reaches the predetermined number n (S316), the operation is stopped. On the other hand, if the number does not read the predetermined number n, the address is counted up (S317). The sequence goes back to S313, and the operation is repeated until the error writing address reaches n.

Figure 35:
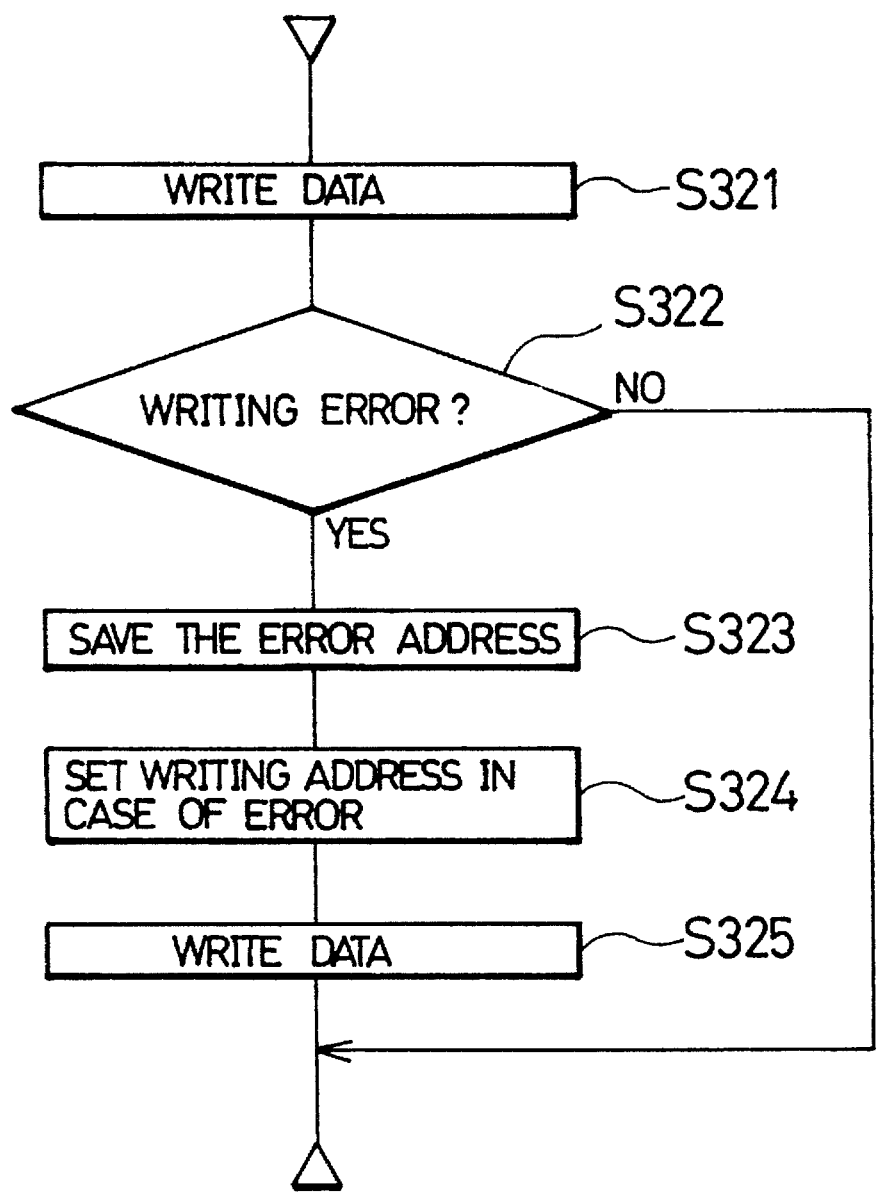
FIG. 35 is a flowchart showing a writing operation of image data after the operation shown in FIG. 34 is performed.

After the writing address in case of error is stored, when the print switch 50b is operated, the image data read from the document by the scanner section 11 is written by the operation of FIG. 35 in the hard disk 66b.

The operation shown in FIG. 35, the image data writing operation into a predetermined address in the hard disk 66b is performed (S321). Then, if a writing error exists (S322), the address is saved as an inhibited address (S323). Next, the writing address is set as an inhibited address (S324), and the address is written as image data (S325). The described operations are repeated until the inputted image data has been completed. The operations in S323 and S324 as writing control means in the CPU 65 are performed as the error detection means and the data writing means in the disk driving unit 66a.

Figure 36:
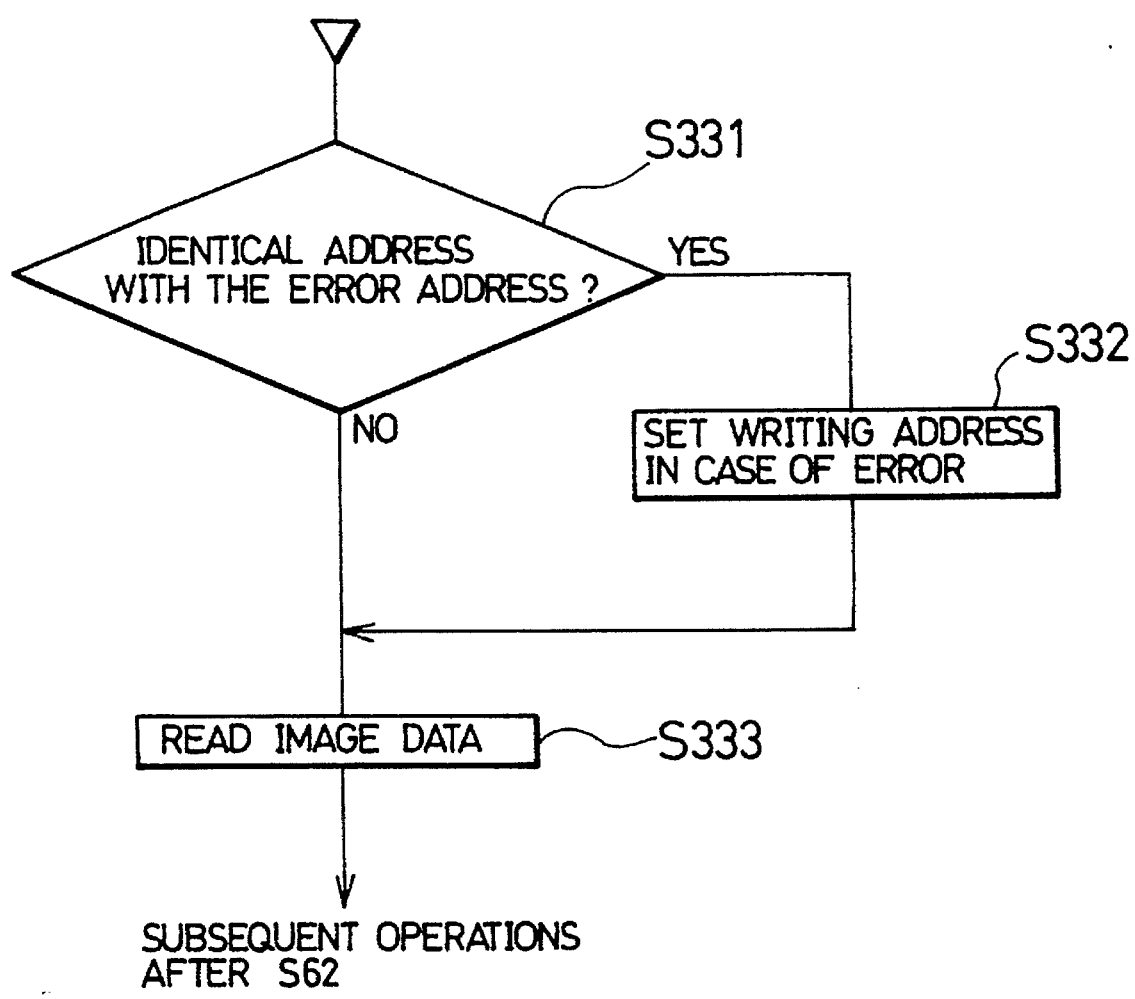
FIG. 36 is a flowchart showing a reading operation of image data after the operation shown in FIG. 35 is performed.

As described, the image data written in the hard disk, 66b are read and written in the memory 64 by the operations shown in FIG. 36, and the copying operation is performed based on the image data.

In the operation shown in FIG. 36, the address to be read from the normal memory area whereon the image data is written from the hard disk 66b is set, and it is determined whether or not the address is an identical address with the address stored in the RAM 67 (S331). If the result of determination is YES, since the address is an error address, the writing address in case of error is set as an address to be read (S332), and the image data is read (S333). On the other hand, if the result of determination is NO in S331, the image data is read from the address in S333.

When a writing error has occurred in temporarily writing in the address in S324, the address is counted up, and the next address to be written in the error writing address is performed. Moreover, in reading out from the error writing address in S332, if a reading error has occurred, a reading operation from the error writing address as a specified area is performed, and the address in the normal writing area is not performed, and the address in the normal writing area is counted up, and the reading operation from the next address is performed. Moreover, in the address subject to the writing error and the reading error is saved as an inhibited address.

The operation in S333 is the same as the operation in S61 in FIG. 9. Therefore, the subsequent operation after S333 is performed after S62. Moreover, the processes in an error address in FIG. 34 through FIG. 36 are formed by one byte or one sector.

As described, according to the digital copying machine 10 of the present embodiment, in the initial operation after turning ON the power, the area wherein the memory check is performed in the hard disk 66b, i.e., the error writing address is ensured. When the writing error has occurred in the writing area, by writing the image data into the error writing address, a smooth writing operation of the image data is permitted, thereby avoiding an occurrence of a writing error which causes copying operation to be stopped. Therefore, an adverse effect from the writing error is suppressed, and a continuous copying operation is permitted.

It is preferable that the memory check is performed from all the memory area in the hard disk 66b. However, it is not possible to carry out the memory check after the power switch is turned ON within a limited time. Therefore, as described, the memory check is performed from the specific area, and the specific area is used only when the writing error has occurred in the normal memory area. Namely, since the error writing address set for the writing error amount can be set, the memory check can be carried out, for example, during the warm-up operation after the power is turned ON. Therefore, a special operation that affects the operation in the digital copying machine 10 is not required.

EMBODIMENT 14

A still another embodiment of the present invention will be explained with reference to FIG. 6, FIG. 9, FIGS. 37–39. For the sake of convenience, members having the same functions as in the aforementioned embodiment will be designated by the same codes and their descriptions will be omitted.

The digital copying machine 10 of the present embodiment has a configuration shown in FIG. 6. According to the copying machine 10, an inputted image data is written in the hard disk 66b as an image memory through the memory 64 as a semiconductor memory, the image data is read out from the hard disk 66b in producing copies. Then, the digital copying machine 10 of the present invention performs operations in FIG. 37 through FIG. 39.

Figure 37:
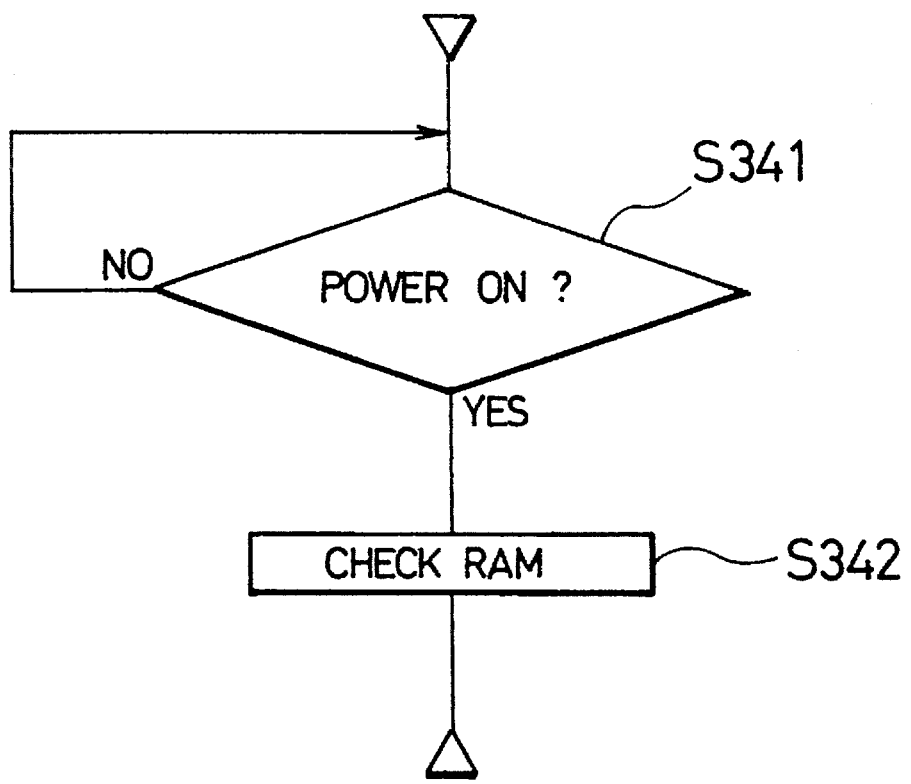
FIG. 37 is a flowchart showing an operation of a digital copying machine in accordance with still another embodiment of the present invention with the power switch switched to the ON position.

When the power switch is turned ON (S341) in the operation shown in FIG. 37, an operation for ensuring the error writing memory section is performed as an initialization process. The error writing memory section is used when the writing error has occurred during the writing operation into the hard disk 66b, and the semiconductor memory which has a high reliability than the hard disk 66b is used. In the present embodiment, a part of an error in the memory 64 (RAM) composed of a semiconductor memory is provided in an area as an error writing memory section.

Therefore, after turning ON the power in S341, the memory check is performed in the area of the error writing memory section in the memory 64 (S342). The memory check is the same as S313–S317 shown in FIG. 34.

Figure 38:
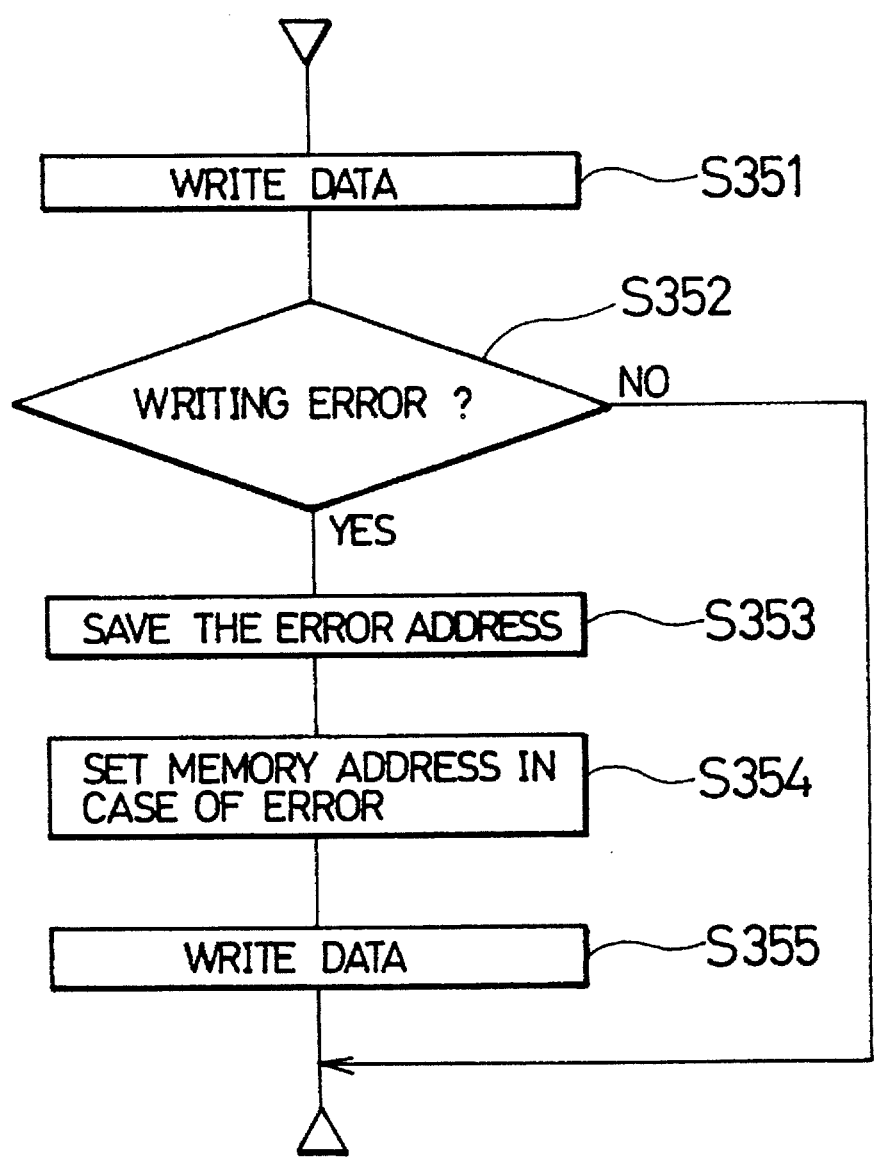
FIG. 38 is a flowchart showing a writing operation of image data after the operation shown in FIG. 37 is performed.

After the error writing memory section is stored, if the print switch 50b is operated, the writing operation in FIG. 38 is performed with regard to the image data read out from the document by the scanner section 11.

In the operations in FIG. 38, a writing operation of the image data in a predetermined address in the hard disk 66b is performed (S351). If a writing error has occurred (S352), the address is saved as an inhibited address (S353). Next, in the memory 64, a predetermined address in the addresses of the area of the error writing memory section is set as a writing address (S354). Then, the image data is written in the address (S355). The described operations are repeated until the inputted image data has been copied. Here, the operations in S353–S355 are performed by the writing control means in the CPU 65, and the operations of the data writing means and the operations in S351 and S352 are operations by the data writing means and the error detection means of the disk drive unit 66a.

Figure 39:
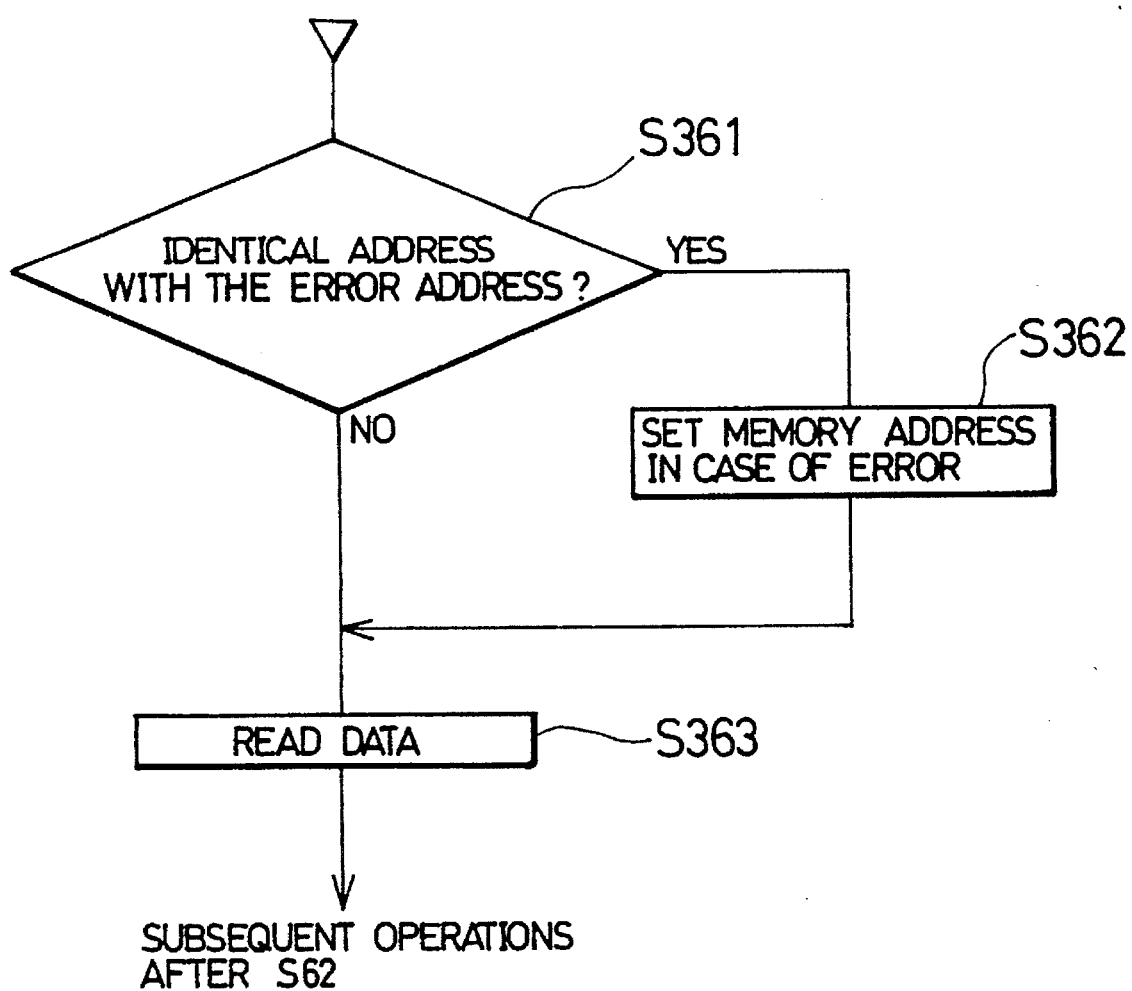
FIG. 39 is a flowchart showing a reading operation of image data after the operation shown in FIG. 38 is performed.

As described, the image data written in the hard disk 66b and the memory 64 are read by the operations in FIG. 39, and based on the image data, the copying operation is performed.

In the operations shown in FIG. 39, the address to be read from the memory area of the hard disk 66b is set, and it is determined whether not the address is an identical address with the error address stored in the RAM 67 (S361). If the result of the determination is YES, the address is determined as an error address. Therefore, the address corresponding to the error writing memory section in the memory 64 is set as an address to be read (S362), and the image data is read (S363). On the other hand, if the result of the determination in S331 is NO, the image data is read from the address set in the hard disk 66b in S333.

When a writing error has occurred during the writing operation in the memory 64 in S354, the address is counted up, and the image data is written in the next address area of the memory 64. When a reading error has occurred in the reading operation from the error writing memory section in S362, a reading operation is not performed from the memory 64, and an address is counted up from the hard disk 66b, and the reading operation from the next address is performed. Moreover, in the operation, the address subject to the writing error or the reading error is saved as an inhibited address.

After the operation in S363 is performed, for example, the subsequent operation after S62 is performed in FIG. 9 in the same manner as the aforementioned embodiment 13.

As described, in the digital copying machine 10 of the present embodiment, in the initialization operation, the memory area is ensured as an error writing memory section in the memory 64, i.e. the semiconductor memory in which a writing error is less likely to occur. When a writing error has occurred during the operation in the hard disk 66b, by writing the image data in the memory 64, a smoother writing operation of the image data is permitted, thereby preventing the problem of a writing error, i.e., the occurrence of the copy output. Therefore, an adverse effect form the writing error can be prevented, thereby enabling a continuous copying output operation.

In the described arrangements, as an error writing memory section, the area corresponding to the writing error amount can be set in the hard disk 66b, the memory check in S342 can be performed, for example, in the warm-up period after the power is turned ON. The time period required for an operation is not required. In the memory 64, i.e., the semiconductor memory, the writing error is not likely to occur, thereby omitting a memory check.

In the embodiment of the present invention, the area as an error writing memory is formed in the memory 64. However, it is not limited to this. For example, the RAM 67 may be provided in the semiconductor memory, or the semiconductor memory may be provided separately as an error writing memory section.

EMBODIMENT 15

A still another embodiment of the present invention will be explained with reference to FIG. 6, FIGS. 11–13, FIG. 26,
FIG. 35, FIG. 38 and FIG. 40. For the sake of convenience, members having the same functions as in the aforementioned embodiment will be designated by the same codes and their descriptions will be omitted.

A the digital copying machine 10 in accordance with the present embodiment has a configuration shown in FIG. 6. The inputted image data is written in the hard disk 66b through a memory 64. When producing copies, the image data is read from the hard disk 66b and is written in the memory 64, and copies are produced based on the image data. In the digital copying machine 10, in the copying machine, the operation shown in FIG. 40 is carried out with regard to the writing error.

Figure 40:
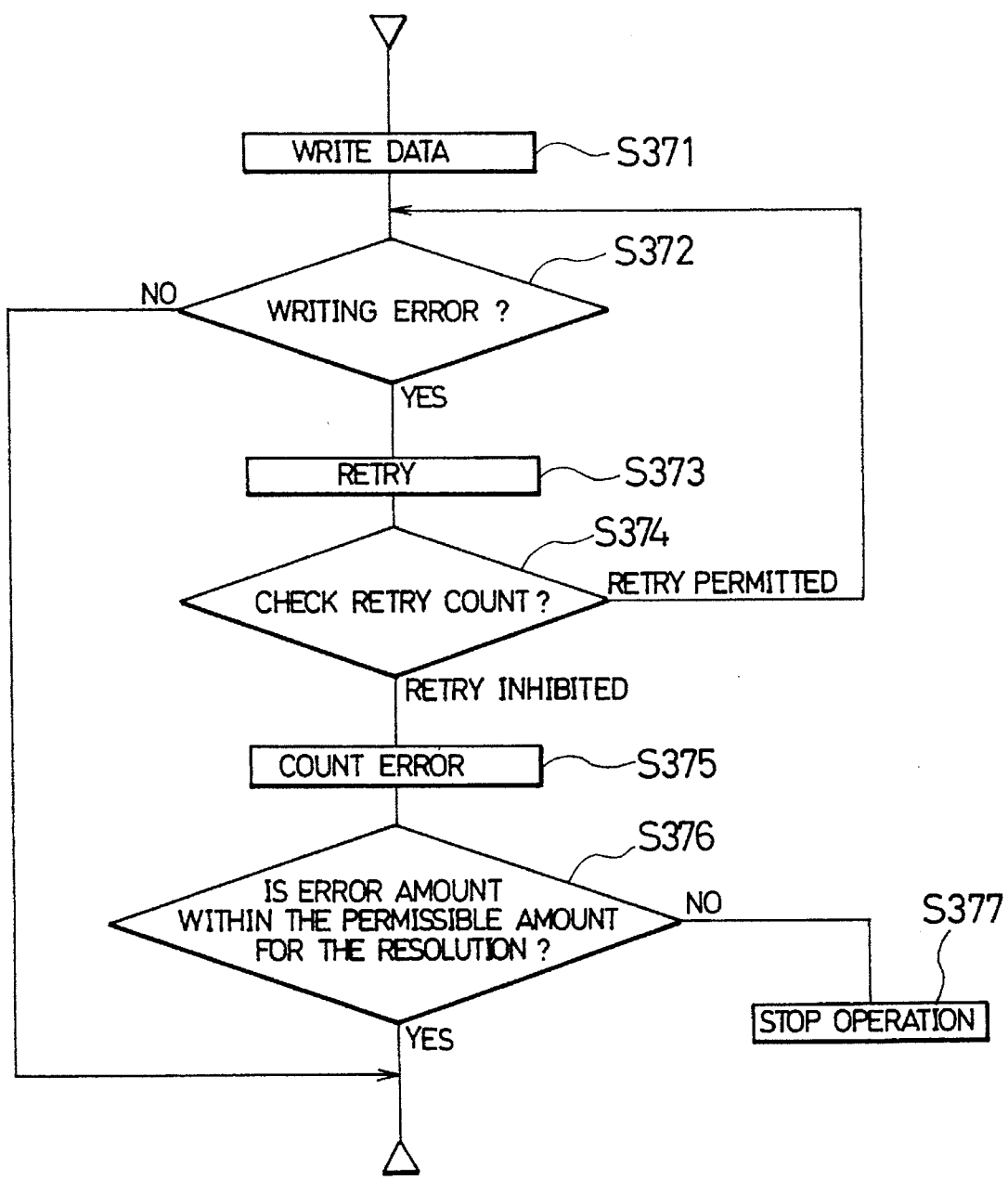
FIG. 40 is a flowchart showing a writing operation of image data in image memory in the digital copying machine in accordance with still another embodiment of the present invention.

The respective operations shown in FIG. 40 correspond to the operations of reading data shown in FIG. 26. The inputted image data is written in the hard disk 66b (S371), and when a writing error has occurred (S372), a retry for writing image data in the same address area is made. (S373). Next, if the retry count exceeds the restricted number of times (S374), the number of writing error is counted (S375). Then, it is determined whether or not the amount of writing error remaining after the retry is within a predetermined amount (S376). The permissible amount is set in proportion to the resolution of the digital copying machine 10 as in the case of previous embodiment 7.

In S375, a counting of wiring errors is made for example with regard to the number of writing errors successively occurred, the number of writing area occurred in a predetermined area or the number of writing errors occurred in one page. The described counting of writing errors can be applied to the operation shown in FIGS. 11–13 in accordance with previous embodiment 3, the writing operation into the error writing address in the hard disk 66b, the writing operation of the memory 64 as an error writing memory section shown in FIG. 38 of the embodiment 14.

As the result of the determination in S376, if the amount error is within the permissible amount, the following address corresponding to the writing error is ignored, and the address is counted up, and the sequence goes back to S371. On the other hand, as a result of determination in S376, if an amount of error exceeds the permissible amount, the writing operation of the image data into the hard disk 66b, i.e., the copying operation is stopped (S377). The operations in S376 and S377 are carried out under the control of the CPU 65 as the operation control means.

In the above arrangement, the digital copying machine 10 of the present invention is the same as the digital copying machine 10 of the embodiment 7. Namely, when the writing error occurred is within the permissible amount, adverse effects from the writing error can be suppressed, and copies can be produced continuously, thereby preventing an image of low quality that contains the writing error amount above the permissible amount.

The permissible amount is set according to the resolution of the digital copying machine 10, and the effects from the writing error can be controlled. Here, when the writing error has occurred, the writing operation is retried. However, this process may be omitted.

EMBODIMENT 16

A still another embodiment of the present invention will be explained with reference to FIG. 6, FIG. 27, FIG. 40 and FIG. 41. For the sake of convenience, members having the same functions as in the aforementioned embodiment will be designated by the same codes and their descriptions will be omitted.

Figure 41:
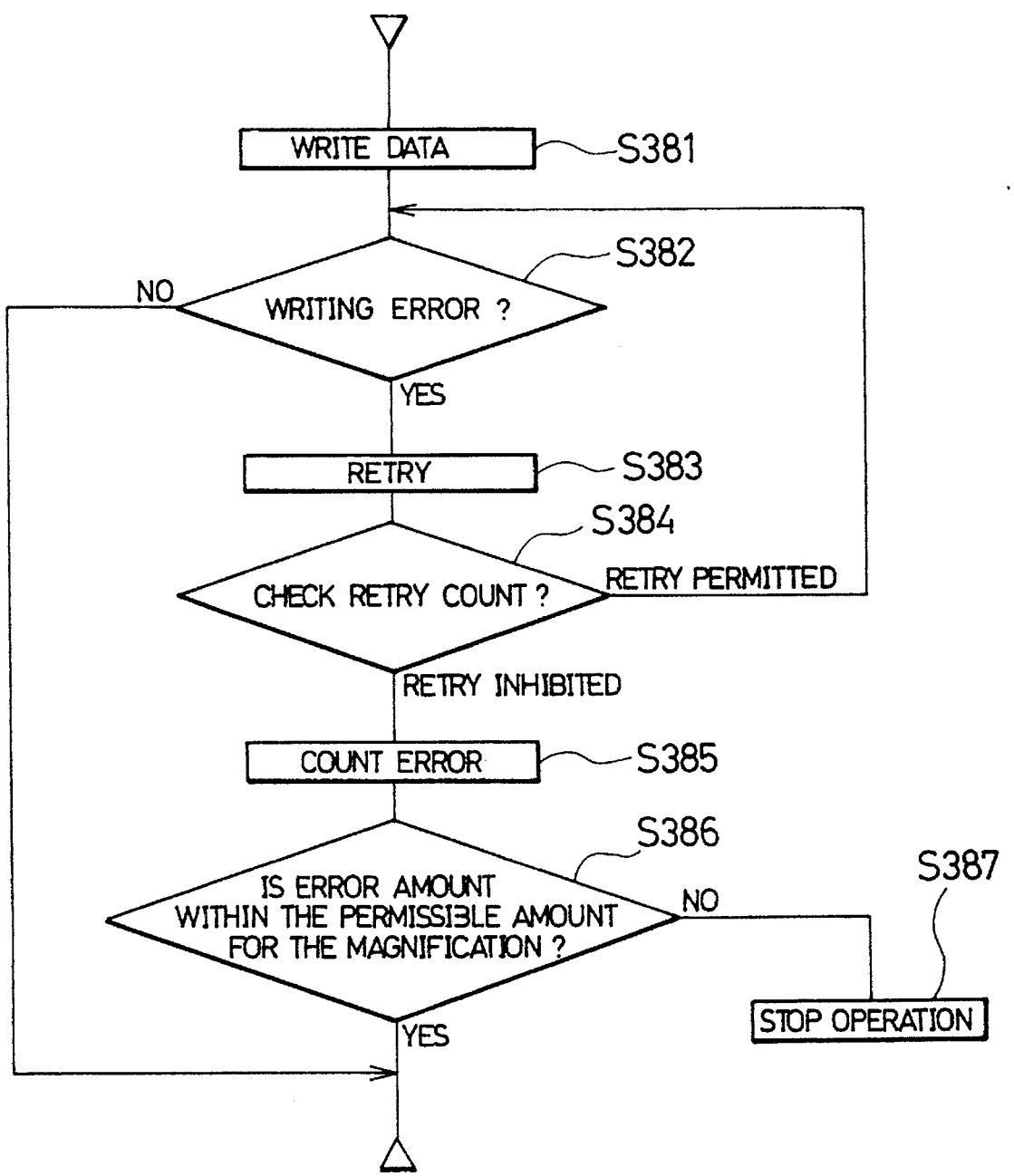
FIG. 41 is a flowchart showing s writing operation of image data into the image memory in the digital copying machine in accordance with still another embodiment of the present invention.

A digital copying machine 10 of the present embodiment has a configuration shown in FIG. 6, and performs an operation shown in FIG. 41. The operation performs an operation shown in S386 in addition to the operation of S376 shown in FIG. 40, and corresponds to the operation shown in FIG. 27.

Namely, in the operation shown in FIG. 41, a writing error has occurred in S382. In the determination in S384, if the retry count exceeds a restricted count, the retry count is counted (S385), and it is determined whether or the amount of writing error after the retry is within the permissible amount set for the determined amount of writing error (S386). As the result of the determination, if the amount of writing error exceeds the permissible amount, the writing operation of the image data into the hard disk 66b, i.e., the copying operation is stopped (S387). Here, the operations in S386 and S387 are performed under the control of the CPU 65 as the operation control means.

The amount of permissible amount is set in an inverse proportion to the magnification as explained in aforementioned embodiment 8. The number of writing error in S385 is as explained in the embodiment 15.

In the described arrangement, as in the arrangement of the embodiment 15, when the writing error amount is within the permissible amount, the effect from the writing error is suppressed, and copies can be produced continuously. Moreover, copies of the images of low quality, that contains the writing error above the permissible amount will not be produced. Moreover, the permissible amount is set according to the magnification of the outputted image, and it is controlled such that the effect from the writing error can be suppressed.

The permissible amount is set based on the resolution and the magnification of the copying machine 10 of the embodiment 15.

EMBODIMENT 17

A still another embodiment of the present invention will be explained with reference to FIG. 3, FIG. 4, FIG. 6, FIG. 28 and FIGS. 40–42. For the sake of convenience, members having the same functions as in the aforementioned embodiment will be designated by the same codes and their descriptions will be omitted.

A digital copying machine 10 of the present embodiment has a configuration shown in FIG. 6, and in producing copies, the inputted image data is written in the hard disk 66b through the memory 64, and is read from the hard disk 66b and is written in the memory 64, and copies are produced based on the image data. According to the digital copying machine 10, a copying operation is performed based on FIG. 42 with respect to the writing error. The operation corresponds to the operation in FIG. 28 when writing in the manner described in embodiment 9.

Figure 42:
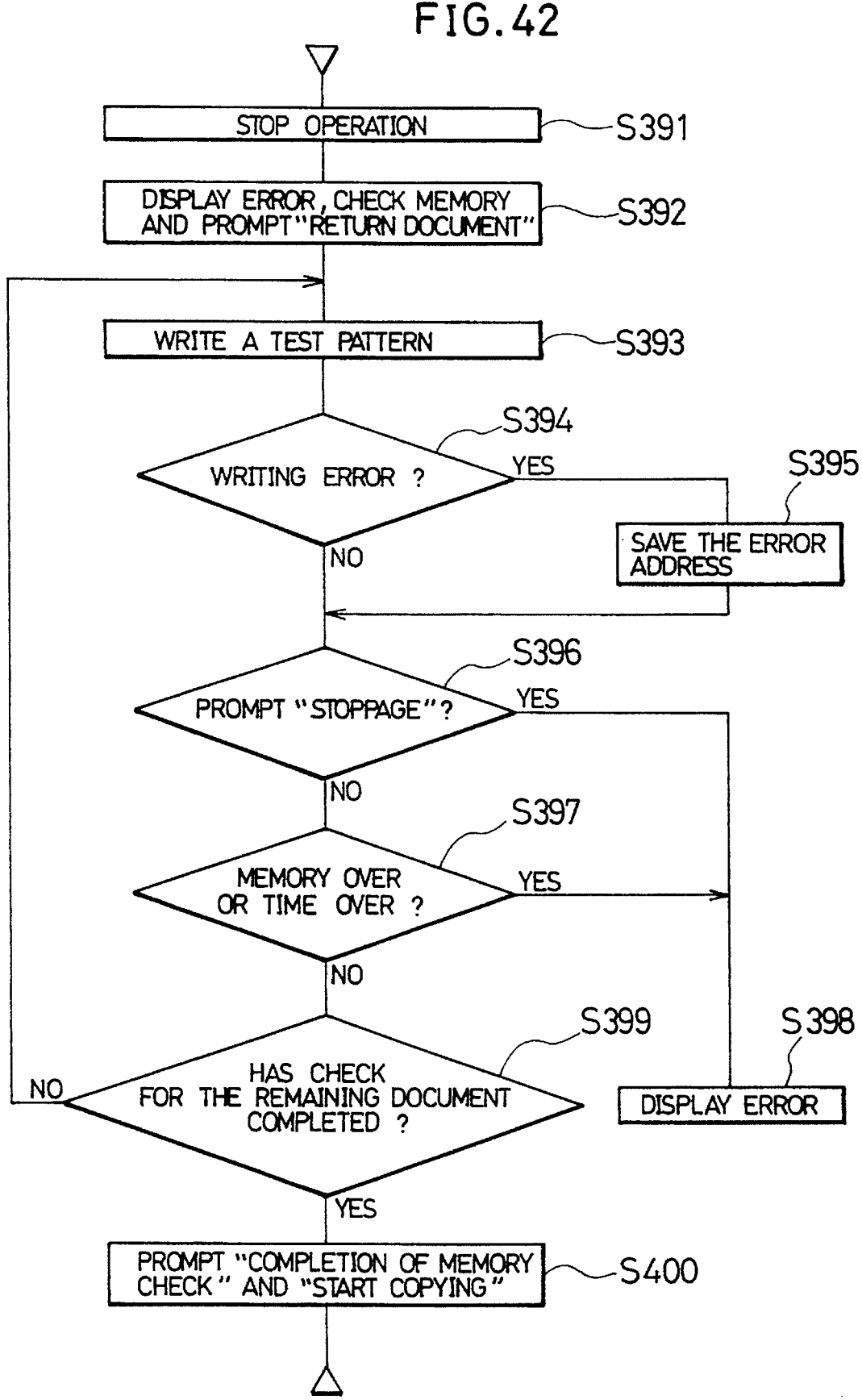
FIG. 42 is a flowchart showing a writing operation of image data in an image memory in the digital copying machine in accordance with still another embodiment of the present invention.

The operation shown in FIG. 42 is subsequent to the operation in S377 or S387 shown in FIG. 41, and the operations in S377 and S387 are the same as the stoppage of the operation shown in FIG. 42 (S391). In the copying operation, a plurality of documents set in the ADF 15 shown in FIG. 3 and read by the ADF 15 and the scanner section 11 in order, if the writing error above the permissible amount has occurred, the copying operation is stopped.

Regarding the operation shown in FIG. 42, in S376 shown in FIG. 40 and in S386 shown in FIG. 41, if reading the image data from a piece of document, if the amount of writing error amount exceeds the permissible amount, the writing operation of the image data into the hard disk 66b, i.e., the copying operation is stopped (S391). Next, a prompt "error" is displayed on the operation panel 50 (informing means). Then, the memory check is started from the hard disk 66b. A message which urges the document to be read again is set back to the reading document set position of the ADF 15 is displayed. In the mean time, the memory check is started with regard to the hard disk 66b (S392).

In the memory check, the memory area of the hard disk 66b corresponding to the remaining document amount is checked, and after restarting the production of copies, the writing operation is performed correctly, and it is determined whether or not the copies are completed. The amount of the remaining document is the amount of the document remaining at the reading document set position of the ADF 15. Therefore, in the memory check, after the message is displayed in S392, for example, a message indicating the remaining amount of document is displayed on the operation panel by inputting through the operation of a numeral input key (not shown).

In the memory check, first, a test pattern is written in the hard disk 66b (S393), and if the writing error has occurred (S394), the address is saved as an inhibited address (S395), and is not be saved when restarting the copying operation.

Next, it is observed whether or not the operation stop key is operated by an operator (S396). If so, the sequence goes onto S398. Moreover, if the remaining amount of the hard disk 66b is not sufficient for the remaining amount of the document, i.e., the memory over, and when carrying out the memory check for the remaining amount of document, the amount of writing error in the hard disk is large, and the memory check is not completed within a predetermined time, i.e., the time over (S397), it is determined as a complete error, and the message indicating that the complete error has occurred is displayed on the display section 50a (S398). In this case, the operation stoppage state is maintained.

As the result of the determination in S397, if neither memory over nor time over has not occurred, it is determined whether or not the memory check corresponding to the recording area of the remaining document amount (S399). If so, the sequence goes back to S393, and the subsequent operations are repeated. On the other hand, if the memory check is completed, the message indicative of the completion of the memory check and the message which urges copying operations to be started are displayed (S400). In this state, the image data on a piece of document that had been read before the operation has stopped is set back to the reading document set position, and by operating the print switch 50b as the operation start instruction input means, a copying operation is restarted. Therefore, the sequence goes back to S371 shown in FIG. 40 or S381 shown in FIG. 41. Here, the operation in S391, S392 and S400 are performed under the control of the operation control means.

According to the described arrangement, even if the writing error above the permissible amount has occurred, and the copying operation is stopped, a copying operation can be restarted from the document subject to the stoppage of copying operation. Therefore, even if the writing error above the permissible amount has occurred, and the copying operation is stopped, an adverse effect from the writing error can be suppressed, thereby promptly restarting the copying operation. Here, the display section 50a is used as means for informing the user. However, it may be done by voice.

EMBODIMENT 18

A still another embodiment of the present invention will be explained with reference to FIG. 6, FIG. 9, FIG. 13, FIG.

16, FIG. 28, FIG. 35 and FIGS. 42–44. For the sake of convenience, members having the same functions as in the aforementioned embodiment will be designated by the same codes and their descriptions will be omitted.

A digital copying machine 10 in accordance with the present embodiment has a configuration shown in FIG. 6. When inputting a copying operation, the inputted image data is written in the hard disk 66b through the memory 64, and is read from the hard disk 66b into the memory 64, and copies are produced based on the image data. Then, with regard to the reading error occurred in reading the image data from the hard disk 66b and a writing error occurred in writing the image data in the hard disk 66b, memory formatting process, i.e., a so-called initialization process is applied to the hard disk 66b shown in FIG. 43 or FIG. 44.

Figure 43:
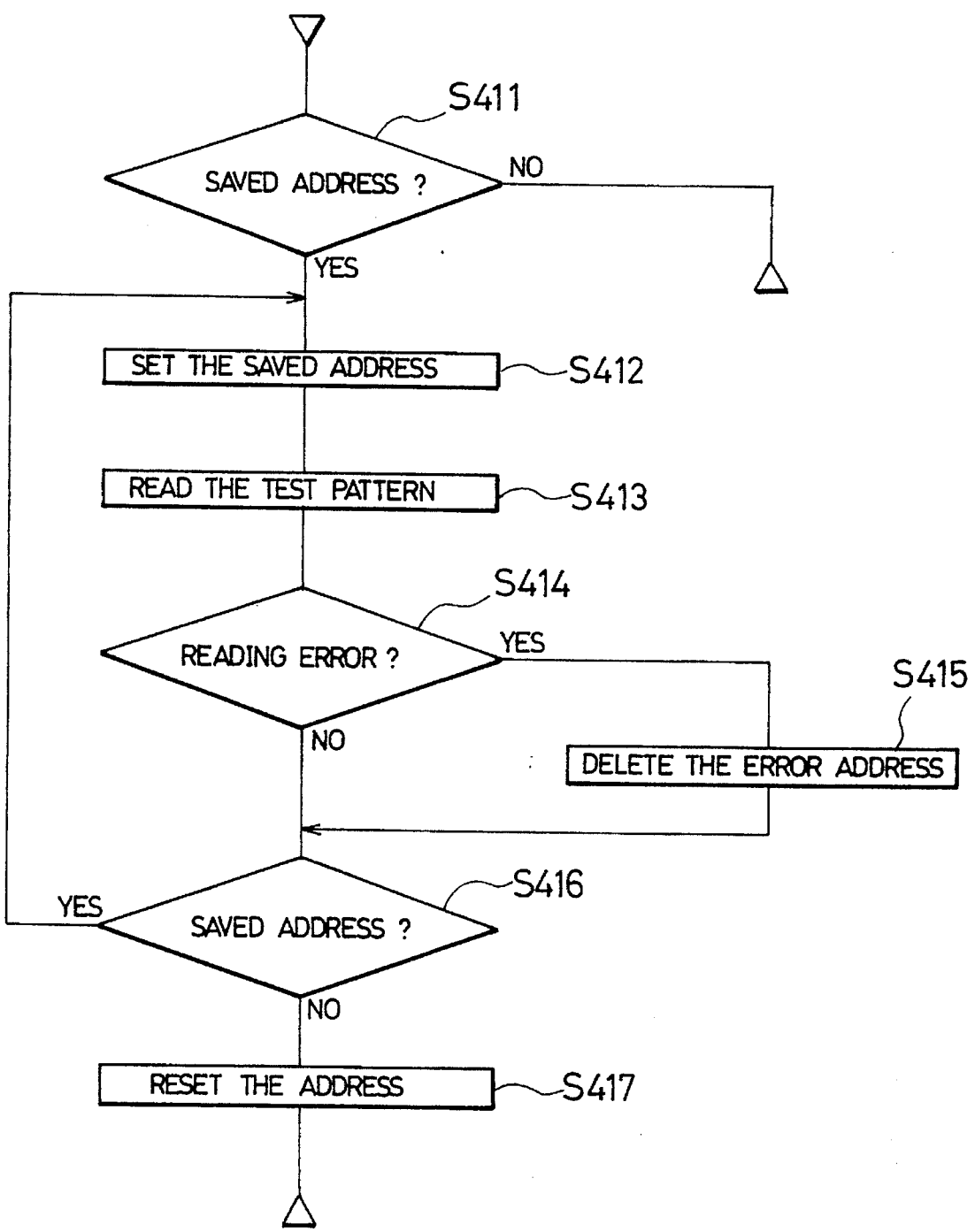
FIG. 43 is a flowchart showing a memory formatting operation in accordance with a reading error occurred in the digital copying machine in accordance with still another embodiment of the present invention.

In the operations shown in FIG. 43, first, it is determined whether or not an address that is saved as an inhibited address exists in the RAM 67 (S411). The inhibited address, for example, suggests that in S72 shown in FIG. 9 and S235 shown in FIG. 28, etc., for example, by the retry or check of the reading operation, the reading error still remains and is saved in the RAM 67 by the operations by the CPU 65 and the RAM 67.

If the result of the determination is NO in S411, a memory formatting process is not required. On the other hand, if the result of the determination in S411 is YES, the saved address is set as an address to be read, and from the address, the test pattern is read (S413). Next, in the reading operation, if the reading error has occurred (S414), the address in the error section is deleted (S415). The process is carried out, for example, by one byte or one sector.

The operations in S411–S415 are repeated until the process for all the saved address is completed (S416). Thereafter, if the process is completed for all the saved address, the address is set again. Here, the processes in S411–S417 are performed by the memory control means in the CPU 65.

By the described memory formatting process, the memory area is determined as an inhibited area where the reading error and the writing error are not permitted. It can be prevented that the missing data due to the reading error or the writing error with respect to the image memory will not occur again, thereby preventing the quality of the outputted image from being lowered. An access is not carried out from the memory area of the hard disk 66b, that is inhibited due to the reading error or the writing error. Therefore, in the digital copying machine 10 of the present invention, the writing operation into the hard disk 66b and the reading operation from the hard disk 66b cannot be carried out smoothly. Therefore, an adverse effect from the reading error and the writing error can be prevented, thereby smoothly carrying out the copying operation.

Like the operation in S72 in FIG. 9 and the operation in S108 in FIG. 13, the address subject to the error is saved as an inhibited address by saving the error address as the inhibited address. When carrying out the memory format, the address is deleted from the memory area subject to the error. Therefore, the memory area is not set as a memory area to be accessed, thereby permitting a still smoother operation.

EMBODIMENT 19

A still another embodiment of the present invention will be explained with reference to FIG. 6, FIGS. 43–48. For the sake of convenience, members having the same functions as in the aforementioned embodiment will be designated by the same codes and their descriptions will be omitted.

Figure 45:
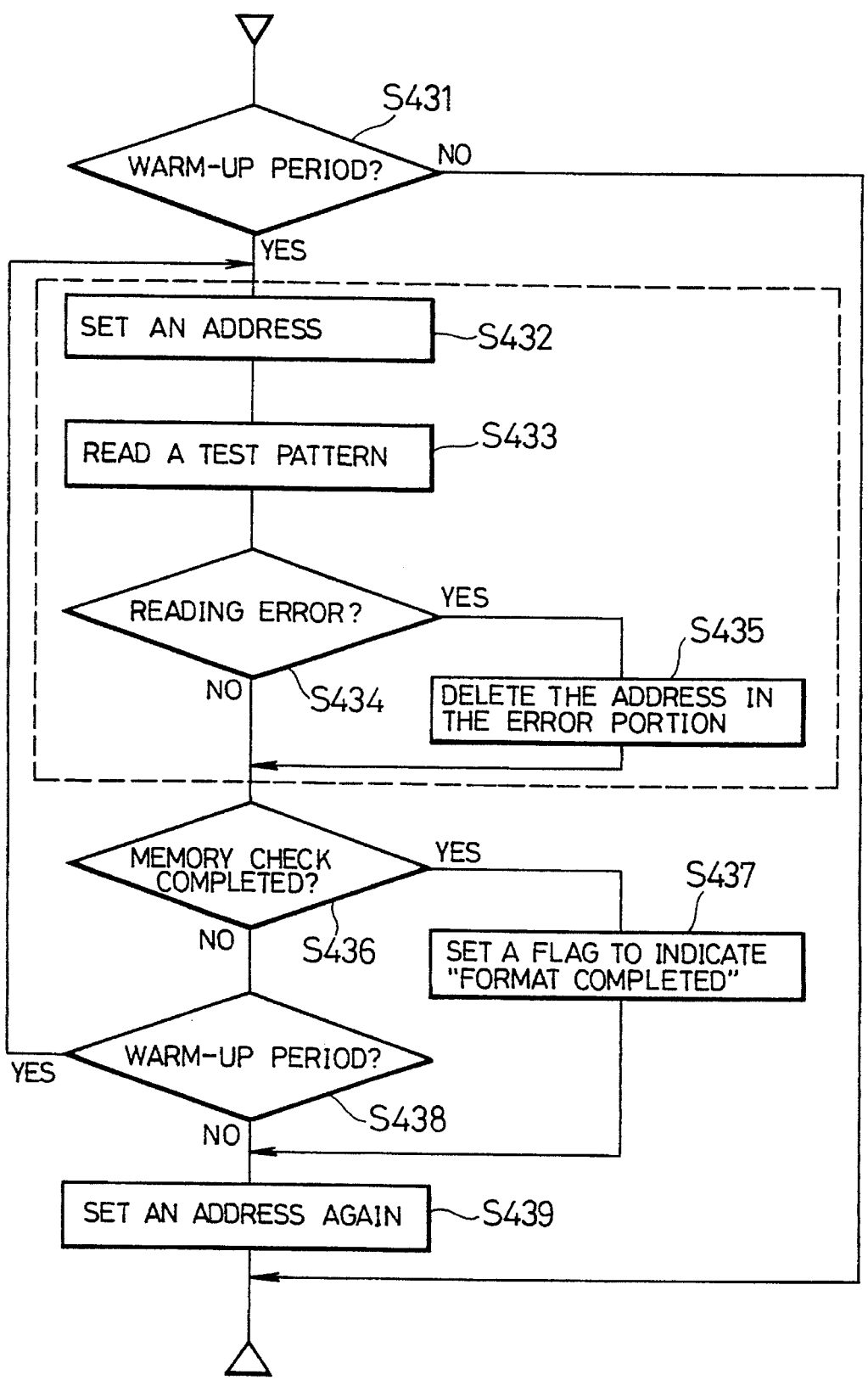
FIG. 45 is a flowchart showing a memory formatting operation related to a reading error occurred in the digital copying machine in accordance with still another embodiment of the present invention.
Figure 46:
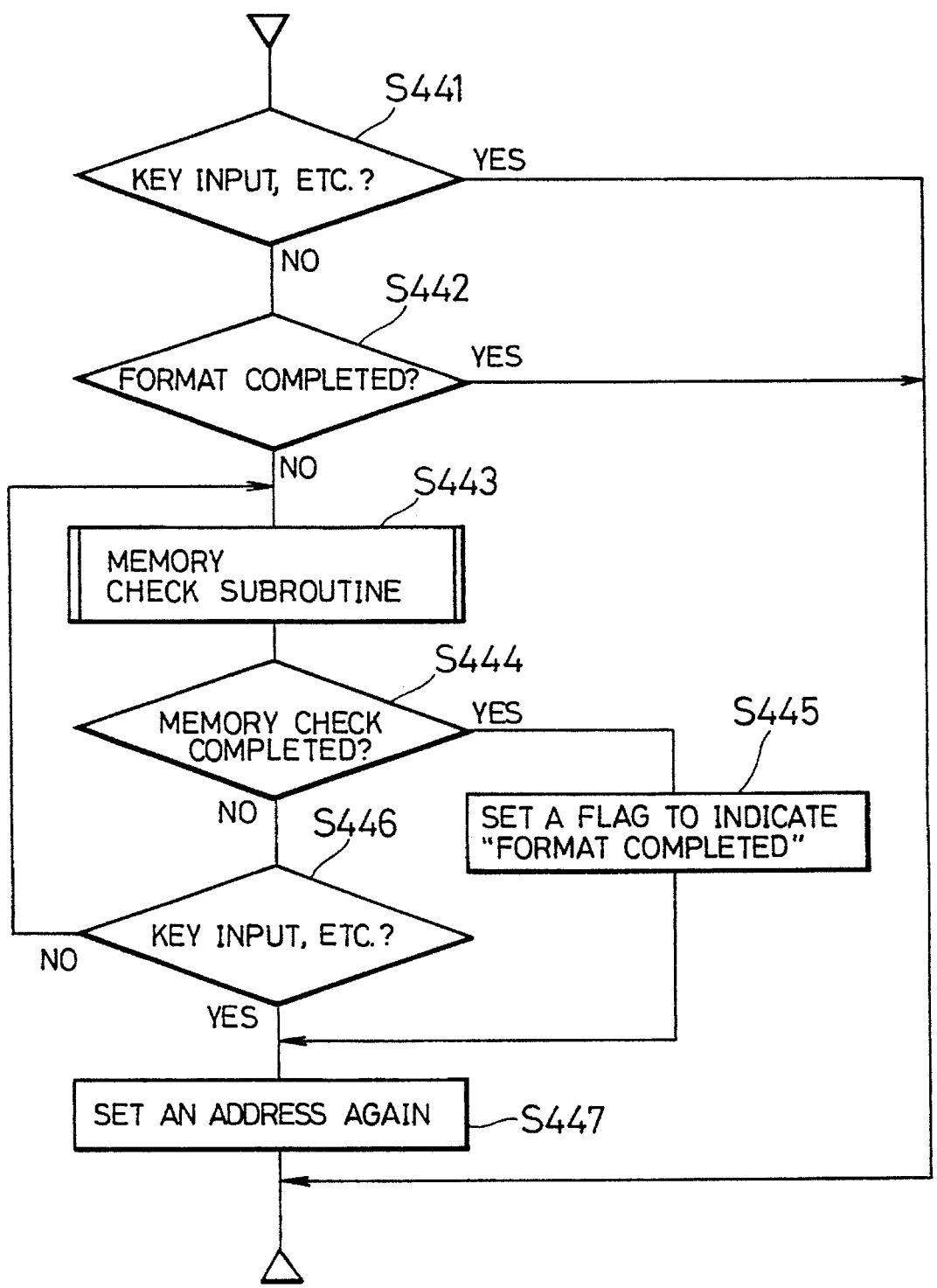
FIG. 46 is a flowchart showing another example in the operation shown in FIG. 45.
Figure 47:
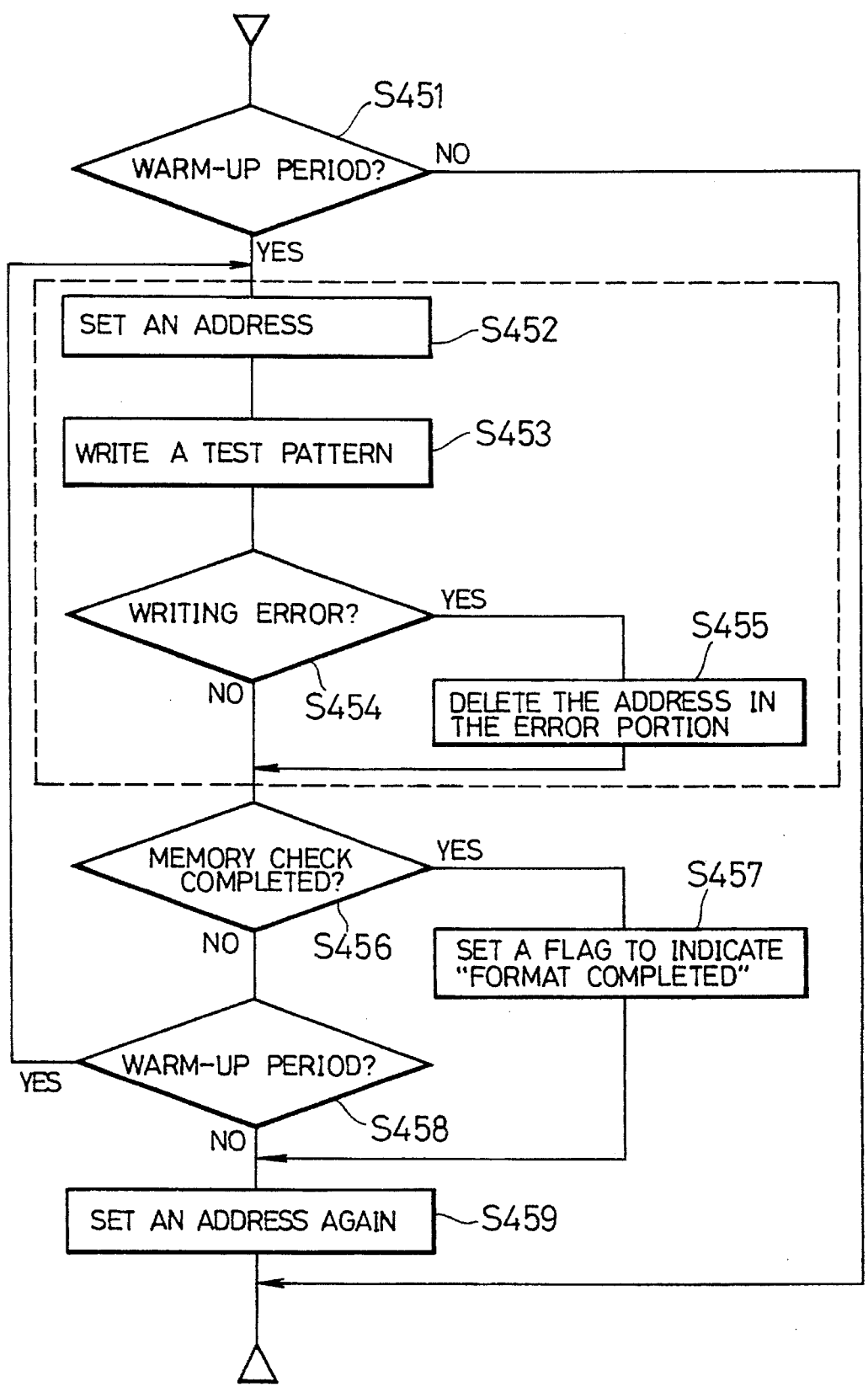
FIG. 47 is a flowchart showing a memory formatting operation corresponding to a writing error occurred in the digital copying machine in accordance with still another embodiment of the present invention.
Figure 48:
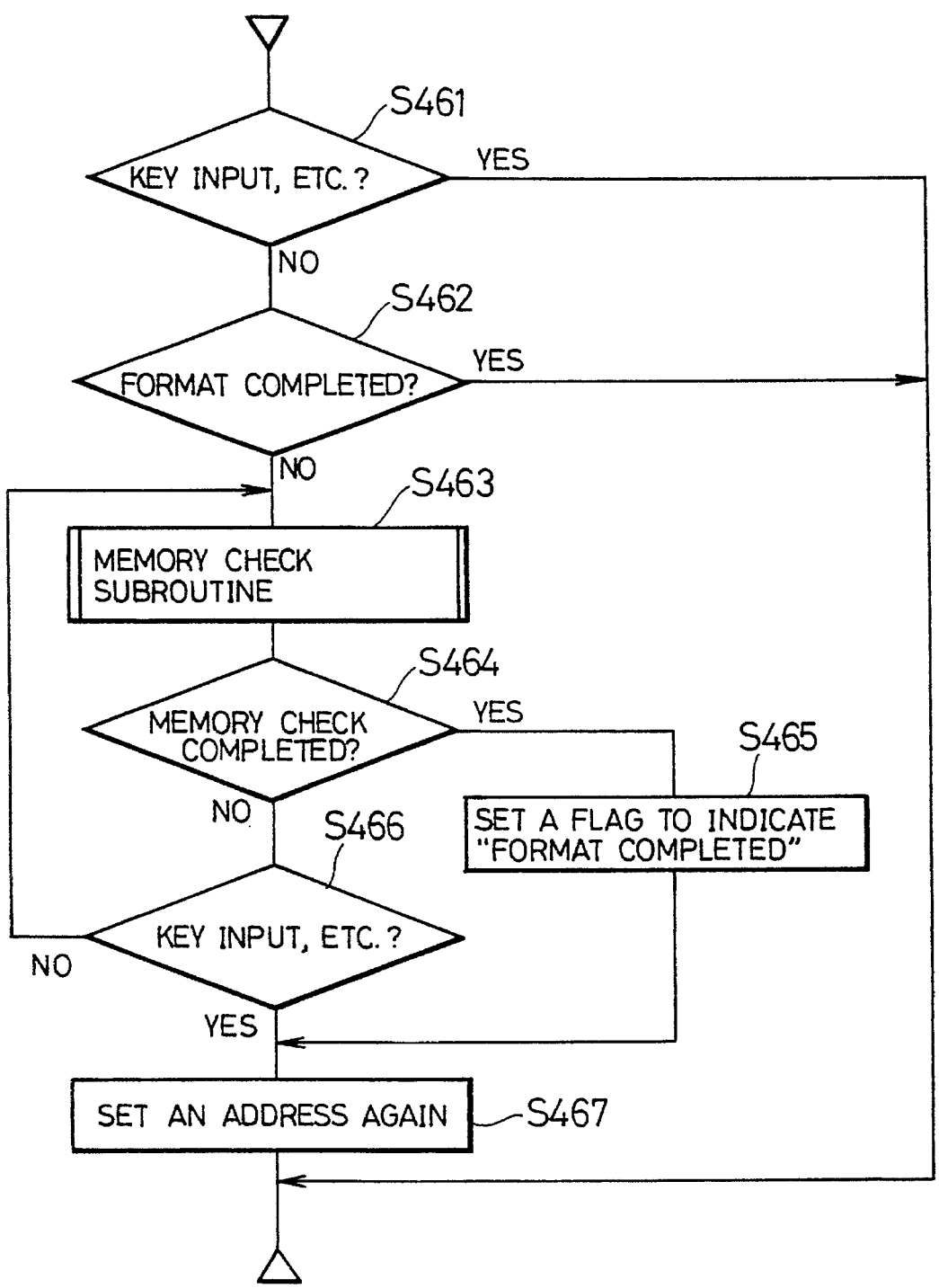
FIG. 48 is a flowchart showing another embodiment of the operation shown in FIG. 47.

A digital copying machine 10 of the present invention has a configuration shown in FIG. 6. As shown in FIGS. 45–47, the memory formatting process is carried out during a warm-up period after the power source is turned ON. As shown in FIG. 46 and FIG. 48, an operation is carried out in the wait state.

In the warm-up operation after the power supply is turned on (S431), the address to be read from the hard disk 66b is set (S431), the address to be read from the hard disk 66b is set (S432). The test pattern is read from the address (S433). Next, when a reading error has occurred in the reading operation (S434), the address in the error section is deleted (S435). The described operations in S432–S435 are the memory check sub-routine in the operations in S432–S435.

Thereafter, it is determined whether or not the check has been completed until the last address of the hard disk 66b (S436). If the result of the determination is NO and still in the warm-up period (S436), and the result of the determination is NO and still in the warm-up period (S438), the memory check sub-routine is repeated.

On the other hand, if the result of the determination is YES, and the flag for completing the memory formatting process is set (S437), the address is set again in the memory area of the hard disk 66b (S439).

In S438, the memory check until the address of the hard disk 66b is completed, i.e., if the warm-up period is completed before completing the memory formatting process, the memory check is interrupted, and with regard to the checked memory area, the address is set again in S439. Here, operations in S431–S439 are the operation in the memory control means in the CPU 65.

As described, upon completing the warm-up period, the memory formatting process continues in the wait state until the operation of the print switch 50b is turned ON.

In the operation shown in FIG. 46, if the key input is not made (S441), and if the memory formatting process is not completed (S442), the memory check subroutine is executed (S443). Thereafter, the hard disk 66b has been checked until the last address of the hard disk 66b (S444), the flag indicating the completion of the memory formatting process is set (S445), and the address is set again with regard to the memory area of the hard disk 66b (S447). The described processes in S441–S447 are operations as memory control means in the CPU 65.

In the warm-up period in FIG. 47 (S451), the address is set in the hard disk 66b (S452), and the test pattern is written (S453). If a writing error has occurred (S454), the address in the error section is deleted (S455).

Thereafter, if the check has been completed until the end of the address of the hard disk 66b (S456), the flag indicating the completion of the process is set (S457), and the address is set back (S459).

In S458, before the memory formatting of the end of address is completed, if the warm-up period is completed, the process is interrupted, and the address is set again with regard to the checked memory area (S459). Here, the described S451–S459 are operations of the memory control means in the CPU 65.

In the operation shown in FIG. 48, it the key input is not made (S461), if the memory formatting process has not been completed (S462), the memory check subroutine is executed (S463). If the hard disk 66 has been checked until the last address (S464), the flag of the completion of the process is set (S465), and the address is set back (S467). The operations in S461–S467 are performed by the memory control means in the CPU 65. The memory formatting process which has not been completed in the described operation continue in the next wait state or warm-up period.

By the memory formatting process, according to the digital copying machine 10 of the present invention, when it is not operated, i.e., a continuous operation from the image data input for obtaining the output image until the copy output, i.e., during the warm-up period or in the stand-by period, the memory formatting process is performed. Therefore, the inconvenience in the operation of the digital copying machine can be avoided by performing the memory formatting process in the period for the memory formatting process or by performing the memory formatting process with a sequential operation until the outputted image is obtained.

In the present embodiment, the memory formatting process is performed with the memory check applied to the entire memory area of the hard disk 66b. However, as in the case of the embodiment 18, the memory formatting process may be performed with a memory check only applied to addresses saved as inhibited address in the RAM 67.

EMBODIMENT 20

A still another embodiment of the present invention will be explained with reference to FIG. 6, FIGS. 49–52. For the sake of convenience, members having the same functions as in the aforementioned embodiment will be designated by the same codes and their descriptions will be omitted.

Figure 51:
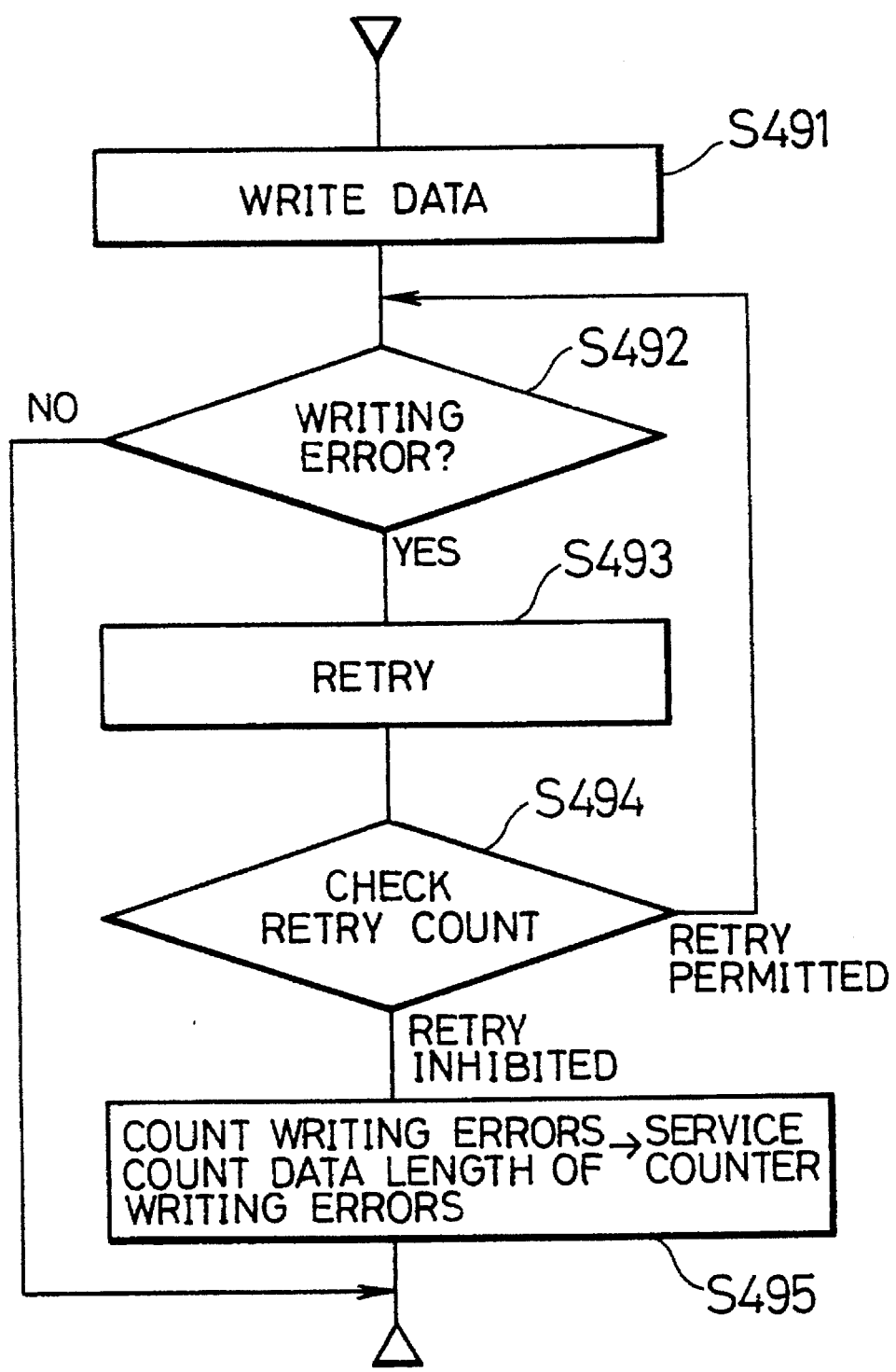
FIG. 51 a flowchart showing an operation corresponding to a writing error in the digital copying machine in accordance with still another embodiment of the present invention.
Figure 52:
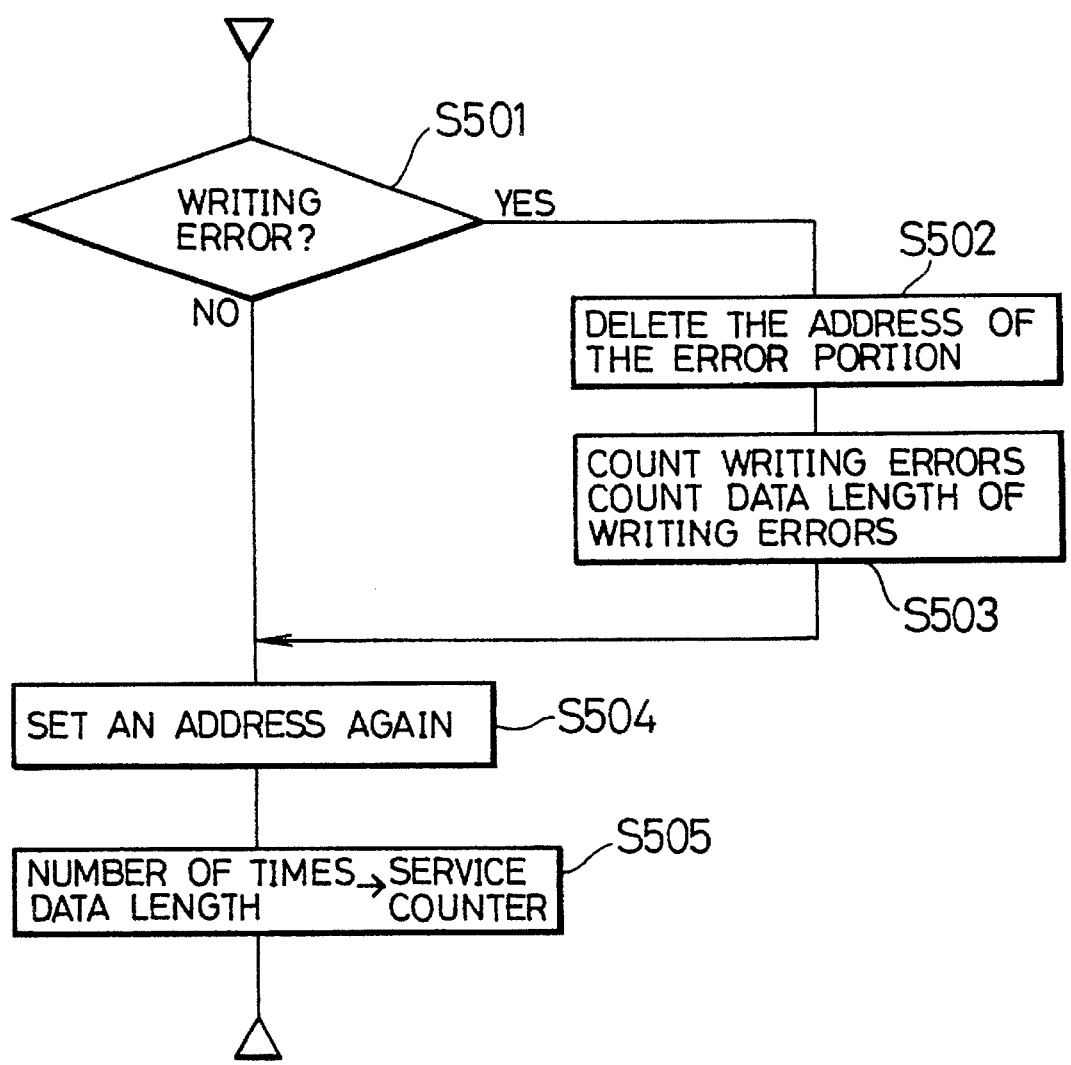
FIG. 52 is a flowchart showing another example the operation shown in FIG. 51.

A digital copying machine 10 in accordance with the present embodiment has a configuration shown in FIG. 6. When a reading error or writing error has occurred, operations shown in FIG. 49 and FIG. 50 or operations FIG. 51 and FIG. 52 are performed, the amount of errors is counted, for example, by counting the number of times the error occurred or accumulated length of image data subject to the error and is saved so that it can be used as a service checking or maintenance checking. Therefore, the digital copying machine 10 of the present invention is provided with a service counter for storing the number of times the error occurred and the accumulated length of the image data subject to the error.

In the present embodiment, the service counter is provided in the RAM 67, and the number of times the error occurred and the accumulated length of the image data subject to the error are counted by the CPU 65. The obtained values are stored in the RAM 67. Therefore, the error amount memory means is composed of the RAM 67 and the CPU 65.

Figure 49:
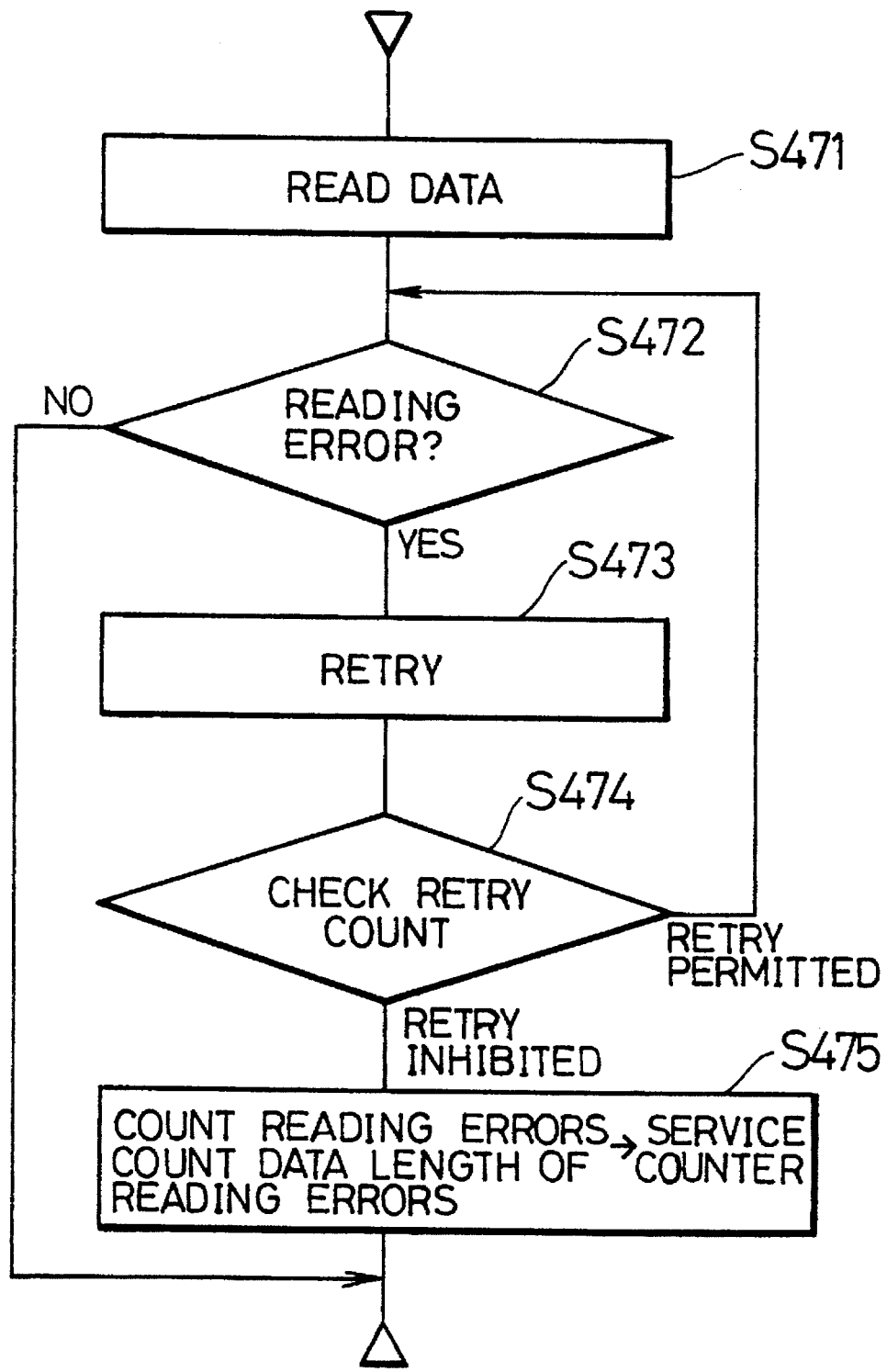
FIG. 49 is a flowchart showing an operation corresponding to the reading error in the digital copying machine in accordance with another embodiment of the present invention.

In the operation shown in FIG. 49, when reading the image data from the hard disk 66b so as to produce copies (S471), if a reading error has occurred (S472), a reading operation is tried again from the address (S473). Regarding the retry, if the reading error remains within the restricted number of times (S474), the number of times reading error occurred that is counted by the service counter is increased by 1, and further the accumulated length of the image data subject to the reading error is added to the counted length (S475). Here, the accumulated length of the image data subject to the reading error is counted by one byte or one sector.

Figure 50:
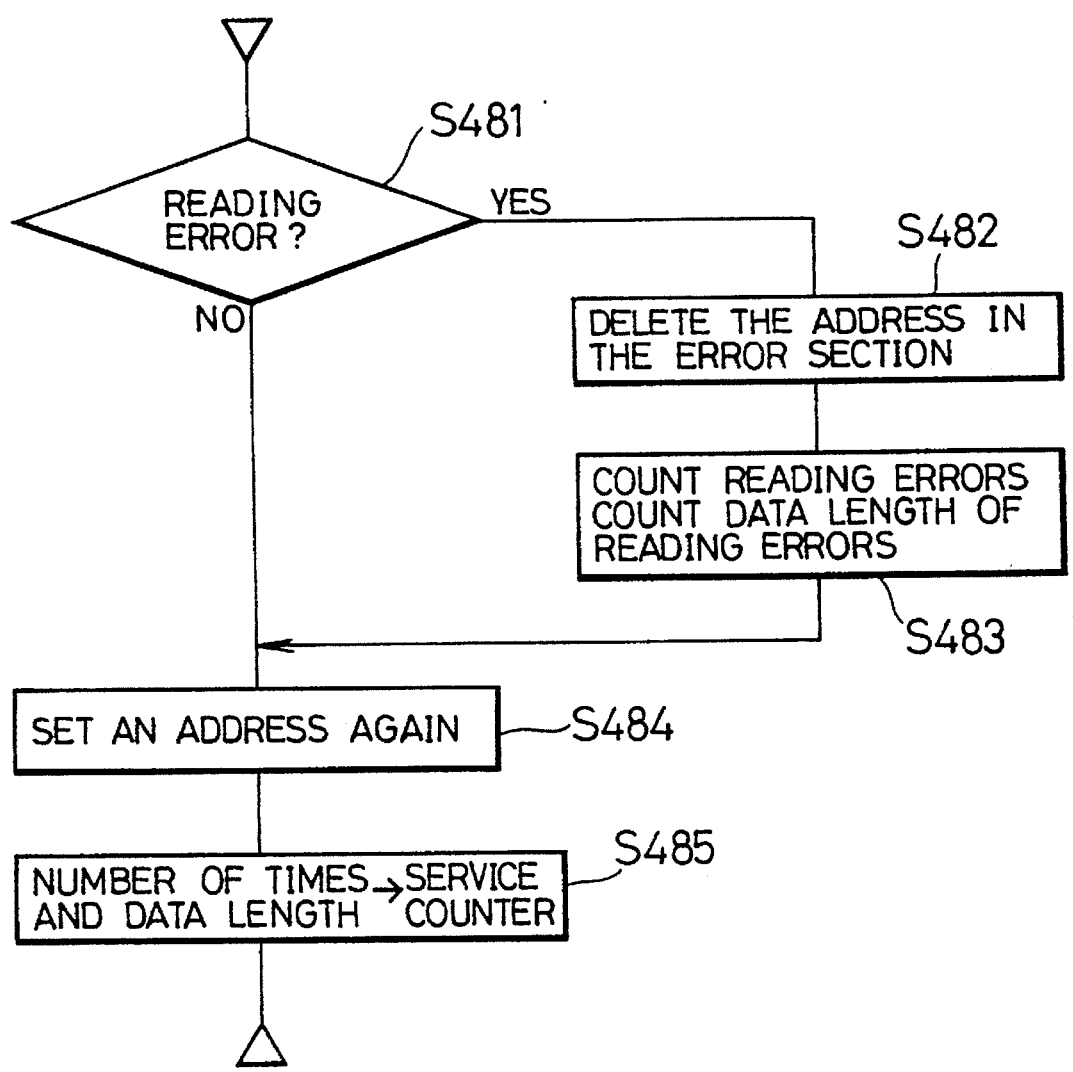
FIG. 50 is a flowchart showing another example of the operation shown in FIG. 49.

As shown in FIG. 50, the number of times the reading error occurred and the accumulated length of the image data subject to the reading error are counted also with regard to the reading error that has occurred in processing the memory format during the warm-up period and the stand-by state. Namely, in the operations shown in FIG. 50, when performing a memory format, if a reading error has occurred (S481), the address in the error section is deleted (S482), and the number of times a reading error has occurred and the length of the image data are counted (S483). Thereafter, in the checked area, the address is set again (S484a), and the counted number of times the error occurred and the accumulated length of the image data subject to the reading error are written in the service counter (S485).

Here, the operations in S475, S483 and S485 are performed by the error amount memory means in the CPU 65 and the RAM 67.

Moreover, when both the memory check and the memory format are performed with respect to the reading area, both processes are tested from the same address. Therefore, in the arrangement where the memory check is performed, where the memory check and the memory formatting process are performed, the count operation is performed in the memory formatting process.

The operations coping with the situation where a reading error has occurred are shown in FIG. 49 and FIG. 50, and the operations for coping with the situation where a writing error has occurred are shown in FIG. 51 and FIG. 52. The operations in S491–S495 shown in FIG. 51 correspond to the operations in S471–S475 shown in FIG. 49, and the operations in S501–S505 shown in FIG. 52 correspond to the operations in S481–S485 shown in FIG. 50. Therefore, the operations shown in FIG. 49 and FIG. 50 related to the writing error are the same as the operations related to the reading error except form the differences between the writing operation and the reading operation of the image data. Here, operations in S495, S503 and S505 are the operations by the error amount memory means in the CPU 65 and the RAM 67.

In the described arrangement, according to the digital copying machine 10 of the present invention, in service checking or maintenance checking, amounts of reading error and writing error can be seen by counting the number of times the error has occurred and the accumulated length of the image data by the service counter. When the number of times the error has occurred and the accumulated length of the image data exceed the predetermined amount, or a sudden increase in the amount of error occurs within a predetermined period, a timing for exchanging the hard disk 66b as image memory can be seen. Therefore, in an appropriate timing for exchanging, the hard disk 66b can be changed. Therefore, since adverse effects from the reading error and the writing error can be suppressed, smoother reading and writing operations can be achieved, thereby achieving a smoother copying operation.

EMBODIMENT 21

A still another embodiment of the present invention will be explained with reference to FIG. 6, FIGS. 53 and 54. For the sake of convenience, members having the same functions as in the aforementioned embodiment will be designated by the same codes and their descriptions will be omitted.

A digital copying machine 10 in accordance with the present embodiment has a configuration shown in FIG. 6. According to the digital copying machine 10 of the present embodiment, a reading test or writing test of image memory are preformed by simulation, etc., as shown in FIG. 53 and FIG. 54.

Figure 53:
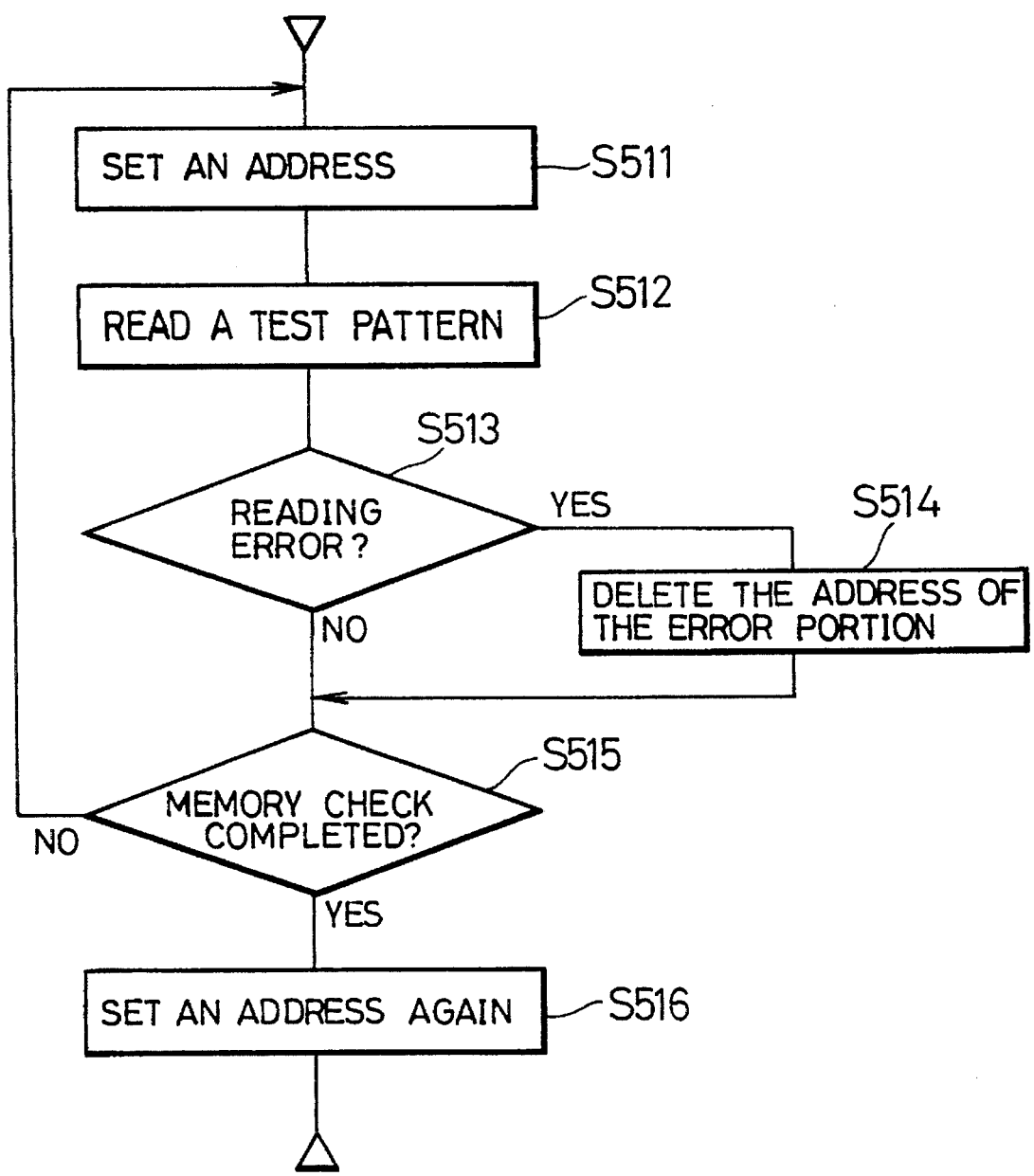
FIG. 53 is a flowchart showing a reading test operation in installing or exchanging a digital copying machine in accordance with still another embodiment of the present invention.

The operation shown in FIG. 53 is related to a reading test to be carried out when installing and exchanging a hard disk 66b. In the operation, the test pattern is written in the hard disk 66b beforehand. In this state, first, the address to be read is set (S511). The test pattern written in the address is read (S512). When a reading error has occurred (S513), the address in the error section is deleted (S514). The described process is carried out by one byte or one sector. The described operations are performed from all the memory area of the hard disk 66b (S515), and upon completion, the address is set again (S516).

Figure 54:
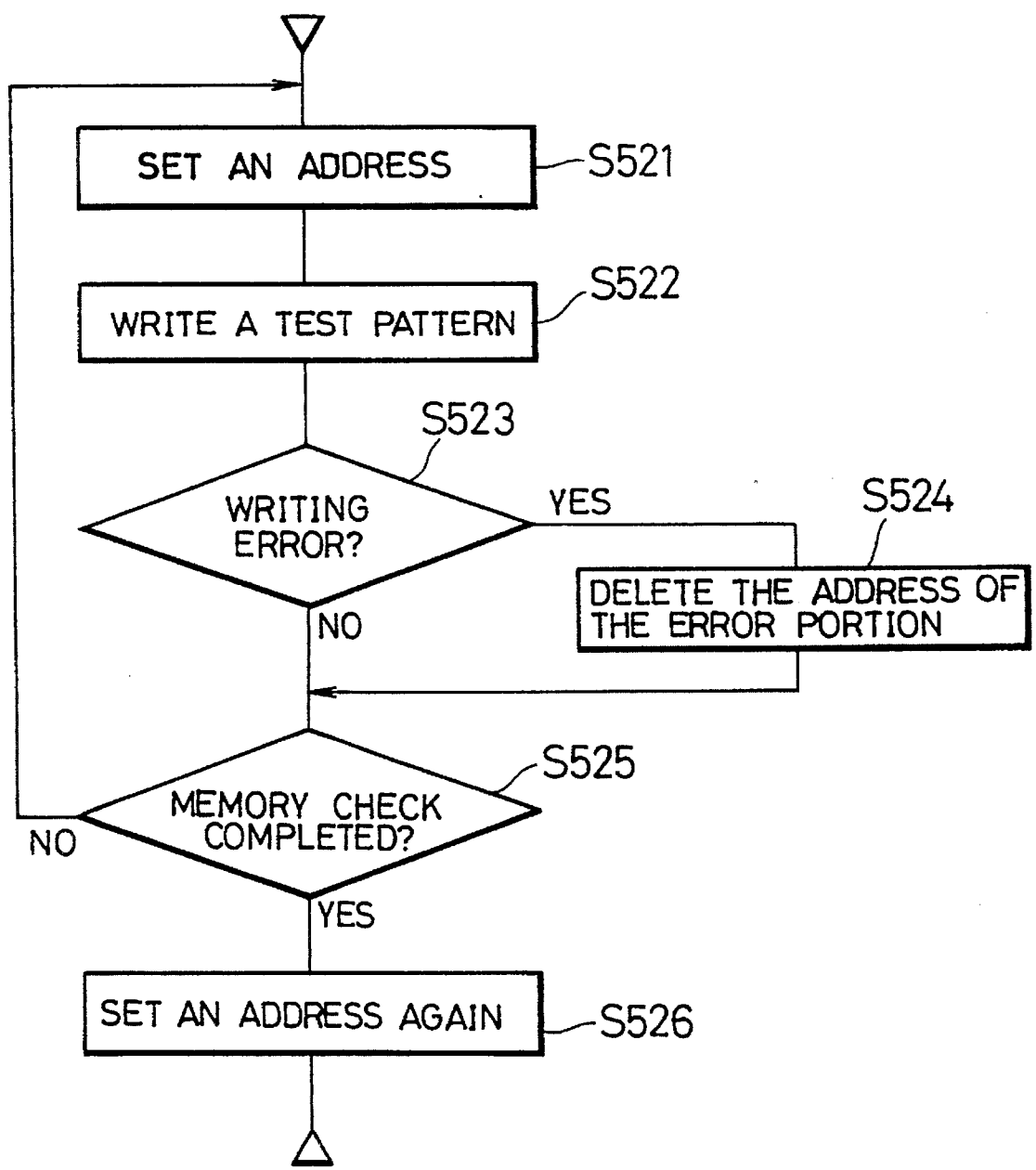
FIG. 54 is a flowchart showing a writing test operation corresponding to a reading test.

In the writing test shown in FIG. 54, an address to be written in the hard disk 66b is set (S521), and the address is written in the test pattern (S522). When a writing error has occurred (S523), the address in the error section is deleted (S524). The described operations are performed from all the memory area in the hard disk 66b (S525). When completing the operations, the address is set again (S526). Here, the operations shown in FIG. 53 and FIG. 54 are performed by the memory control means in the CPU 65.

As described, in the digital copying machine 10 of the present embodiment, the memory check is performed. Since the apparatus 10 has the memory formatting function which determines the address subject to the reading error or writing error as an inhibited address, the memory formatting process can be applied to the hard disk 66b when installing and exchanging the hard disk 66b. Therefore, according to the arrangement of the digital copying machine 10 in accordance with the present invention, frequent memory check or memory formatting process due to the writing error or the reading error can be prevented, thereby avoiding the operation inferior of the digital copying machine 10. As a result, adverse effects from the reading error and the writing error may be suppressed, thereby smoothly performing the writing and reading operations of the image data, i.e., the copy outputting operation.

EMBODIMENT 22

A still another embodiment of the present invention will be explained with reference to FIG. 6, FIG. 44, FIG. 47, FIG. 48, FIG. 51 FIG. 54 and FIG. 55. For the sake of convenience, members having the same functions as in the aforementioned embodiment will be designated by the same codes and their descriptions will be omitted.

Figure 55:
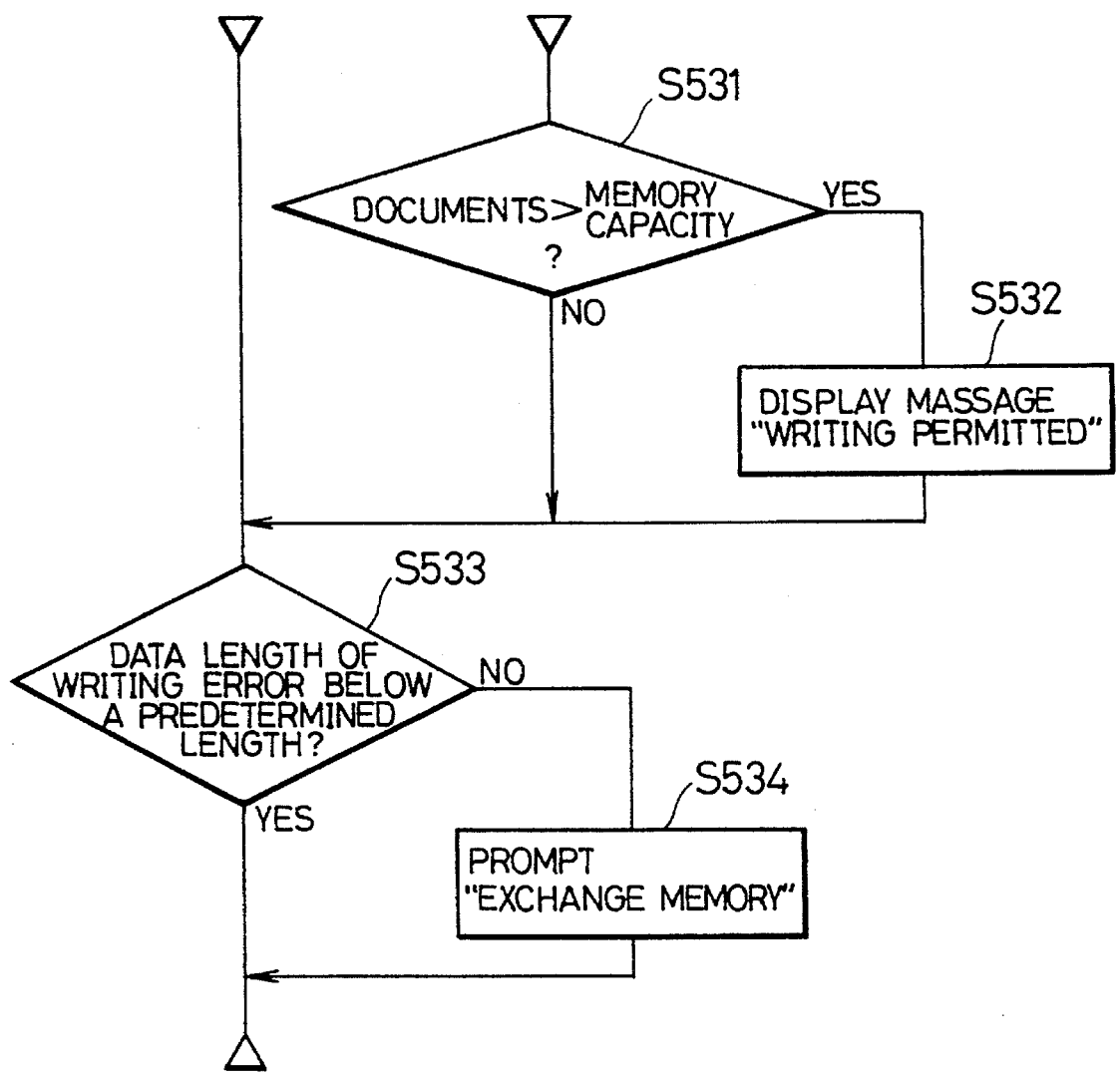
FIG. 55 is a flowchart showing a writing error occurred in a digital copying machine in accordance with still another embodiment of the present invention.

A digital copying machine 10 in accordance the present embodiment has a configuration shown in FIG. 6. In the process where the memory area subject to the writing error is processed, for example, by the memory formatting process, if an amount of memory area subject to the inhibited area in the hard disk 66b exceeds a predetermined amount, by the operation shown in FIG. 55, an operation for exchanging the hard disk 66b by the operation shown in FIG. 55 is performed. By carrying out the operation, in the digital copying machine 10 of the present invention has a configuration shown in FIG. 6, a counter is provided for ensuring the amount of writing error, the accumulated length of the image data. In the present embodiment, the RAM 67 is provided with the counter, and the length of image data subject to the error is counted by the CPU 65, and is stored in the RAM 67.

Figure 44:
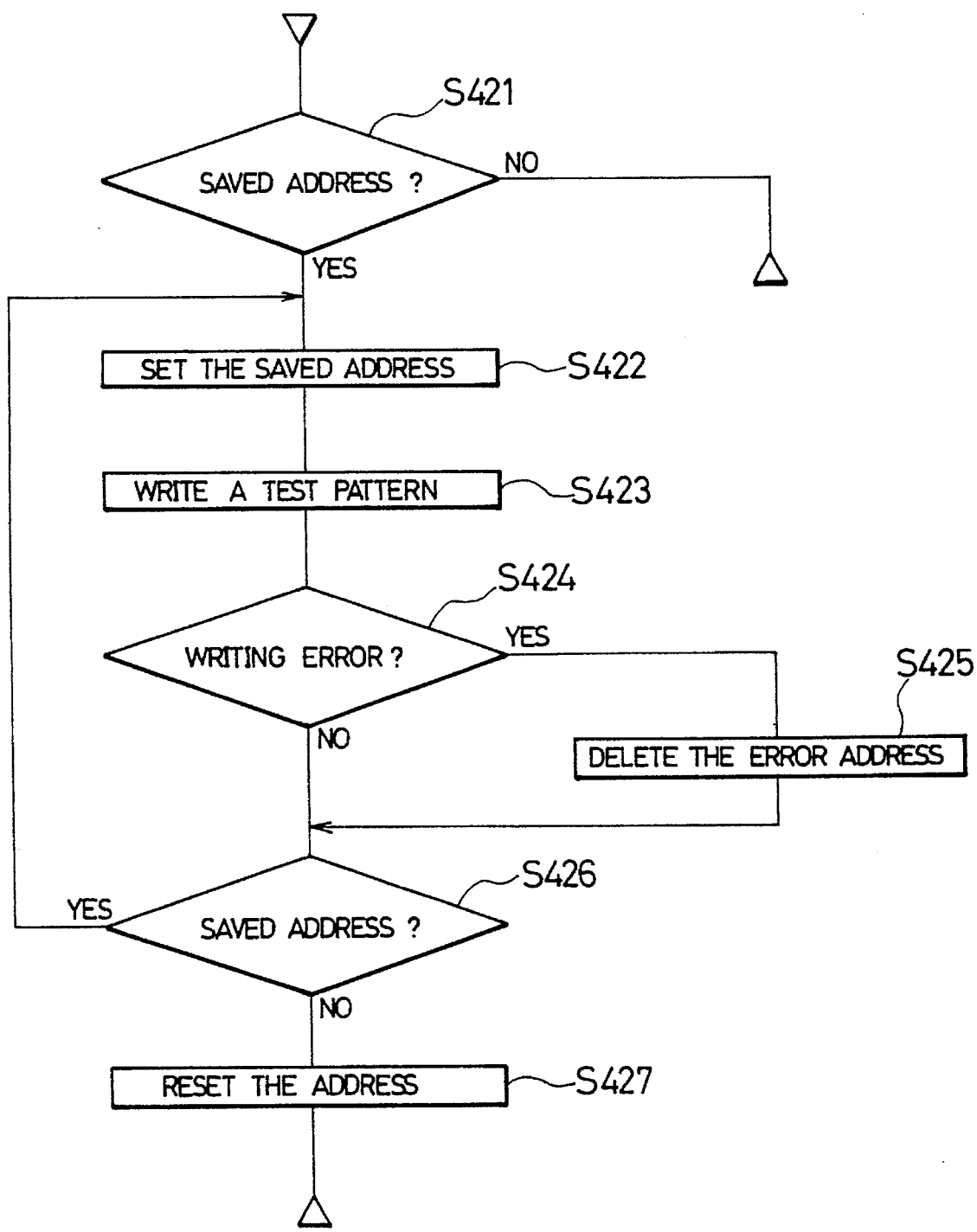
FIG. 44 is a flowchart showing a memory formatting operation corresponding to a writing error in the digital copying machine.

In the operation shown in FIG. 55, the memory formatting process shown in FIG. 44, the memory formatting process during the warm-up period or the stand-by period in FIG. 47 and FIG. 48, or the operation subject to the memory formatting process in the writing test shown in FIG. 54, it is determined whether or not the length of the image data subject to the writing error is within a predetermined length (S533).

The length of the image data subject to the writing error is subject to the amount of memory area in the hard disk 66b, in which the writing error is deleted. The predetermined amount is a reference value that determines whether or not the remaining amount of the memory area exists in the hard disk 66b.

If the result of the determination in S533 is NO, a message for exchanging the image memory, i.e., the hard disk 66b is displayed on the display 50a as warning means, and the operation is completed (S534). Here, the operations in S533 and S534 are the operation of the operation control means in the CPU 65.

When the message is displayed, the hard disk 66b is exchanged. Therefore, the predetermined value is set for exchanging the hard disk 66b.

On the other hand, in the subsequent operation after the writing operation for producing copies in FIG. 51, the number of documents to be copied, i.e., the amount of inputted image data is above the remaining memory capacity of the hard disk 66b known by the image data length subject to the writing error (S531), inputted image data cannot be written in the hard disk 66b. Therefore, for example, a message indicating the writing operation is not permitted for n pieces of the documents, and the message indicating the display section 50a is displayed (S532).

By the displayed message, in the case where the operator cannot copy the last document among the documents to the copied, or when copying by the editing function, since there exists a document which cannot be copied, it can be seen that the editing function cannot be executed. Accordingly, it is determined whether or not the copying operation cannot be executed.

Thereafter, in the state where copies cannot be executed, the sequence goes onto S533, and the subsequent copying operations can be performed.

According to the digital copying machine 10 in accordance with the above arrangement, the area subject to the writing error is determined as an inhibited area, and when the permissible area of the hard disk 66b is less than a predetermined area, that informs the user by displaying it using the display section 50a therefore based on this, the hard disk 66b can be exchanged, with an increase by the writing error, the damage in writing the image data in the hard disk 66b by an increase in the writing error can be prevented, which cases a damage, thereby smoothly carrying out a copy output operation by preventing an adverse effect from the writing error.

EMBODIMENT 23

A still another embodiment of the present invention will be explained with reference to FIG. 6 and FIG. 56. For the sake of convenience, members having the same functions as in the aforementioned embodiment will be designated by the same codes and their descriptions will be omitted.

Figure 56:
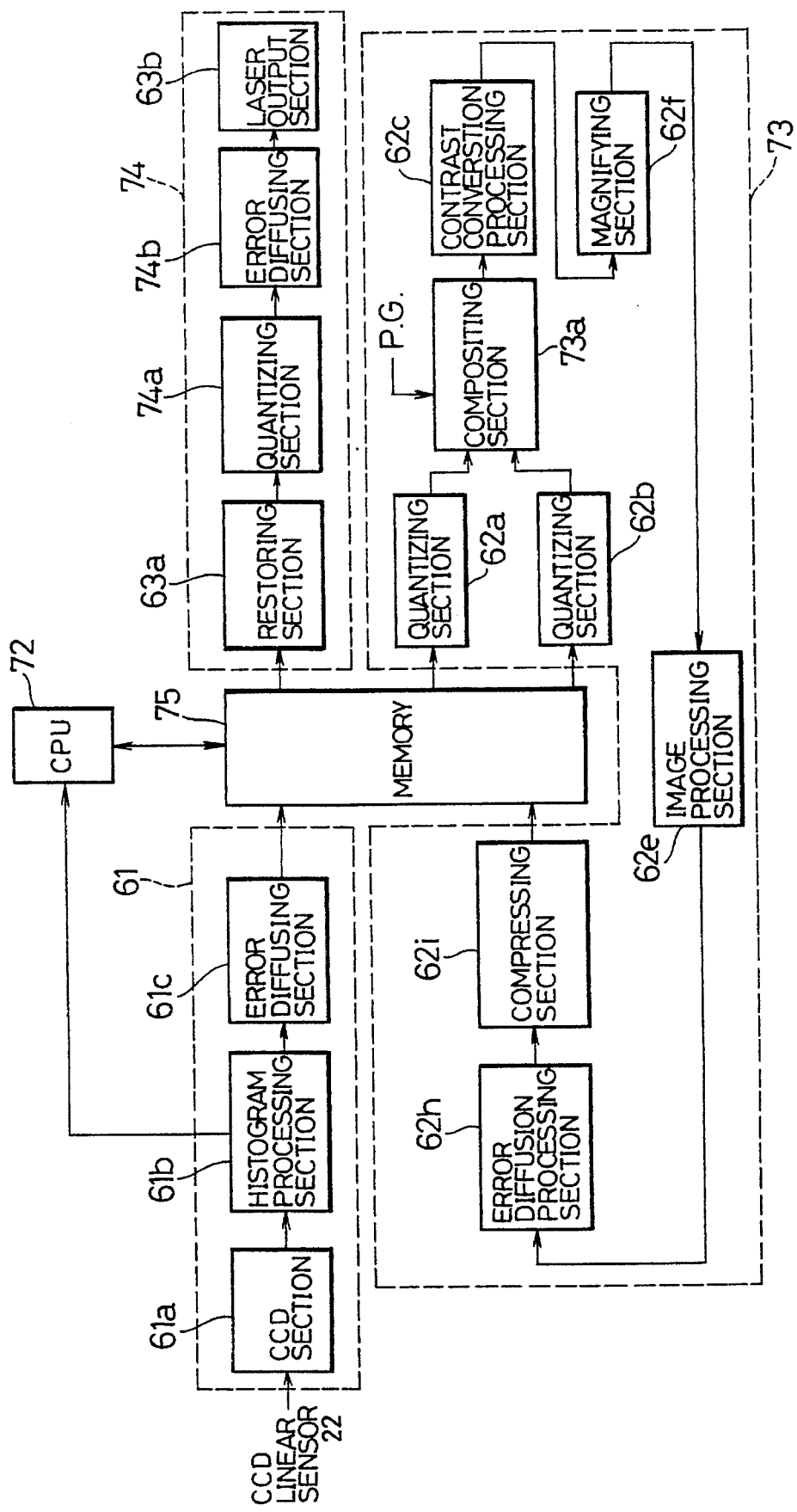
FIG. 56 is a block diagram showing the configuration of an image processing control section in the digital copying machine in accordance with another embodiment of the present invention.

An image processing controlling section of the digital copying machine 10 in the present embodiment has a configuration shown in FIG. 56. The image control processing section is provided with an image data input section 61, a memory 75, a CPU 72, an image data processing section 73 and an image data output section 74.

The image data processing section 73 is provided with quantizing sections 62a and 62b, a composite processing section 73a, a density conversion processing section 62c, a magnification processing section 62f, an image processing section 62e, a difference dispersion processing section 62h and a compression processing section 62i. The basic operation is the same as the image data processing section 62. In the composite processing section 73a, a logic calculation by per picture element, i.e., the summation of the logic is selectively performed. The basic operation is the same as the image data processing section 62. The composite processing section 73a selectively performs the calculation of the logic per picture element, i.e., the logic summation or logic product or exclusive logic summation. The data subject to the object of the calculation is the image data and the bit data from the pattern simulation (PG). The other processing sections in the image data processing section 62 are as previously described.

The image data output section 74 is provided with a restoring section 63a, a quantizing section 74a, an error dispersion processing section 74b and the laser output section 63b. The image data output section 74 restores the compressed image data stored in the memory 75 after reconverting the data into the data of 256 tones. Further, an error dispersion is applied by converting the data into the data of 4 tones that forms a smoother image than the data of two tones. Namely, in the quantizing section 74a, similar processes as the quantizing sections 62a and 62b of the image data processing section 62 are performed. Similarly, in the error dispersion processing section 74b, the similar process as the error dispersion processing section 61c of the image data input section 61 are performed. The operations by other sections are as previously explained.

The memory 74 is composed of a hard disk device 66 shown in FIG. 6, and the CPU 72 controls a writing operation and reading operation of image data with respect to the memory 75. Namely, in the digital copying machine 10 of the present invention, inputted image data is written directly in the memory 75, for example, in the hard disk, and the image data is read the memory 75, so as to produce copies. In the digital copying machine 10 in accordance with the present embodiment, writing and reading operations are as explained in the previous embodiments.

The first digital image forming apparatus in accordance with the present invention is arranged so as to include: an image memory; data writing means for writing inputted image data into the image memory; data reading means for reading the image data from the image memory; image output means for outputting the image data read from the image memory through visualization; error detection means for detecting at least a writing error occurred during a writing operation of the image data or a reading error occurred during a reading operation of the image data; and operation control means for controlling such that when an error is detected, either one of the data writing means and the data reading means performs an operation related to an occurrence of an error with respect to a next memory area in the image memory.

According to the arrangement, even when a writing error in the image data or reading error from the image memory has occurred, an image output operation by the image output means is stopped. Moreover, the amount of missing data by the reading error would not affects the copied image because it is composed of the image data of huge amount. Therefore, a problem would not occur in the image outputted by the image output means, and adverse effects from the writing error or the reading error can be suppressed, thereby permitting a continuous image output operation.

The second digital image forming apparatus in accordance with the present invention is arranged so as to include: an internal memory which can maintain a memory content even when a power switch of the apparatus is turned OFF; image output means for outputting image data read from the internal memory through visualization; trouble detection means for detecting an occurrence of trouble that requires to be processed with a power switch switched to the OFF position during the operation of the image output means; and operation control means which controls so as to store the image data in the internal memory, that is inputted for performing an image output operation at least when an occurrence of trouble is detected by the trouble detection means, and after the trouble is settled, controls the image output means so as to continue the output operation of the image data stored in the internal memory.

According to the arrangement of the second digital image forming apparatus of the present invention, an unnecessary process for reinputting the image data to be outputted through visualization, for example, by a reading operation of the document image can be achieved.

The third digital image forming apparatus in accordance with the present invention is arranged so as to include: an image memory for storing image data; data reading means for reading out the image data from the image memory; image output means for outputting the image data read from the image memory through visualization; error detection means for detecting an occurrence of an error during a reading operation; data interpolation means for interpolating the image data subject to a reading error; and reading control means for controlling the data interpolation means so as to perform the data interpolating operation when the reading error is detected by the error detection means, while controls the data reading means so as to continue the data reading operation with respect to a next memory area in the image memory.

According to the arrangement of the third digital image forming apparatus, adverse effects from the trouble of reading error can be suppressed, and a continuous image output operation is enabled. Moreover as the image data subject to the reading error, since the image data is interpolated, the image quality can be prevented from being lowered.

The fourth digital image forming apparatus in accordance with the present invention having the arrangement of the first digital image forming apparatus is arranged so as to further includes: memory control means for processing so as to determine the memory area subject to the reading error in the image memory as an inhibited area.

As a result, in addition to the effect of the present invention in claim 1, the missing data due to a reading error or writing error from the image memory can be prevented, and a smoother writing or reading operation (image output operation) of the image data with respect to the image memory can be achieved.

The fifth digital image forming apparatus having the arrangement of the fourth digital image forming apparatus is arranged such that the memory control means is activated when the digital image forming apparatus does not perform an image forming operation with the power switch switched to the ON position.

In addition to the effect from the arrangement of the fourth apparatus, the memory means for determining the memory area wherein an error has occurred as an inhibited area is performed during the warm-up period or in the stand-by state where the warm-up period is completed. An inconvenient state which would have occurred when setting a time separately for processing of the memory control means or continuous operation until the outputted image is processed by the memory control means can be avoided.

The sixth digital image forming apparatus having the arrangement of first or third digital image forming apparatus, is arranged so as to further include: operation controls for stopping an image output operation when an amount of error detected by the error detection means exceeds a permissible amount.

According to the sixth digital image forming apparatus, an image output operation is stopped when the amount of writing error or reading error exceeds the permissible amount, thereby preventing images of low quality from being outputted.

The seventh digital image forming apparatus of the present invention, having the digital image forming apparatus of the first or third apparatus is arranged so as to further include: automatic feeding means for transporting a plurality of documents set in the document set position in the document reading position in correct order according to a document image reading operation by the image input means; image input means for reading an image on the document set in the document reading position; informing means for informing a user; operation start instruction input means for inputting an instruction for starting an image output operation, and operation control means for controlling the informing means so as to urge the image forming operation to be stopped when an amount of error detected by the error detection means exceeds a permissible amount, to enable the image output operation to be restarted by inputting an instruction to start the image output operation, to set back a piece of document corresponding to image data processed before the stoppage of the image output operation to the document set position of the automatic document feeding means, and thereafter to operate the operation start instruction means.

The eighth digital image forming apparatus in accordance with the present invention having the arrangement of the first or third apparatus is arranged so as to further include: automatic feeding means for transporting a plurality of documents set in the document set position in the document reading position in correct order according to a document image reading operation by the image input means; image input means for reading an image on the document set in the document reading position; informing means for informing a user; operation start instruction input means for inputting an instruction for starting an image output operation, and operation control means for controlling the informing means so as to urge the image forming operation to be stopped when an amount of error detected by the error detection means exceeds a permissible amount, to enable the image output operation to be restarted by inputting an instruction to start the image output operation, to set back a piece of document corresponding to image data processed before the stoppage of the image output operation to the document set position of the automatic document feeding means, and to operate the operation start instruction means, wherein the operation control means inhibits an image outputting operation to be restarted when a processing function required for processing the document image in a predetermined order is selected.

According to the arrangement of the eighth digital image forming apparatus of the present invention, in addition to the effects achieved from the first or third digital image forming apparatus, during output operation of the document image, i.e., the copying operation by the automatic document feeding means, when an amount of the reading error exceeds the permissible amount, the image output operation is stopped, thereby preventing the image of low quality from being outputted. Moreover, when the process that requires the document image to be processed in a predetermined order is selected, a piece of document corresponding to the image data read from the image memory before the image output operation is stopped, a piece of document having the image data that had been read out from the image memory before the image output operation is stopped is set to the document set position of the automatic document feeding means. Then, by operating the operation start instruction input means, the image output operation of the document image that had been inhibited to be outputted can be restarted. On the other hand, when the process that required the document image to be processed in a redetermined order is selected, the image output operation with this function is inhibited to restart, thereby preventing an inferior by the process function.

The ninth digital image forming apparatus having the arrangement of the first or third digital image forming apparatus, is arranged so as to further include: error amount memory means for storing an accumulated amount of error detected by the error detection means.

According to the ninth digital image forming apparatus, in addition to the effect from the first or third apparatus, an amount of writing error occurred in writing the image data in the image memory or reading error occurred in reading the image data from the image memory is stored, for example, by the number of times a writing error or reading error occurred or an accumulated length of the image data subject to the writing error or reading error. Therefore, the accumulated values can be used in service checking or maintenance checking. When the accumulated value of the error amount exceeds the permissible amount, or it shows a sudden increase, the user can see that it is the time for exchanging the image memory. Therefore, the image memory can be exchanged in an appropriate timing, thereby preventing the adverse effects from the writing error or reading error, thereby smoothly performing image data reading operation, i.e., copy output operation.

The tenth digital image forming apparatus of the present invention having the arrangement of the first or third digital image forming apparatus, is arranged so as to further includes: error mount memory means for storing an accumulated amount of writing errors detected by the error detection means, memory control means for processing the memory area subject to the writing error in the image memory to be determined as an inhibited area, warning means for giving a user a warning, and operation control means when a remaining capacity in the image memory becomes less than the predetermined amount after the process by the memory control means.

According to the arrangement of the tenth digital image forming apparatus, in addition to the effects form the first or third invention, when remaining capacity of the image memory becomes less than the predetermined after determining the memory area subject to the writing error is inhibited area, a warning is given to the user so that the user can exchange the image memory. Therefore, the problem that the writing operation of the image data into the image memory with an increase in the writing error can be prevented beforehand, thereby suppressing the adverse effects from the writing error, thereby achieving a smoother copy output operation.

The eleventh digital image forming apparatus is arranged so as to includes: an image memory; image output means for outputting an image data read from the image memory through visualization; data writing means for writing inputted image data into the image memory; error detection means for detecting a writing error into the image memory when the data writing means is activated; and writing control means for controlling the data writing means so that image data is written in the error writing memory section set as a memory section wherein a writing error is less likely to occur compared with the memory area subject to the writing error.

According to the above arrangement, when a writing error has occurred in the image data, a smoother writing operation can be achieved, and the problem that writing operation, i.e., the image output operation is stopped by the writing error can be avoided. Namely, adverse effects from the writing error can be suppressed, thereby permitting a continuous copy output operation.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A digital image forming apparatus, comprising:
   an image memory;
   data writing means for writing inputted image data into said image memory;
   data reading means for reading the image data from said image memory;
   image output means for outputting the image data read from said image memory through visualization;
   error detection means for detecting at least a writing error occurred during a writing operation of the image data or a reading error occurred during a reading operation of the image data; and
   operation control means for controlling such that when the error is detected, either one of said data writing means and said data reading means performs an operation related to an occurrence of the error with respect to a next memory area in said image memory.

2. The digital image forming apparatus as set forth in claim 1, further comprising memory control means for processing a memory area in said image memory in which an error had occurred to be determined as an inhibited area.

3. The digital image forming apparatus as set forth in claim 2, wherein said memory control means is activated when an image forming operation is not performed after the power switch is turned ON.

4. The digital image forming apparatus as set forth in claim 1, wherein said operation control means controls said data reading means so as to retry within a restricted number of times, a reading operation from a memory area wherein a reading error has occurred, while controls said data reading means, when a reading error still remains after retrying the reading operation the restricted number of times, so as to perform a data reading operation from a next memory area in said image memory.

5. The digital image forming apparatus as set forth in claim 1, wherein said operation control means controls said data writing means so as to retry within a restricted number of times, a writing operation with respect to the memory area wherein a writing error has occurred, while controls said data writing means so as to perform a data writing operation in a next memory area in said image memory when a writing error still remains after retrying the writing operation the restricted number of times.

6. A digital image forming apparatus, comprising:
   an image memory for storing image data;
   data reading means for reading out said image data from said image memory;
   image output means for outputting the image data read from said image memory through visualization;
   error detection means for detecting an occurrence of an error during a reading operation of the image data;
   data interpolation means for interpolating the image data subject to a reading error; and
   reading control means for controlling said data interpolation means so as to perform the data interpolating operation when the reading error is detected by said error detection means, while controls said data reading means so as to continue the data reading operation with respect to a next memory area in said image memory.

7. The digital image forming apparatus as set forth in claim 6, wherein said reading control means controls said data reading means so as to retry a reading operation from the memory area subject to the reading error within a restricted number of times, and when the reading error still remains after retrying the reading operation the restricted number of times controls said data reading means so as to perform the data reading operation with respect to the next memory area in said image memory.

8. The digital image forming apparatus as set forth in claim 7, wherein said data interpolation means performs an interpolation based on an average density in a predetermined area when a retry count exceeds a restricted number of times and a difference in the maximum density and the minimum density of the predetermined area including the central position of the memory region is within a threshold value, while performs an interpolation operation based on a maximum density or a minimum density, which corresponds to a greater number of picture elements.

9. The digital image forming apparatus as set forth in claim 7, wherein said data interpolation means performs an interpolation based on image data at least in a main scanning direction or a sub-scanning direction in a position where the image data is stored in the memory area subject to the reading error.

10. The digital image forming apparatus as set forth in claim 9, wherein said data interpolation means performs an interpolation based on a density when densities of adjoining areas at least in one direction of the main scanning direction and the sub-scanning direction are identical, while performs an interpolation based on an average density of the adjoining areas in at least one direction of the main scanning direction and the sub-scanning direction when the densities of the adjoining areas are different.

11. The digital image forming apparatus as set forth in claim 7, said data interpolation means performs an interpolation based on saturation data obtained based on image data in a color of the memory area subject to the reading error and image data in two other colors which determine a color in an image portion.

12. The digital image forming apparatus as set forth in claim 11, wherein said data interpolation means performs an interpolation based on the saturation data and image data surrounding the memory area subject to the reading error.

13. The digital image forming apparatus as set forth in claim 11, wherein said data interpolation means performs a data interpolation based on the saturation data and the image data in the memory area subject to the reading error at least in one direction of the main scanning direction and the sub-scanning direction.

14. The digital image forming apparatus as set forth in claim 1, further comprising:
   means for stopping an image outputting operation when an amount of error detected by said error detection means exceeds a permissible amount.

15. The digital image forming apparatus as set forth in claim 6, further comprising:

means for stopping an image output operation when the amount of error detected by said error detection means exceeds the permissible amount.

16. The digital image forming apparatus as set forth in claim 1, further comprising:

automatic document feeding means for transporting a plurality of documents set in the document set position according to the document image reading operation of said image input means in order;

image input means for reading images on the document set in the document reading position in order;

informing means for informing a user;

operation start instruction means for inputting an instruction for starting an image output operation; and operation control means for controlling said informing means so as to urge the image output operation to be stopped when an amount of error detected by said error detection means exceeds a permissible amount, to enable the image output operation to be restarted by inputting an instruction to start the image output operation, to set back a piece of document corresponding to image data processed directly before the stoppage of the image output operation to the document set position of said automatic document feeding means, and thereafter to operate said operation start instruction means.

17. The digital image forming apparatus as set forth in claim 6, further comprising:

automatic feeding means for transporting a plurality of documents set in the document set position in the document reading position in correct order according to a document image reading operation by said image input means;

image input means for reading an image on the document set in the document reading position;

informing means for informing a user;

operation start instruction input means for inputting an instruction for starting an image output operation, and operation control means for controlling said informing means so as to urge the image forming operation to be stopped when an amount of error detected by said error detection means exceeds a permissible amount, to enable the image output operation to be restarted by inputting an instruction to start the image output operation, to set back a piece of document corresponding to image data processed before the stoppage of the image output operation to the document set position of said automatic document feeding means, and thereafter to operate said operation start instruction means.

18. The digital image forming apparatus as set forth in claim 16, wherein the operation control means inhibits an image outputting operation to be restarted when a processing function required for processing the document image in a predetermined order is selected.

19. The digital image forming apparatus as set forth in claim 17, wherein the operation control means inhibits an image output operation to be restarted when a processing function required for processing the document image in a predetermined order is selected.

20. The digital image forming apparatus as set forth in claim 1, further comprising:

error amount memory means for storing an accumulated amount of errors detected by said error detection means.

21. The digital image forming apparatus as set forth in claim 6, further comprising:

error amount memory means for storing an accumulated amount of errors detected by said error detection means.

22. The digital image forming apparatus as set forth in claim 1, further comprising:

error amount memory means for storing accumulated amount of writing errors detected by said error detection means;

memory control means for processing the memory area subject to a writing error in the image memory to be determined as an inhibited area;

warning means for giving a warning to the user; and operation control means for activating said warning means when a remaining capacity of said image memory is below a predetermined amount by said memory control means.

23. A digital image forming apparatus, comprising:

an image memory;

image output means for outputting an image data read from the image memory through visualization;

data writing means for writing inputted image data into said image memory;

error detection means for detecting a writing error into the image memory when said data writing means is activated; and writing control means for controlling said data writing means so that image data is written in the error writing memory section set as a memory section wherein a writing error is less likely to occur compared with the memory area subject to the writing error.

\* \* \* \* \*